United States Patent
Hirobe et al.

(10) Patent No.: US 9,634,515 B2
(45) Date of Patent: *Apr. 25, 2017

(54) NON-CONTACT WIRELESS COMMUNICATION COIL, TRANSMISSION COIL, AND PORTABLE WIRELESS TERMINAL

(71) Applicant: PANASONIC CORPORATION, Osaka (JP)

(72) Inventors: Takanori Hirobe, Miyagi (JP); Hiroyuki Uejima, Miyagi (JP); Yoshio Koyanagi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/091,375

(22) Filed: Apr. 5, 2016

(65) Prior Publication Data
US 2016/0218549 A1    Jul. 28, 2016

Related U.S. Application Data

(63) Continuation of application No. 14/236,025, filed as application No. PCT/JP2012/006644 on Oct. 17, 2012.

(30) Foreign Application Priority Data

Nov. 2, 2011   (JP) ................... 2011-241255
Nov. 15, 2011  (JP) ................... 2011-249841
(Continued)

(51) Int. Cl.
*H01Q 1/00*   (2006.01)
*H02J 7/02*   (2016.01)
(Continued)

(52) U.S. Cl.
CPC .............. *H02J 7/025* (2013.01); *H01F 38/14* (2013.01); *H01Q 1/2208* (2013.01);
(Continued)

(58) Field of Classification Search
CPC  H01Q 1/273; H01Q 7/06; H01Q 7/08; H01Q 1/243; H01Q 1/44; H01Q 1/2208;
(Continued)

(56) References Cited

U.S. PATENT DOCUMENTS 5,198,647 A   3/1993  Mizuta
5,313,444 A   5/1994  Ishii et al.
(Continued)

FOREIGN PATENT DOCUMENTS

CN   101681719 A   3/2010
CN   101771283 A   7/2010
(Continued)

OTHER PUBLICATIONS

Notification of First Chinese Office Action dated Mar. 30, 2015, for corresponding CN Application No. 201280053655.4, 13 pages.
(Continued)

*Primary Examiner* — Jean B Jeanglaude
(74) *Attorney, Agent, or Firm* — Seed Intellectual Property Law Group LLP

(57) ABSTRACT

A chargeable communication module is provided, which includes: a wireless power charging coil; a wireless communication coil being electrically isolated from the wireless power charging coil; and a magnetic body. The wireless power charging coil is disposed on a surface of the magnetic body. The wireless communication coil is arranged peripheral to the wireless power charging coil. A center of the wireless power charging coil is offset from a center of the wireless communication coil.

15 Claims, 50 Drawing Sheets

(30) Foreign Application Priority Data

| Nov. 29, 2011 | (JP) | ................................ | 2011-260677 |
| Jul. 6, 2012 | (JP) | ................................ | 2012-152664 |
| Jul. 10, 2012 | (JP) | ................................ | 2012-154861 |

(51) Int. Cl.

| H01F 38/14 | (2006.01) |
| H01Q 1/22 | (2006.01) |
| H01Q 1/24 | (2006.01) |
| H01Q 7/00 | (2006.01) |
| H02J 17/00 | (2006.01) |
| H04B 5/00 | (2006.01) |
| H01Q 7/06 | (2006.01) |
| H01Q 5/40 | (2015.01) |
| H01Q 1/52 | (2006.01) |
| H01Q 1/38 | (2006.01) |
| H01Q 21/28 | (2006.01) |

(52) U.S. Cl.
CPC ........... *H01Q 1/2225* (2013.01); *H01Q 1/243* (2013.01); *H01Q 1/248* (2013.01); *H01Q 1/38* (2013.01); *H01Q 1/521* (2013.01); *H01Q 5/40* (2015.01); *H01Q 7/00* (2013.01); *H01Q 7/06* (2013.01); *H01Q 21/28* (2013.01); *H02J 17/00* (2013.01); *H04B 5/0031* (2013.01); *H04B 5/0037* (2013.01); *H04B 5/0075* (2013.01); *H04B 5/0087* (2013.01)

(58) Field of Classification Search
CPC .... H01Q 1/2225; H01Q 1/2283; H01Q 1/248; H01Q 1/3225; H01Q 1/38; H01Q 1/40; H01Q 1/521; H01Q 5/40; H01Q 7/00; H01Q 7/04; H01Q 9/27
USPC ....................................................... 343/720
See application file for complete search history.

(56) References Cited

U.S. PATENT DOCUMENTS

| 6,175,212 | B1 | 1/2001 | Oguri |
| 6,396,241 | B1 | 5/2002 | Ramos et al. |
| 6,625,481 | B2 | 9/2003 | Bennett et al. |
| 6,803,744 | B1 | 10/2004 | Sabo |
| 7,042,196 | B2 | 5/2006 | Ka-Lai et al. |
| 7,271,596 | B2 | 9/2007 | Furse et al. |
| 7,948,208 | B2 | 5/2011 | Partovi et al. |
| 8,009,007 | B2 | 8/2011 | Utsuno et al. |
| 8,055,310 | B2 | 11/2011 | Beart et al. |
| 8,089,245 | B2 | 1/2012 | Kato et al. |
| 8,188,826 | B2 | 5/2012 | Okada et al. |
| 8,193,767 | B2 | 6/2012 | Inoue et al. |
| 8,232,764 | B2 | 7/2012 | Inoue et al. |
| 8,237,401 | B2 | 8/2012 | Sip et al. |
| 8,260,199 | B2 | 9/2012 | Kowalski |
| 8,269,375 | B2 | 9/2012 | Sogabe et al. |
| 8,280,453 | B2 | 10/2012 | Beart et al. |
| 8,283,888 | B2 | 10/2012 | Inoue et al. |
| 8,362,868 | B2 | 1/2013 | Tamura et al. |
| 8,421,574 | B2 | 4/2013 | Suzuki et al. |
| 8,457,550 | B2 | 6/2013 | Goto et al. |
| 8,541,977 | B2 | 9/2013 | Hasegawa et al. |
| 8,542,018 | B2 | 9/2013 | Yoshikawa |
| 8,547,058 | B2 | 10/2013 | Tabata et al. |
| 8,552,684 | B2 | 10/2013 | Tabata et al. |
| 8,560,024 | B2 | 10/2013 | Beart et al. |
| 8,643,219 | B2 | 2/2014 | Yabe et al. |
| 8,643,473 | B2 | 2/2014 | Suzuki |
| 8,664,801 | B2 | 3/2014 | Abe |
| 8,680,811 | B2 | 3/2014 | Mochida et al. |
| 8,766,484 | B2 | 7/2014 | Baarman et al. |
| 8,829,731 | B2 | 9/2014 | Baarman et al. |
| 8,847,831 | B2 | 9/2014 | Kato et al. |
| 8,909,139 | B2 | 12/2014 | Aldana et al. |
| 8,922,162 | B2 | 12/2014 | Park et al. |
| 8,995,910 | B2 | 3/2015 | Chong et al. |
| 9,048,959 | B2 | 6/2015 | Voutilainen et al. |
| 9,126,514 | B2 | 9/2015 | Soar |
| 9,143,041 | B2 | 9/2015 | Itabashi et al. |
| 9,153,855 | B2 | 10/2015 | Yamaguchi et al. |
| 9,240,702 | B2 | 1/2016 | Soar |
| 9,265,957 | B2 | 2/2016 | Chen et al. |
| 9,362,985 | B2 | 6/2016 | Uchida et al. |
| 2005/0116683 | A1 | 6/2005 | Cheng et al. |
| 2005/0151696 | A1 | 7/2005 | Govari et al. |
| 2006/0076922 | A1 | 4/2006 | Cheng et al. |
| 2006/0082659 | A1 | 4/2006 | Koo |
| 2006/0205381 | A1 | 9/2006 | Beart et al. |
| 2007/0182367 | A1 | 8/2007 | Partovi |
| 2007/0206116 | A1 | 9/2007 | Chou |
| 2007/0279022 | A1 | 12/2007 | Chen et al. |
| 2007/0297204 | A1 | 12/2007 | Lu et al. |
| 2008/0111518 | A1 | 5/2008 | Toya |
| 2008/0122570 | A1 | 5/2008 | Takaishi |
| 2008/0164839 | A1 | 7/2008 | Kato et al. |
| 2008/0164840 | A1 | 7/2008 | Kato et al. |
| 2008/0164844 | A1 | 7/2008 | Kato et al. |
| 2008/0297107 | A1 | 12/2008 | Kato et al. |
| 2008/0303735 | A1 | 12/2008 | Fujimoto et al. |
| 2009/0001932 | A1 | 1/2009 | Kamijo et al. |
| 2009/0021212 | A1 | 1/2009 | Hasegawa et al. |
| 2009/0033280 | A1 | 2/2009 | Choi et al. |
| 2009/0050624 | A1 | 2/2009 | Ventura |
| 2009/0058358 | A1 | 3/2009 | Inoue et al. |
| 2009/0096413 | A1 | 4/2009 | Partovi et al. |
| 2009/0102419 | A1 | 4/2009 | Gwon et al. |
| 2009/0121677 | A1 | 5/2009 | Inoue et al. |
| 2009/0212637 | A1 | 8/2009 | Baarman et al. |
| 2009/0230777 | A1 | 9/2009 | Baarman et al. |
| 2009/0284341 | A1 | 11/2009 | Okada et al. |
| 2010/0007215 | A1 | 1/2010 | Sakuma |
| 2010/0127813 | A1 | 5/2010 | Utsuno et al. |
| 2010/0156344 | A1 | 6/2010 | Inoue et al. |
| 2010/0156735 | A1 | 6/2010 | Nakamura et al. |
| 2010/0164431 | A1 | 7/2010 | Sip et al. |
| 2010/0181842 | A1 | 7/2010 | Suzuki et al. |
| 2010/0207575 | A1 | 8/2010 | Pijnenburg et al. |
| 2010/0210207 | A1 | 8/2010 | Goto et al. |
| 2010/0244579 | A1 | 9/2010 | Sogabe et al. |
| 2010/0244839 | A1 | 9/2010 | Yoshikawa |
| 2010/0264746 | A1 | 10/2010 | Kazama et al. |
| 2010/0270867 | A1 | 10/2010 | Abe |
| 2010/0311327 | A1 | 12/2010 | Hamada |
| 2010/0320843 | A1 | 12/2010 | Kitamura et al. |
| 2011/0025264 | A1 | 2/2011 | Mochida et al. |
| 2011/0043050 | A1 | 2/2011 | Yabe et al. |
| 2011/0050535 | A1 | 3/2011 | Yamaguchi et al. |
| 2011/0102125 | A1 | 5/2011 | Tamura et al. |
| 2011/0210619 | A1 | 9/2011 | Beart et al. |
| 2011/0210696 | A1 | 9/2011 | Inoue |
| 2011/0227799 | A1 | 9/2011 | Hashimoto |
| 2011/0241837 | A1 | 10/2011 | Suzuki |
| 2011/0309792 | A1 | 12/2011 | Mochida et al. |
| 2011/0316475 | A1 | 12/2011 | Jung et al. |
| 2012/0057322 | A1 | 3/2012 | Waffenschmidt |
| 2012/0098352 | A1 | 4/2012 | Takaishi |
| 2012/0146580 | A1 | 6/2012 | Kitamura |
| 2012/0153731 | A9 | 6/2012 | Kirby et al. |
| 2012/0181876 | A1 | 7/2012 | Baarman et al. |
| 2012/0289153 | A1 | 11/2012 | Dobyns |
| 2012/0309307 | A1 | 12/2012 | D'Amico |
| 2012/0319500 | A1 | 12/2012 | Beart et al. |
| 2012/0319647 | A1 | 12/2012 | Itabashi et al. |
| 2013/0005251 | A1 | 1/2013 | Soar |
| 2013/0033118 | A1 | 2/2013 | Karalis et al. |
| 2013/0038278 | A1 | 2/2013 | Park et al. |
| 2013/0229252 | A1 | 9/2013 | Nogi et al. |
| 2013/0249312 | A1 | 9/2013 | Uchida et al. |
| 2013/0249661 | A1 | 9/2013 | Motomiya et al. |
| 2013/0267170 | A1 | 10/2013 | Chong et al. |
| 2014/0306656 | A1 | 10/2014 | Tabata et al. |

(56) References Cited

U.S. PATENT DOCUMENTS

| | | |
|---|---|---|
| 2014/0349573 A1 | 11/2014 | Moes et al. |
| 2015/0091524 A1 | 4/2015 | Park et al. |
| 2015/0222143 A1 | 8/2015 | Osada et al. |

FOREIGN PATENT DOCUMENTS

| | | |
|---|---|---|
| CN | 101971452 A | 2/2011 |
| CN | 102017353 A | 4/2011 |
| CN | 102084440 A | 6/2011 |
| CN | 102208926 A | 10/2011 |
| EP | 1 928 003 A2 | 6/2008 |
| EP | 1 944 851 A2 | 7/2008 |
| EP | 2 017 860 A2 | 1/2009 |
| EP | 2 081 199 A1 | 7/2009 |
| EP | 2 172 952 A1 | 4/2010 |
| EP | 2 244 351 A2 | 10/2010 |
| EP | 2 246 864 A1 | 11/2010 |
| EP | 2 258 032 A2 | 12/2010 |
| EP | 1 928 003 B1 | 1/2011 |
| EP | 2 284 849 A1 | 2/2011 |
| EP | 2 296 228 A1 | 3/2011 |
| EP | 2 348 517 A1 | 7/2011 |
| EP | 2 367 262 A2 | 9/2011 |
| EP | 2 456 044 A1 | 5/2012 |
| EP | 2 546 844 A1 | 1/2013 |
| EP | 2 620 961 A1 | 7/2013 |
| EP | 2 712 053 A1 | 3/2014 |
| EP | 2 244 351 B1 | 9/2015 |
| JP | 56-170187 U | 12/1981 |
| JP | 05-144108 A | 6/1993 |
| JP | 07-231586 A | 8/1995 |
| JP | 07-299150 A | 11/1995 |
| JP | 11-122146 A | 4/1999 |
| JP | 11-265814 A | 9/1999 |
| JP | 2002-354713 A | 12/2002 |
| JP | 2003-045731 A | 2/2003 |
| JP | 2003-068531 A | 3/2003 |
| JP | 2003-255288 A | 9/2003 |
| JP | 2004-047701 A | 2/2004 |
| JP | 2004-110854 A | 4/2004 |
| JP | 2005-224603 A | 8/2005 |
| JP | 2006-032589 A | 2/2006 |
| JP | 2006-042519 A | 2/2006 |
| JP | 2006-126901 A | 5/2006 |
| JP | 2006-315368 A | 11/2006 |
| JP | 2007-214754 A | 8/2007 |
| JP | 2008-027015 A | 2/2008 |
| JP | 2008-125115 A | 5/2008 |
| JP | 2008-135589 A | 6/2008 |
| JP | 2008-172872 A | 7/2008 |
| JP | 2008-172874 A | 7/2008 |
| JP | 2008-205557 A | 9/2008 |
| JP | 2008-206297 A | 9/2008 |
| JP | 2008-210861 A | 9/2008 |
| JP | 2008-235860 A | 10/2008 |
| JP | 2008-289241 A | 11/2008 |
| JP | 2009-005475 A | 1/2009 |
| JP | 2009-027025 A | 2/2009 |
| JP | 2009-159660 A | 7/2009 |
| JP | 2009-182902 A | 8/2009 |
| JP | 2009-200174 A | 9/2009 |
| JP | 2009-247125 A | 10/2009 |
| JP | 2009-253649 A | 10/2009 |
| JP | 2009-259273 A | 11/2009 |
| JP | 2009-277820 A | 11/2009 |
| JP | 2009-284657 A | 12/2009 |
| JP | 2010-016235 A | 1/2010 |
| JP | 4400509 B2 | 1/2010 |
| JP | 2010-041906 A | 2/2010 |
| JP | 2010-050515 A | 3/2010 |
| JP | 2010-128219 A | 6/2010 |
| JP | 2010-129692 A | 6/2010 |
| JP | 2010-207017 A | 9/2010 |
| JP | 2010-213570 A | 9/2010 |
| JP | 2010-219652 A | 9/2010 |
| JP | 2010-226929 A | 10/2010 |
| JP | 2010-239781 A | 10/2010 |
| JP | 2010-239838 A | 10/2010 |
| JP | 2010-252624 A | 11/2010 |
| JP | 2010-258913 A | 11/2010 |
| JP | 2010-259172 A | 11/2010 |
| JP | 2010-283263 A | 12/2010 |
| JP | 2010-284059 A | 12/2010 |
| JP | 2011-024360 A | 2/2011 |
| JP | 2011-049936 A | 3/2011 |
| JP | 2011-072074 A | 4/2011 |
| JP | 2011-072097 A | 4/2011 |
| JP | 2011-072116 A | 4/2011 |
| JP | 4669560 B1 | 4/2011 |
| JP | 2011-101524 A | 5/2011 |
| JP | 2011-103533 A | 5/2011 |
| JP | 2011-103694 A | 5/2011 |
| JP | 2011-514796 A | 5/2011 |
| JP | 2012-010533 A | 1/2012 |
| JP | 2012-084893 A | 4/2012 |
| JP | 2012-156279 A | 8/2012 |
| JP | 2012-157147 A | 8/2012 |
| JP | 5013019 B1 | 8/2012 |
| JP | 2013-021902 A | 1/2013 |
| WO | 2007/080820 A1 | 7/2007 |
| WO | 2007/122788 A1 | 11/2007 |
| WO | 2008/156025 A1 | 12/2008 |
| WO | 2009/053801 A1 | 4/2009 |
| WO | 2009/105615 A2 | 8/2009 |
| WO | 2009/114671 A1 | 9/2009 |
| WO | 2011/007661 A1 | 1/2011 |
| WO | 2011/016737 A1 | 2/2011 |
| WO | 2011/096569 A1 | 8/2011 |
| WO | 2012/073305 A1 | 6/2012 |
| WO | 2013/084480 A1 | 6/2013 |

OTHER PUBLICATIONS

International Search Report, mailed Dec. 4, 2012, for PCT/JP2012/006644, 4 pages.
Korean Office Action dated Mar. 6, 2015, for corresponding KR Application No. 10-2014-709494, 12 pages.
Extended European Search Report dated Jun. 2, 2015, for corresponding EP Application No. 12846180.3-1812 / 2775632, 5 pages.
Notification of Reasons for Refusal, dated Apr. 12, 2016, for corresponding JP Application No. 2012-154861, 7 pages. (With English Translation).
International Search Report dated Apr. 2, 2013, for corresponding International Application No. PCT/JP2013/000553, 4 pages. (With English Translation).
Brooke Crothers, Getting a look inside the iPhone 4, Nanotech—The Circuits Blog—CNET News, Jun. 22, 2010, 5 pages.
English Translation of Chinese Search Report dated May 29, 2015, for corresponding CN Application No. 201280039867.7, 3 pages.
Extended European Search Report, dated Oct. 8, 2014, for corresponding European Application No. 12801388.5-1556/2712053, 8 pages.
International Search Report dated Sep. 4, 2012, for corresponding International Application No. PCT/JP2012/003914, 8 pages.
International Search Report dated Apr. 3, 2012, for corresponding International Application No. PCT/JP2011/007345, 2 pages.
International Search Report dated Dec. 27, 2011, for corresponding International Application No. PCT/JP2011/006025, 4 pages.
Partial English Translation of Japanese Office Action dated May 10, 2011, for corresponding JP Application No. 2011/013619, 6 pages.
Partial English Translation of Japanese Office Action dated Sep. 6, 2011, for corresponding JP Application No. 2011-135946, 6 pages.
Wireless Power Consortium, "System Description Wireless Power Transfer," vol. 1: Low Power, Part 1: Interface Definition, V 1.0.1, Oct. 2010, 86 pages.
International Search Report, dated Jun. 18, 2013, for corresponding International Application No. PCT/JP2013/003317, 2 pages.
International Search Report, dated Aug. 20, 2013, for related International Application No. PCT/JP2013/003316, 4 pages.

(56) References Cited

OTHER PUBLICATIONS

International Search Report, dated Aug. 20, 2013, for related International Application No. PCT/JP2013/003315, 4 pages.
Notice of Reasons for Refusal, dated Oct. 25, 2016, for corresponding JP Application No. 2012-145962, 6 pages.
Final Office Action dated Nov. 28, 2016, for corresponding U.S. Appl. No. 14/376,574, 27 pages.

FIG. 2
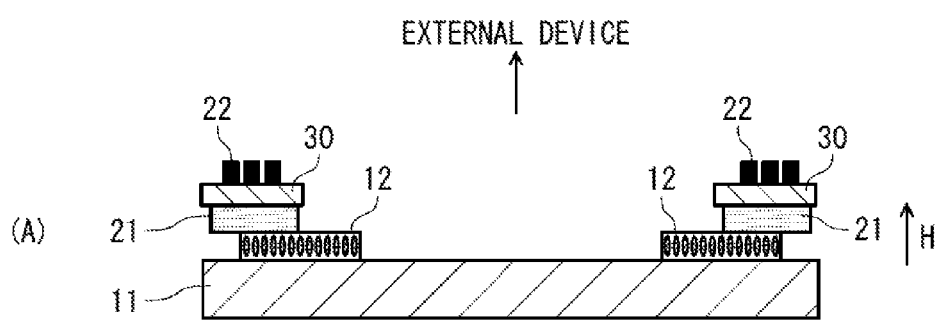
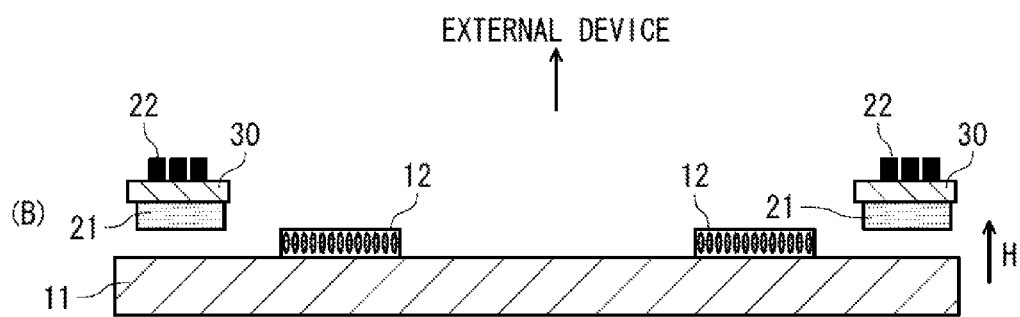

FIG. 4
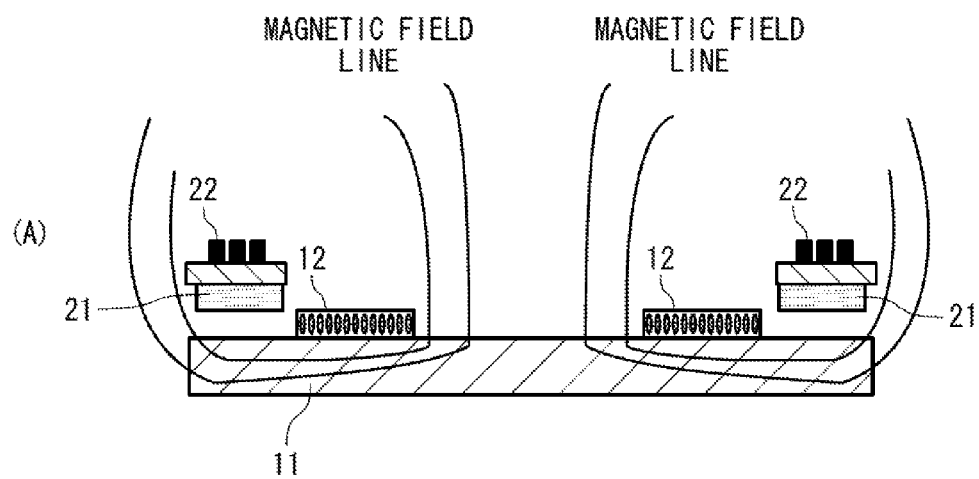
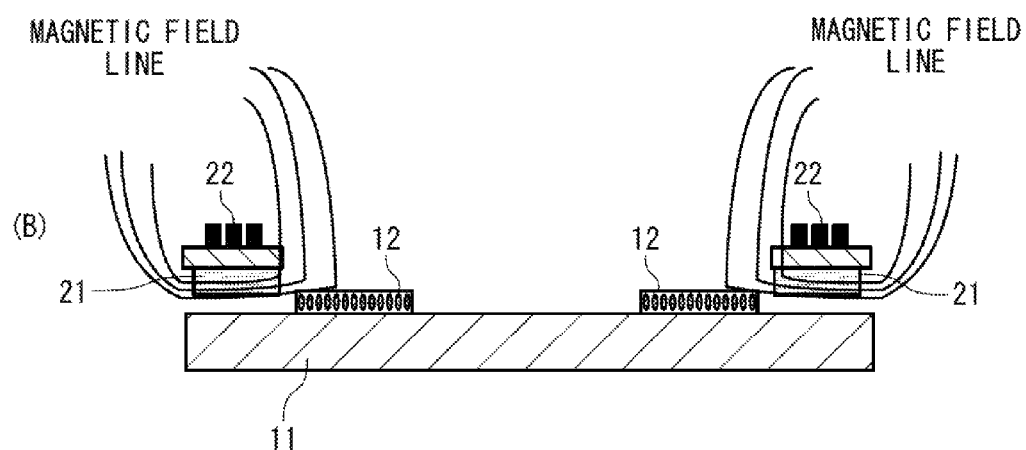

| | POWER TRANSMISSION EFFICIENCY[%] |
|---|---|
| FIRST COIL ONLY | 40.3 |
| FIRST COIL AND SECOND COIL COEXIST | 40.4 |

(B)

| | MAXIMUM COMMUNICATION DISTANCE [mm] | Null REGION |
|---|---|---|
| SECOND COIL ONLY | 126 | NOT GENERATED |
| FIRST COIL AND SECOND COIL COEXIST | 127 | NOT GENERATED |

FIG. 15
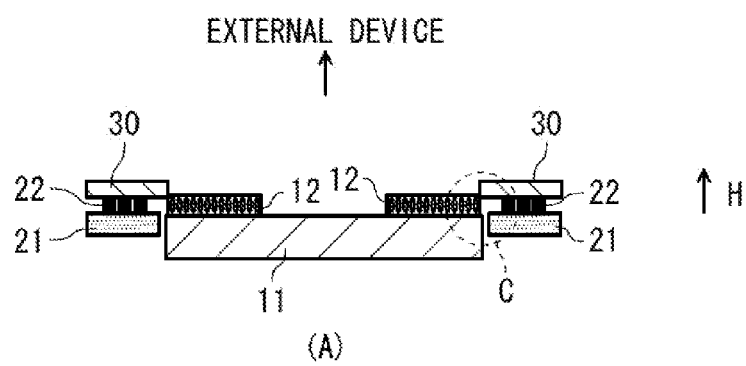
(A)
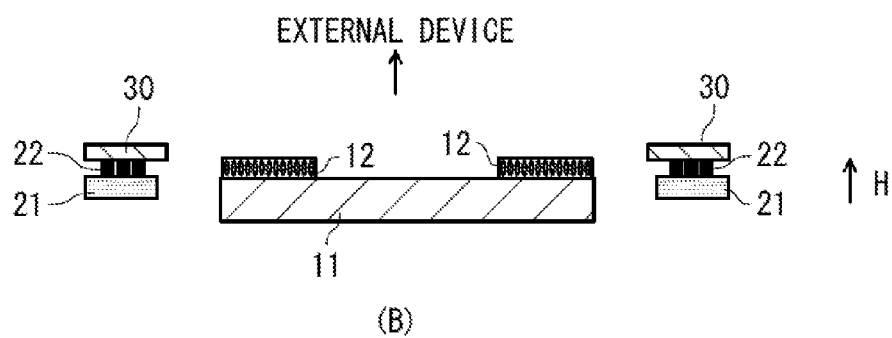
(B)
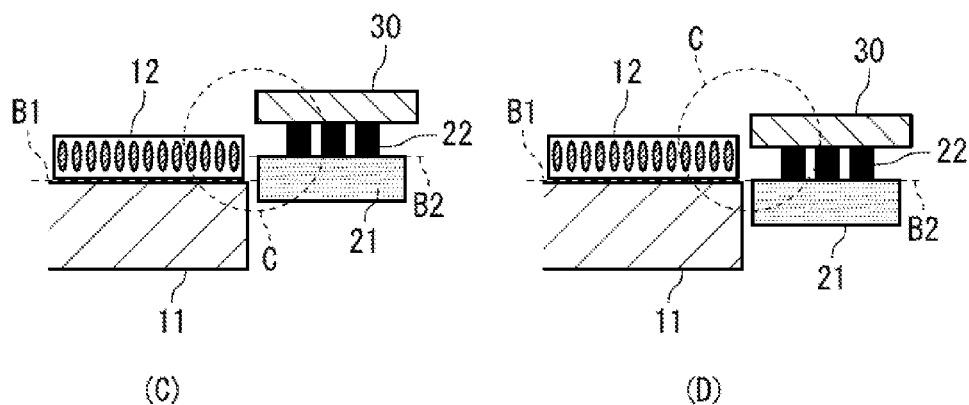
(C)         (D)

*FIG. 16*
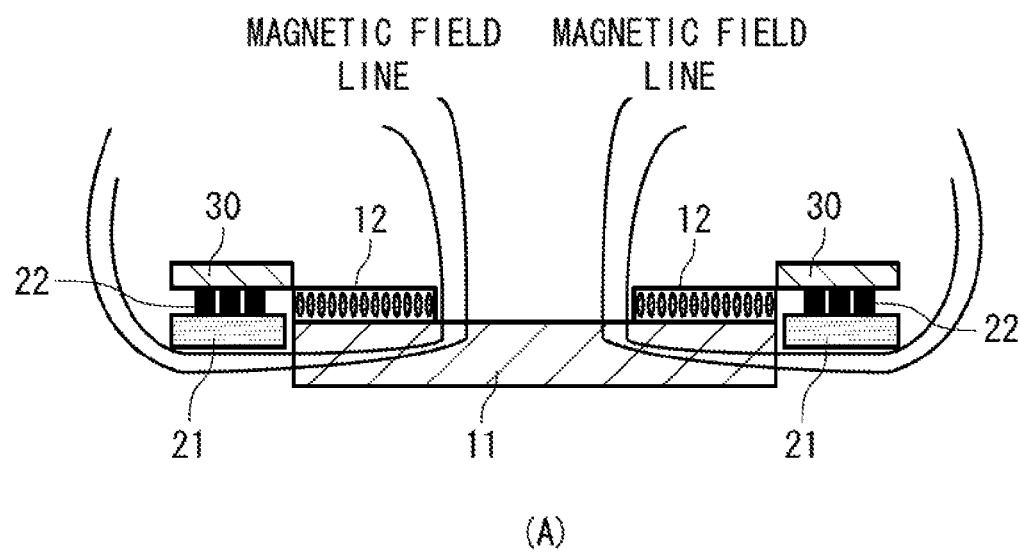
(A)
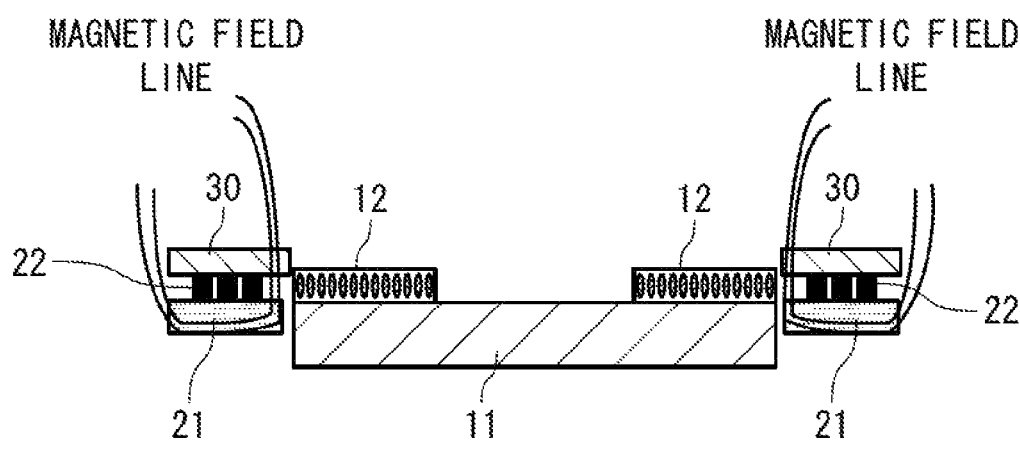
(B)

FIG. 17
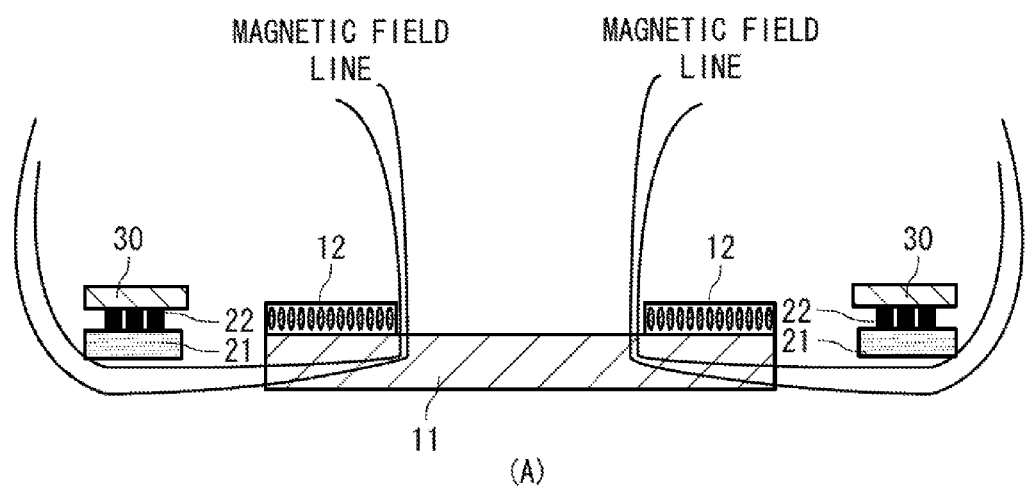
(A)
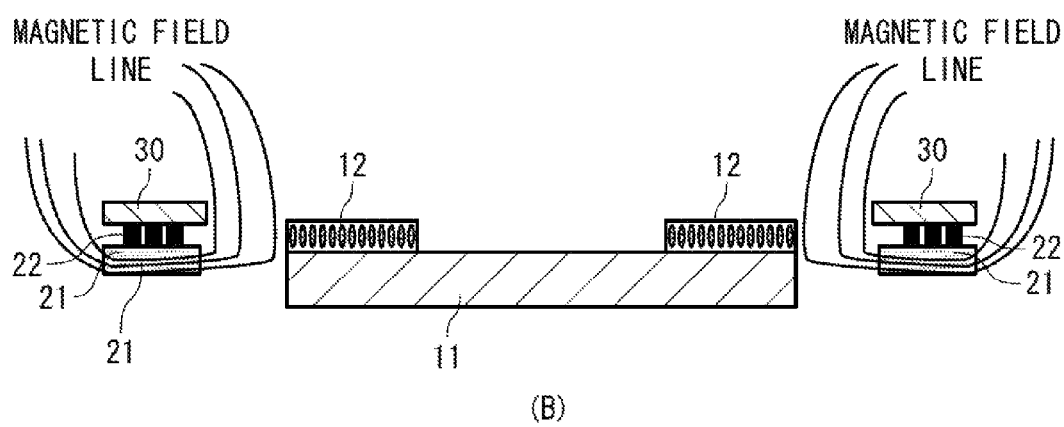
(B)

| | POWER TRANSMISSION EFFICIENCY[%] |
|---|---|
| FIRST COIL ONLY | 38.2 |
| FIRST COIL AND SECOND COIL COEXIST | 38.1 |

(B)

| | MAXIMUM COMMUNICATION DISTANCE[mm] | Null REGION |
|---|---|---|
| SECOND COIL ONLY | 141 | NOT GENERATED |
| FIRST COIL AND SECOND COIL COEXIST | 128 | NOT GENERATED |

| | POWER TRANSMISSION EFFICIENCY[%] |
|---|---|
| FIRST COIL ONLY | 38.1 |
| FIRST COIL AND SECOND COIL COEXIST | 38.0 |

(B)

| | MAXIMUM COMMUNICATION DISTANCE[mm] | Null REGION |
|---|---|---|
| SECOND COIL ONLY | 130 | NOT GENERATED |
| FIRST COIL AND SECOND COIL COEXIST | 117 | NOT GENERATED |

FIG. 26
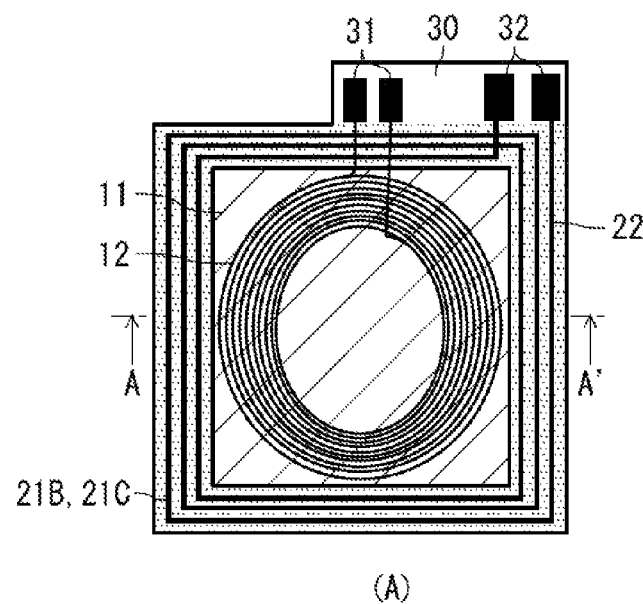
(A)
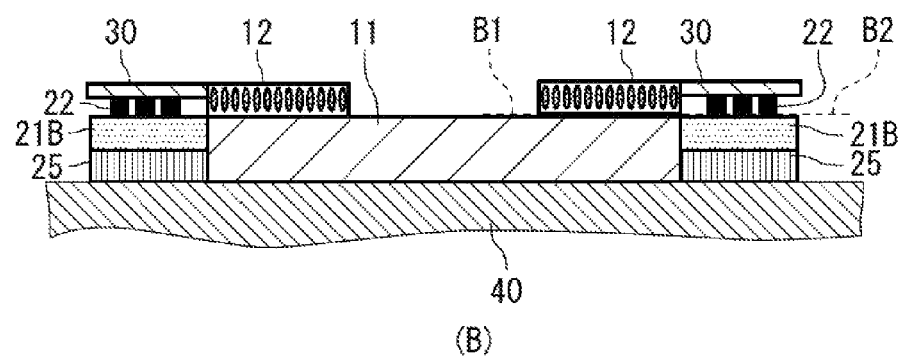
(B)
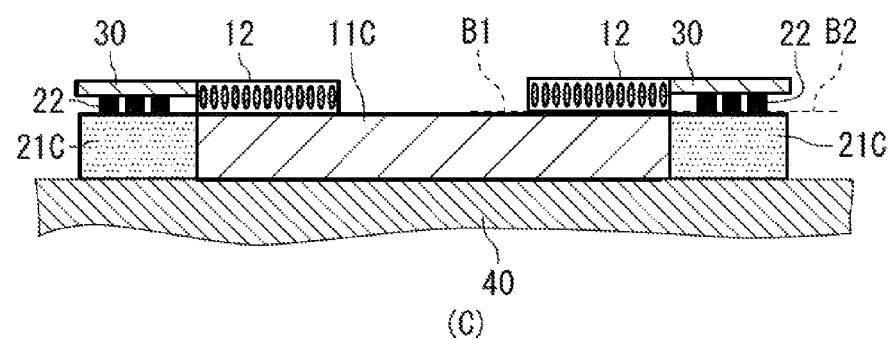
(C)

FIG. 29

| | POWER TRANSMISSION EFFICIENCY[%] |
|---|---|
| COIL UNIT ACCORDING TO FOURTH EMBODIMENT (SEE FIG. 19) | 38.1 |
| COIL UNIT ACCORDING TO SIXTH EMBODIMENT (SEE FIG. 27) | 38.2 |
| COIL UNIT ACCORDING TO SIXTH EMBODIMENT (SEE FIG. 28) | 38.1 |

(A)

| | MAXIMUM COMMUNICATION DISTANCE[mm] | Null REGION |
|---|---|---|
| COIL UNIT ACCORDING TO FOURTH EMBODIMENT (SEE FIG. 19) | 128 | NOT GENERATED |
| COIL UNIT ACCORDING TO SIXTH EMBODIMENT (SEE FIG. 27) | 128 | NOT GENERATED |
| COIL UNIT ACCORDING TO SIXTH EMBODIMENT (SEE FIG. 27) | 128 | NOT GENERATED |

(B)

FIG. 32
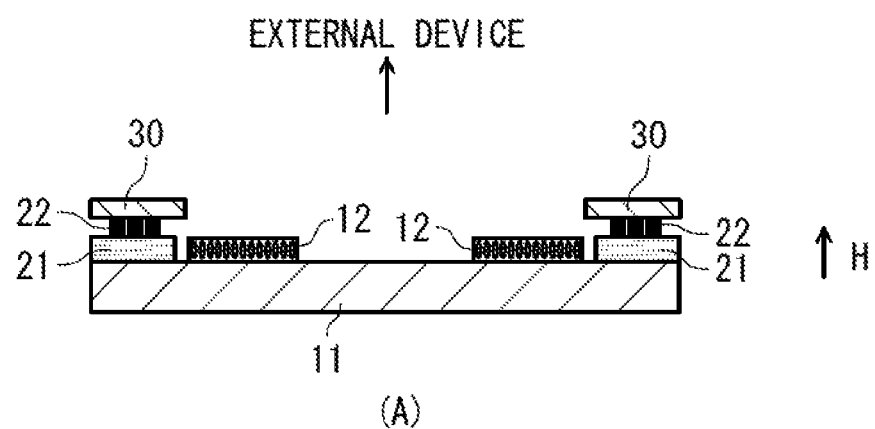
(A)
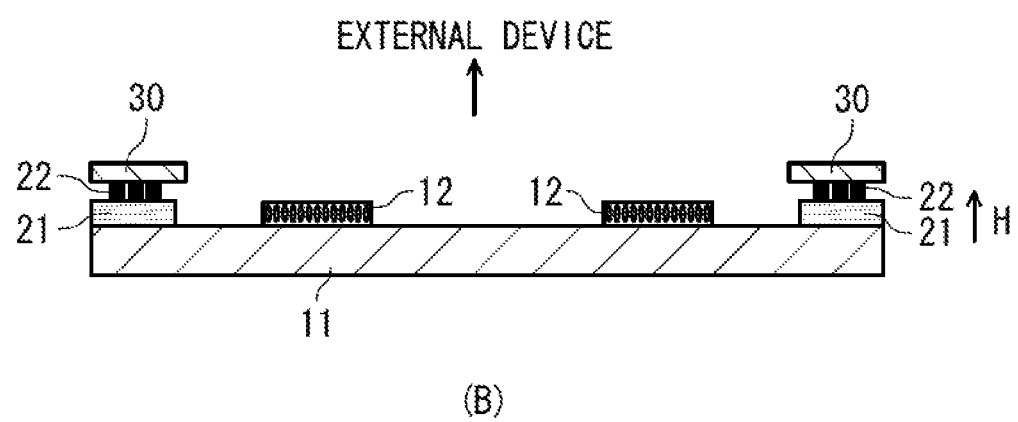
(B)

FIG. 33
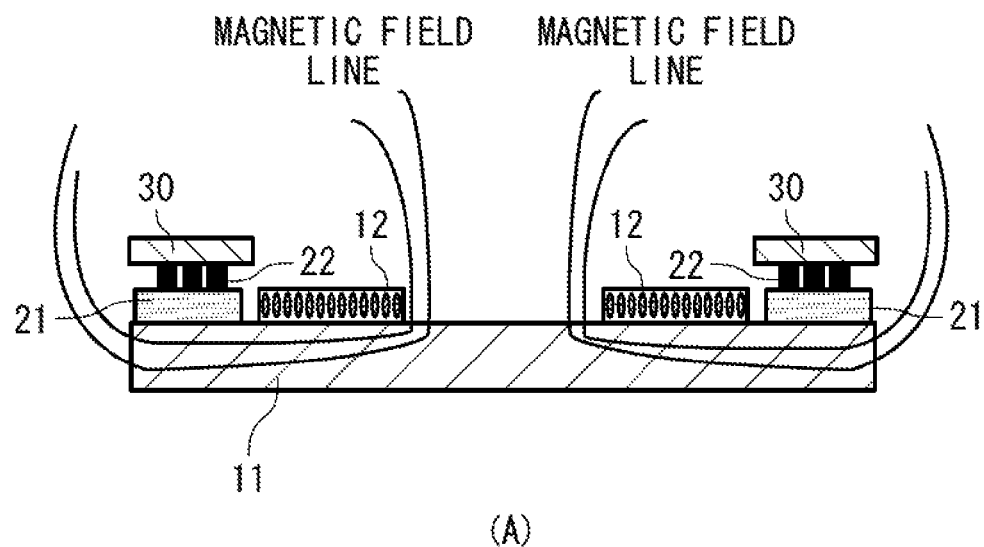
(A)
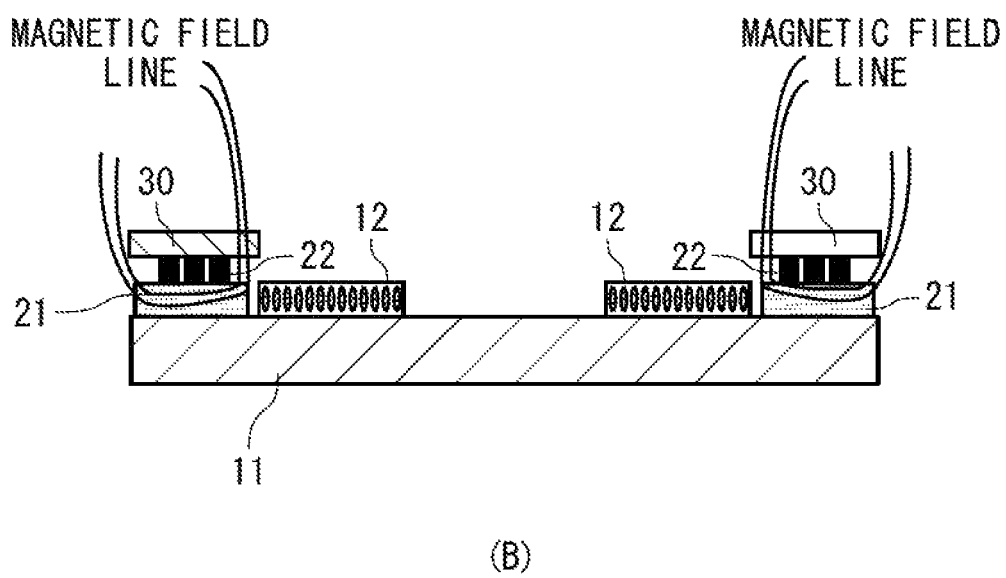
(B)

FIG. 34
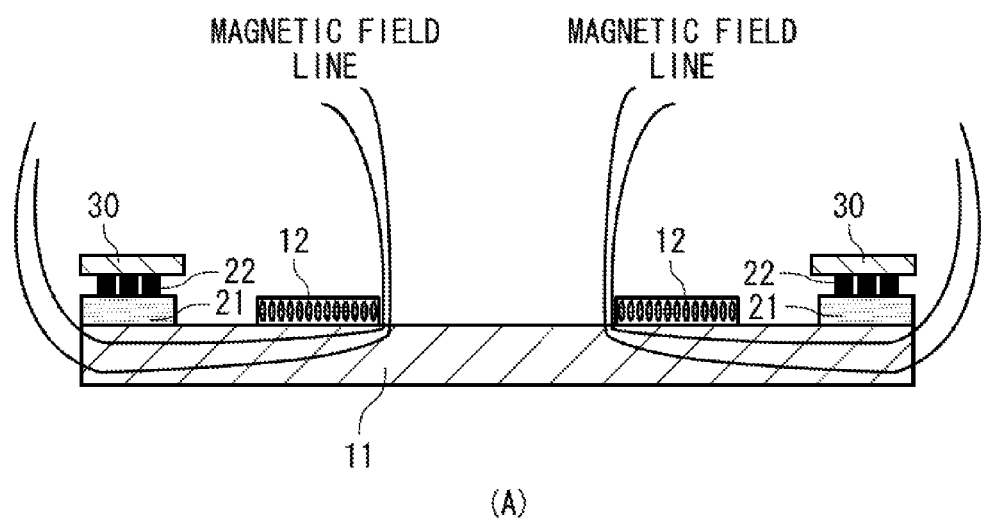
(A)
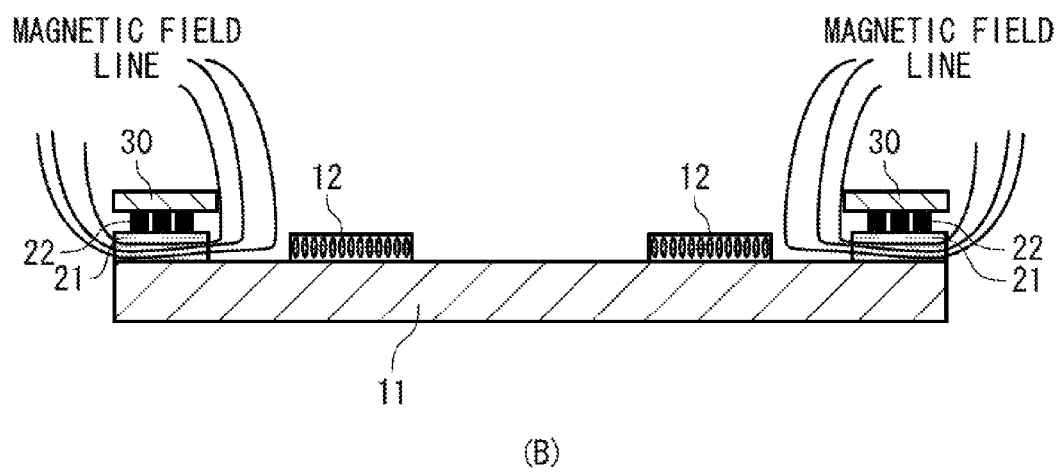
(B)

| | POWER TRANSMISSION EFFICIENCY[%] |
|---|---|
| FIRST COIL ONLY | 37.4 |
| FIRST COIL AND SECOND COIL COEXIST | 38.2 |

(B)

| | MAXIMUM COMMUNICATION DISTANCE[mm] | Null REGION |
|---|---|---|
| SECOND COIL ONLY | 141 | NOT GENERATED |
| FIRST COIL AND SECOND COIL COEXIST | 130 | NOT GENERATED |

| | POWER TRANSMISSION EFFICIENCY [%] |
|---|---|
| FIRST COIL ONLY | 39.1 |
| FIRST COIL AND SECOND COIL COEXIST | 38.8 |

(B)

| | MAXIMUM COMMUNICATION DISTANCE [mm] | Null REGION |
|---|---|---|
| SECOND COIL ONLY | 131 | NOT GENERATED |
| FIRST COIL AND SECOND COIL COEXIST | 117 | NOT GENERATED |

FIG. 41
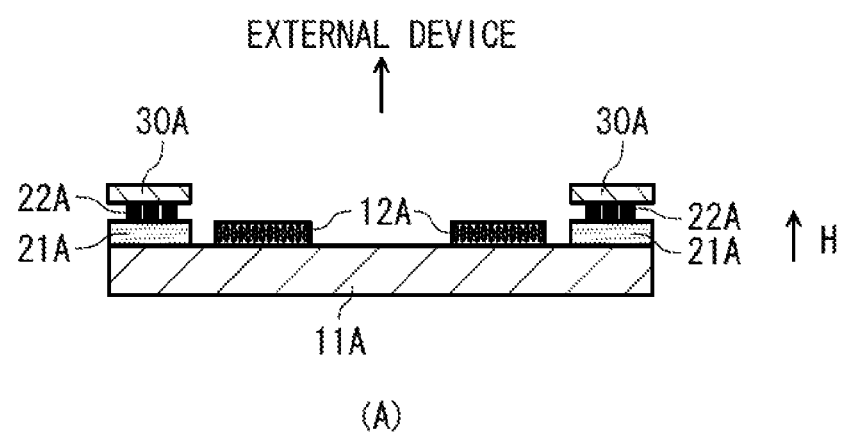
(A)
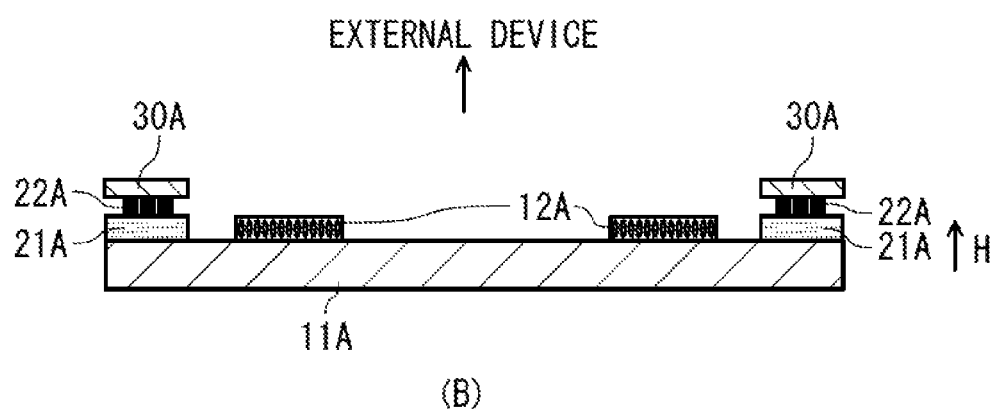
(B)

| | POWER TRANSMISSION EFFICIENCY [%] |
|---|---|
| EXAMPLE OF SEVENTH EMBODIMENT | 38.2 |
| EXAMPLES 1 AND 2 | 38.1 |

(B)

| | MAXIMUM COMMUNICATION DISTANCE [mm] | Null REGION |
|---|---|---|
| EXAMPLE OF SEVENTH EMBODIMENT | 130 | NOT GENERATED |
| EXAMPLES 1 AND 2 | 131 | NOT GENERATED |

NON-CONTACT WIRELESS COMMUNICATION COIL, TRANSMISSION COIL, AND PORTABLE WIRELESS TERMINAL

BACKGROUND

Technical Field

The present invention relates to a non-contact wireless communication coil which can perform non-contact power transmission and non-contact wireless communication and a portable wireless terminal including the non-contact wireless communication coil.

Description of the Related Art

For example, portable wireless terminals including mobile phone terminals and smart phones which have a non-contact wireless communication (so-called radio frequency identification (RFID)) function, such as a near field communication (NFC) function including FeliCa (registered trademark), are being widespread. For example, an electronic money function and a ticket function are implemented by this type of non-contact wireless communication.

In addition, in recent years, a portable wireless terminal with a function of transmitting power in a non-contact manner to change a battery (non-contact charging) has been in use. Examples of the non-contact power transmission type include an electromagnetic induction type and a magnetic field resonance type. In general, a coil in a power supplier is opposite to a coil in a power receiver to transmit power.

In the portable wireless terminal with the non-contact charging function, in general, a charging coil is integrated with a battery pack. Therefore, if the battery pack is thinned in order to reduce the thickness of the terminal, battery capacity is reduced. In contrast, if the charging coil is provided separately from the battery pack, it may be necessary to solve the problems caused by the coexistence of the charging coil with a non-contact wireless communication coil in the portable wireless terminal with the non-contact wireless communication function.

Here, it is assumed that the non-contact wireless communication coil and the non-contact power transmission coil coexist. As the related art in which two coils are provided, for example, PTL 1 discloses a wireless card in which a first coil forming an antenna for power waves and a second coil forming an antenna for data waves are arranged so as to form a double ring. According to this structure, the first coil and the second coil are less likely to be covered with the fingers of the hand which holds the wireless card and it is possible to make the reception conditions of the two coils substantially equal to each other.

CITATION LIST

Patent Literature

[PTL 1] JP-A-2004-110854

BRIEF SUMMARY

A chargeable communication module is provided, which includes: a wireless power charging coil; a wireless communication coil being electrically isolated from the wireless power charging coil; and a magnetic body. The wireless power charging coil is disposed on a surface of the magnetic body. The wireless communication coil is arranged peripheral to the wireless power charging coil. A center of the wireless power charging coil is offset from a center of the wireless communication coil.

BRIEF DESCRIPTION OF THE SEVERAL VIEWS OF THE DRAWINGS

FIG. 2 is a cross-sectional view illustrating the coil unit according to the first embodiment. Section (A) of FIG. 2 is a cross-sectional view illustrating the coil unit taken along the line A-A' of FIG. 1 and Section (B) of FIG. 2 is a cross-sectional view illustrating the coil unit taken along the line B-B' of FIG. 1.

Figure 1:
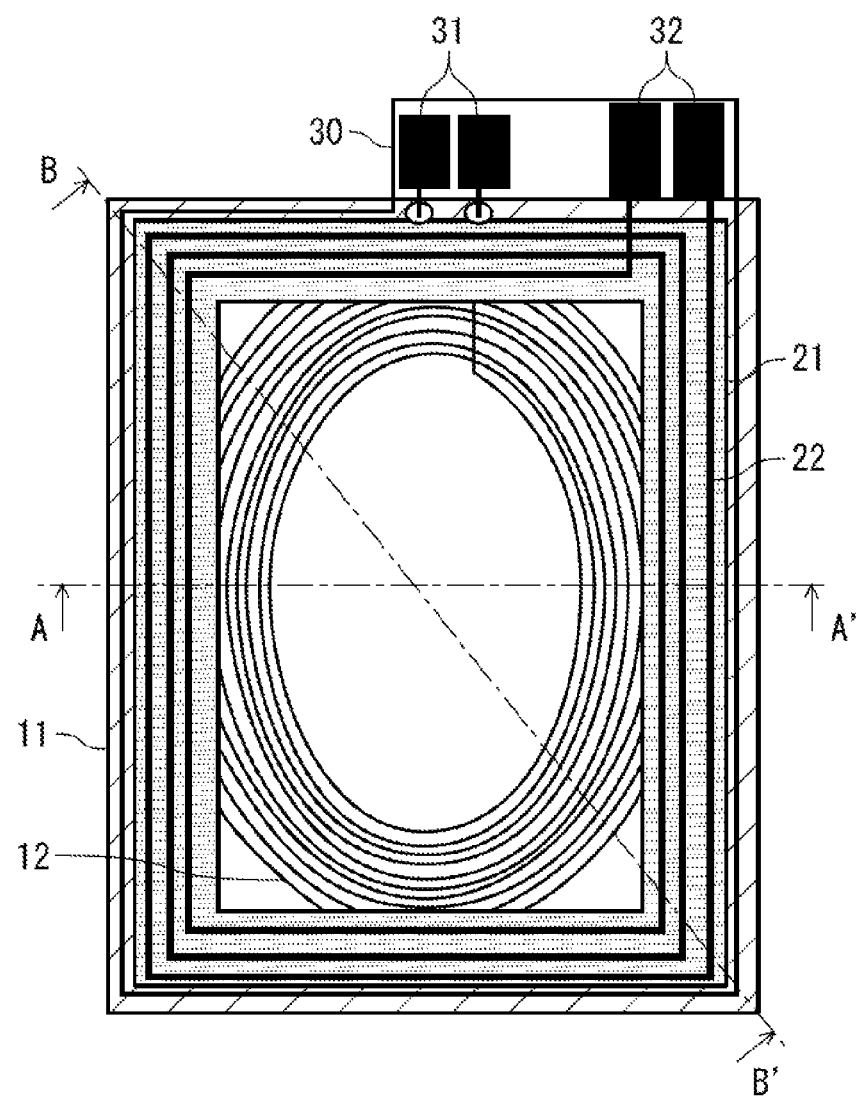
FIG. 1 is a plan view illustrating the structure of a coil unit according to a first embodiment of the invention.
Figure 3:
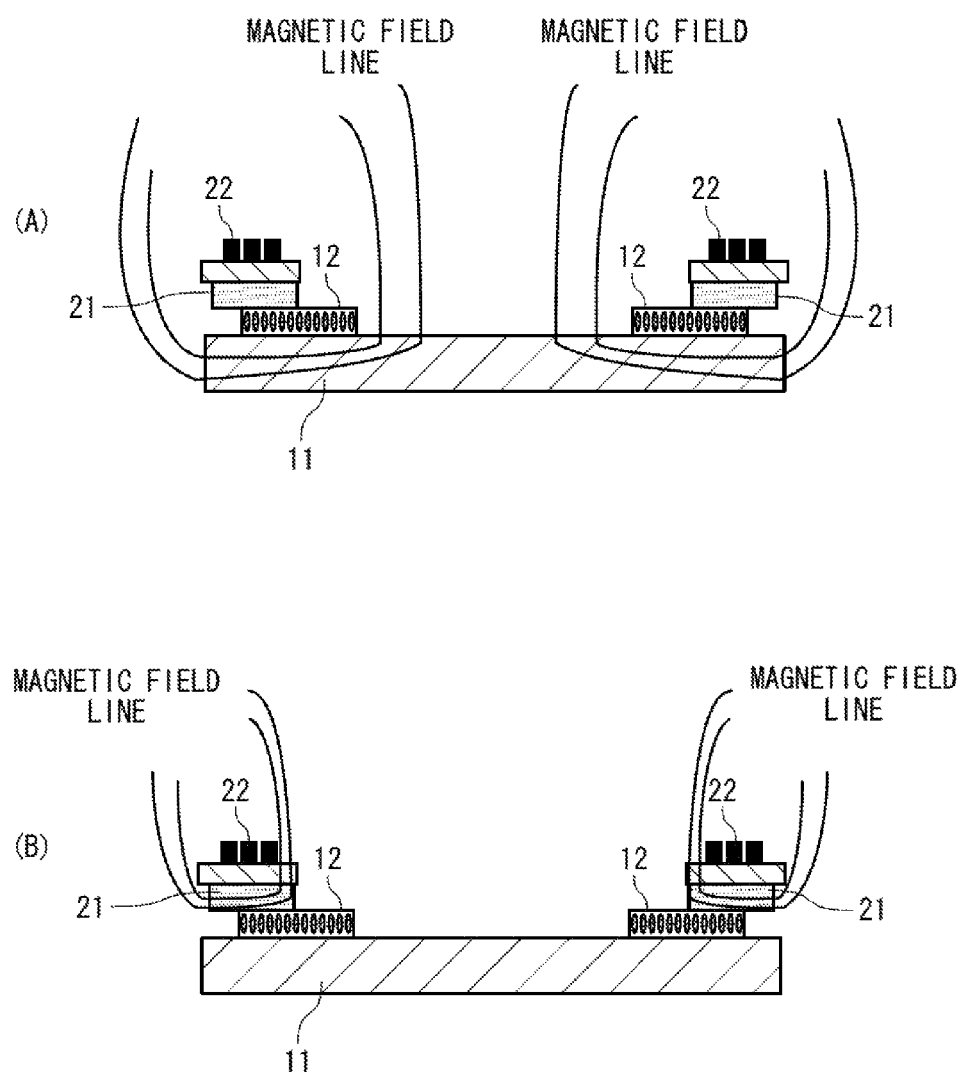

Sections (A) and (B) of FIG. 3 are diagrams illustrating a magnetic field distribution of the coil unit at the position (the position of Section (A) of FIG. 2) of the cross-section taken along the line A-A' of FIG. 1.

Sections (A) and (B) of FIG. 4 are diagrams illustrating a magnetic field distribution of the coil unit at the position (the position of Section (B) of FIG. 2) of the cross-section taken along the line B-B' of FIG. 1.

Figure 5:
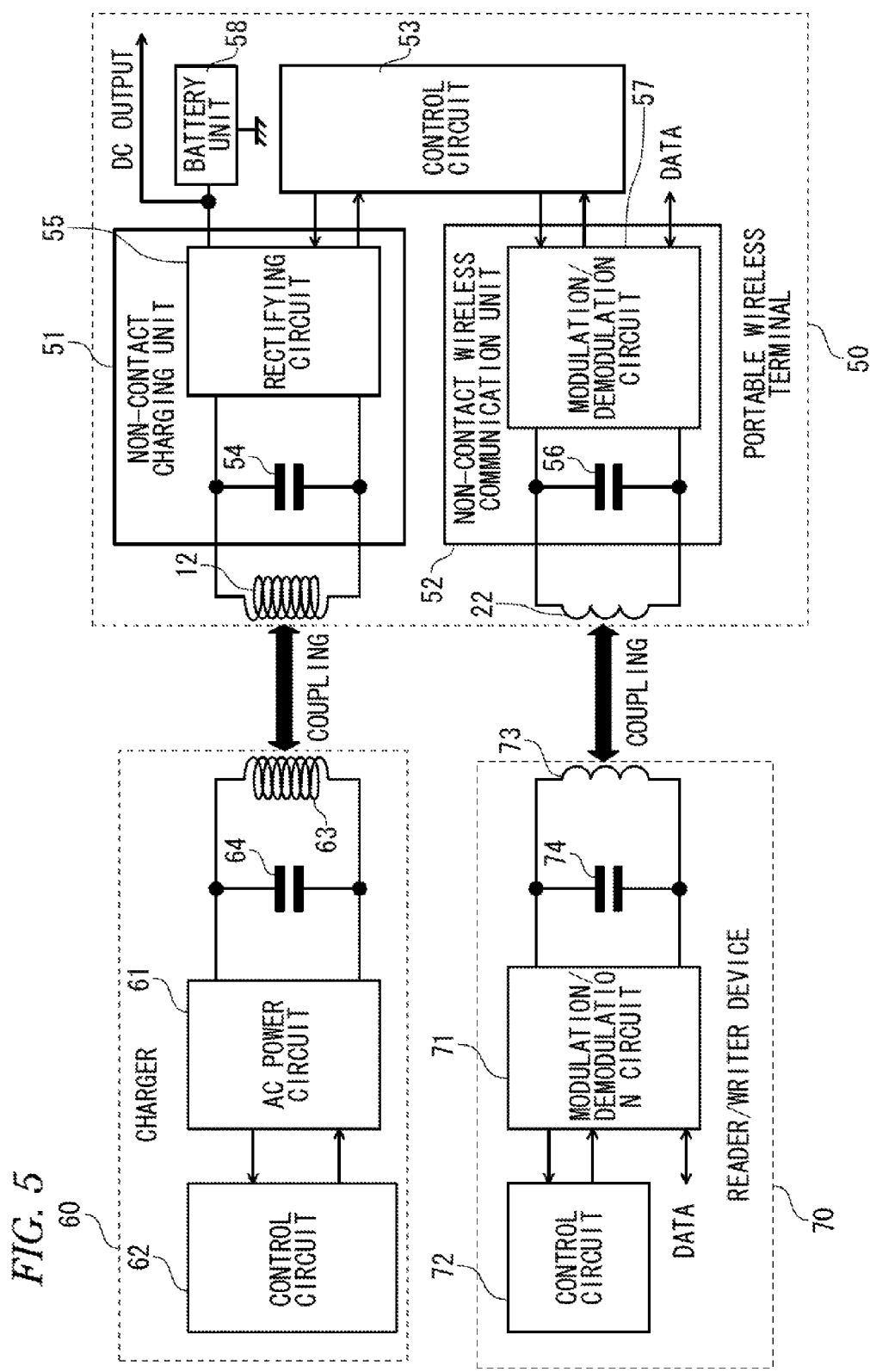

FIG. 5 is a block diagram illustrating the structure of a portable wireless terminal including the coil unit according to this embodiment, a charger which is an external device, and a reader/writer device.

Figure 6:
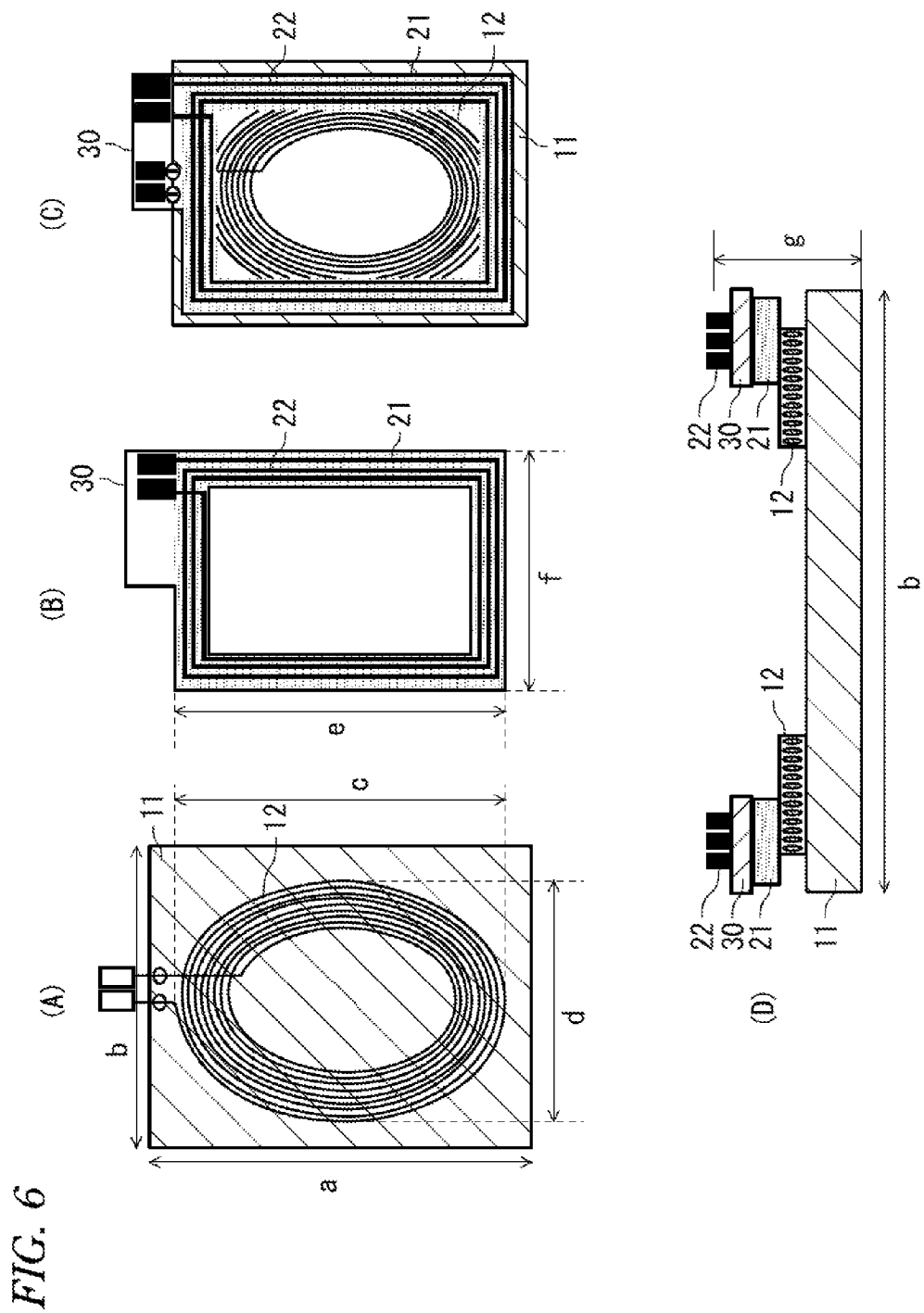

Sections (A) to (D) of FIG. 6 are diagrams illustrating the dimensions of a coil unit according to an example of the invention.

Sections (A) and (B) of FIG. 7 are diagrams illustrating the measurement result when power transmission efficiency during non-contact power transmission and a maximum communication distance during non-contact wireless communication are measured as the performance of the coil unit according to the example of the invention.

Figure 8:
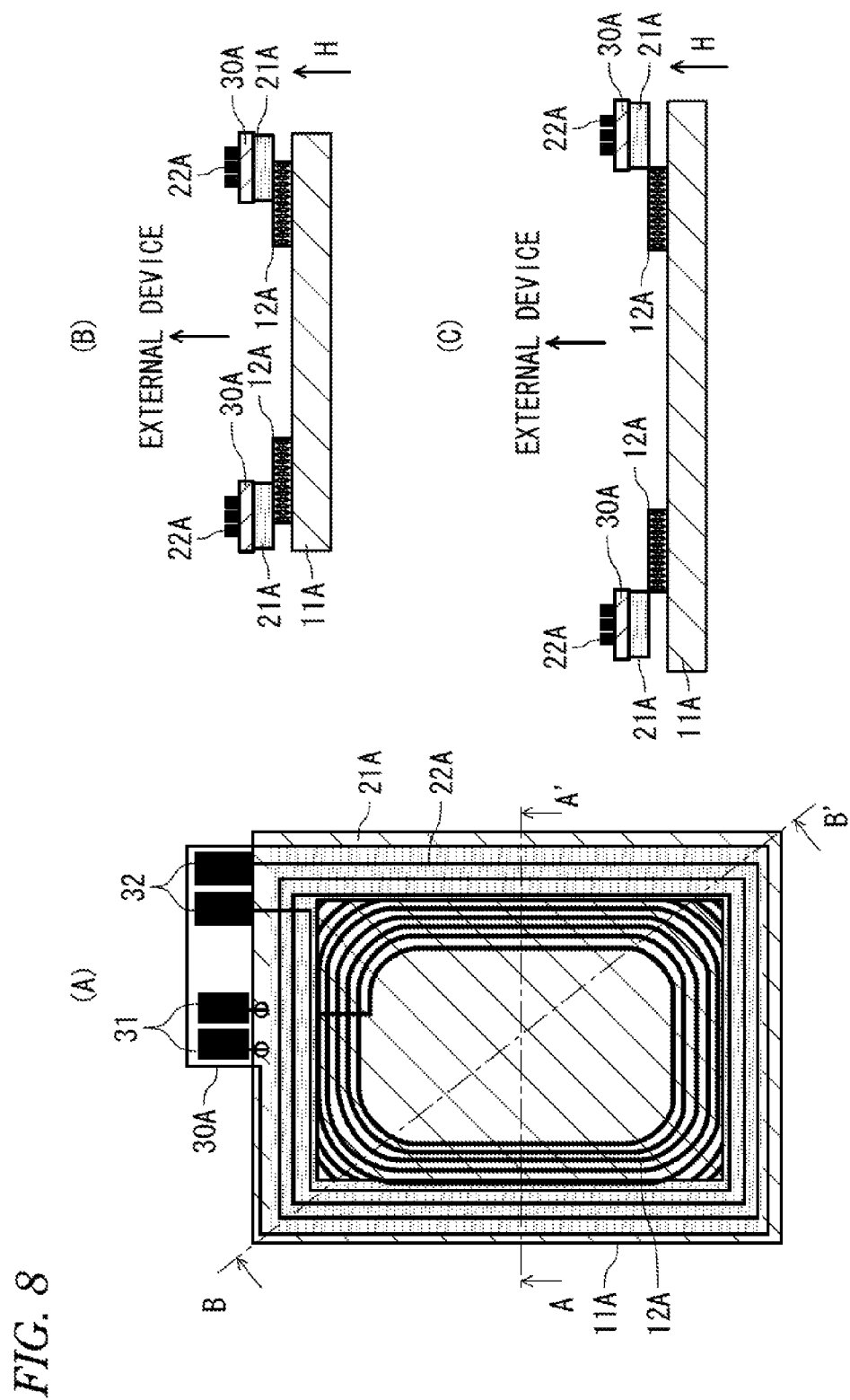

FIG. 8 is a diagram illustrating the structure of a coil unit according to a second embodiment of the invention. Section (A) of FIG. 8 is a plan view illustrating the coil unit, Section (B) of FIG. 8 is a cross-sectional view illustrating the coil unit taken along the line A-A' of Section (A) of FIG. 8, and Section (C) of FIG. 8 is a cross-sectional view illustrating the coil unit taken along the line B-B' of Section (A) of FIG. 8.

Figure 9:
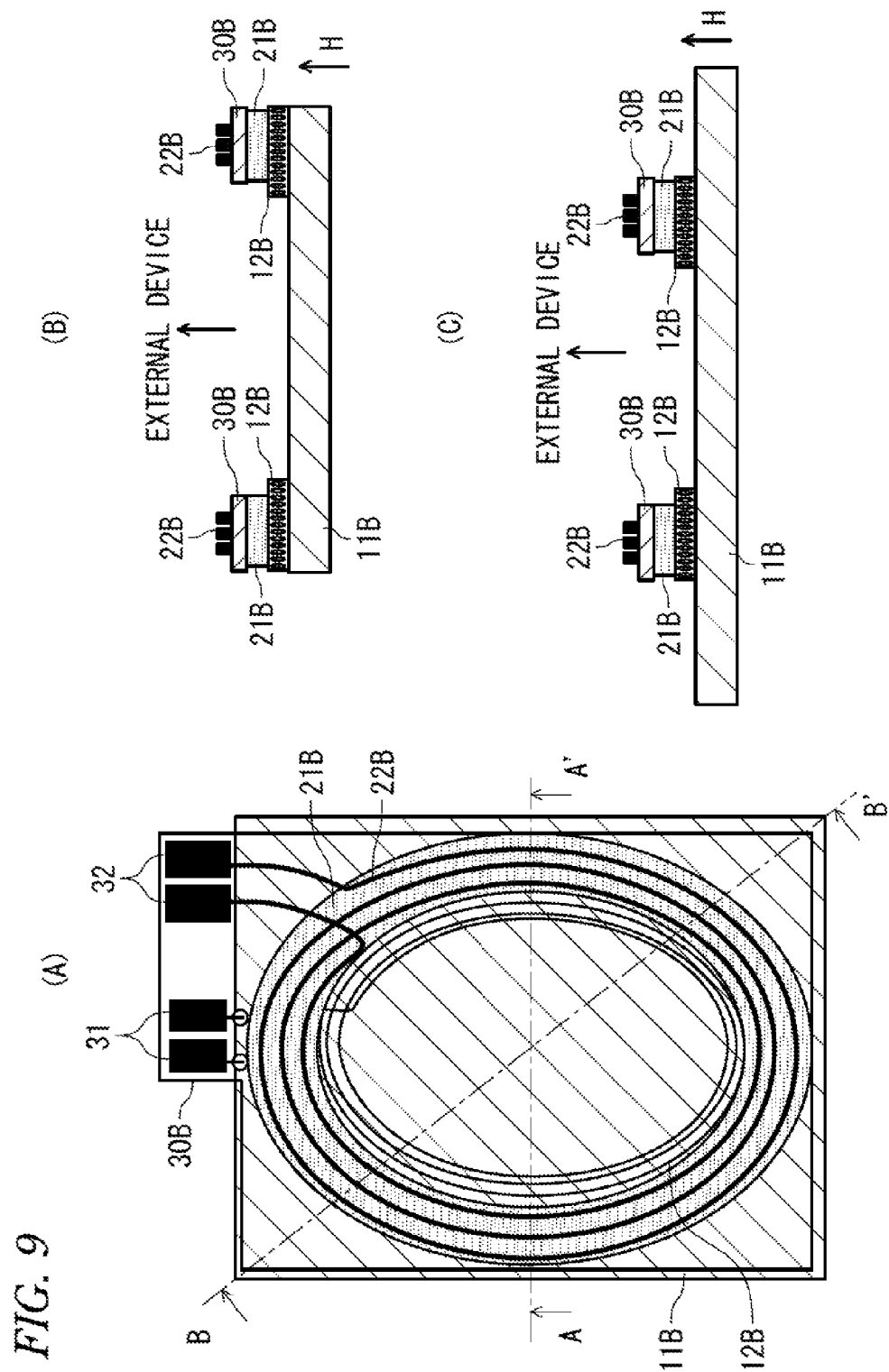

FIG. 9 is a diagram illustrating the structure of a coil unit according to a third embodiment of the invention. Section (A) of FIG. 9 is a plan view illustrating the coil unit, Section (B) of FIG. 9 is a cross-sectional view illustrating the coil unit taken along the line A-A' of Section (A) of FIG. 9, and Section (C) of FIG. 9 is a cross-sectional view illustrating the coil unit taken along the line B-B' of Section (A) of FIG. 9.

Figure 10:
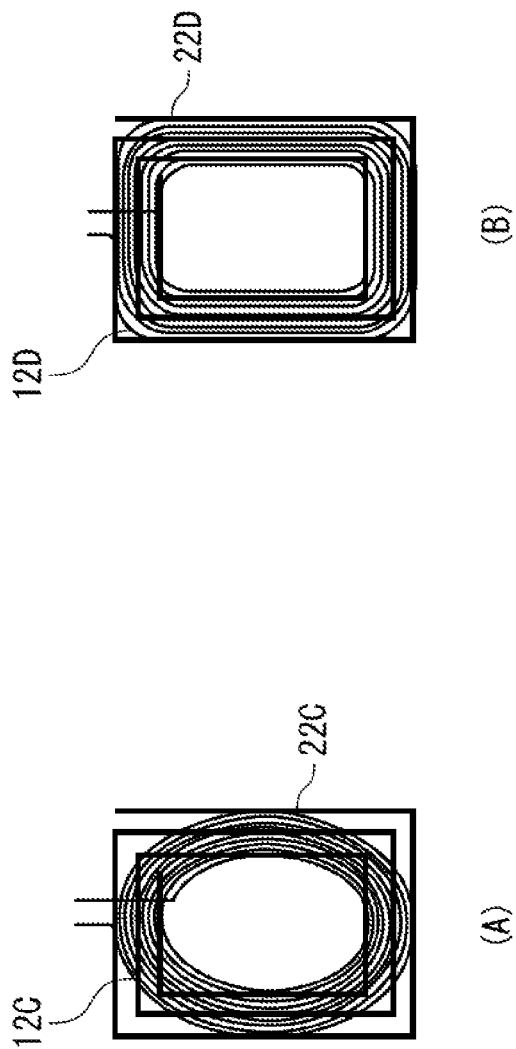
Figure 11:
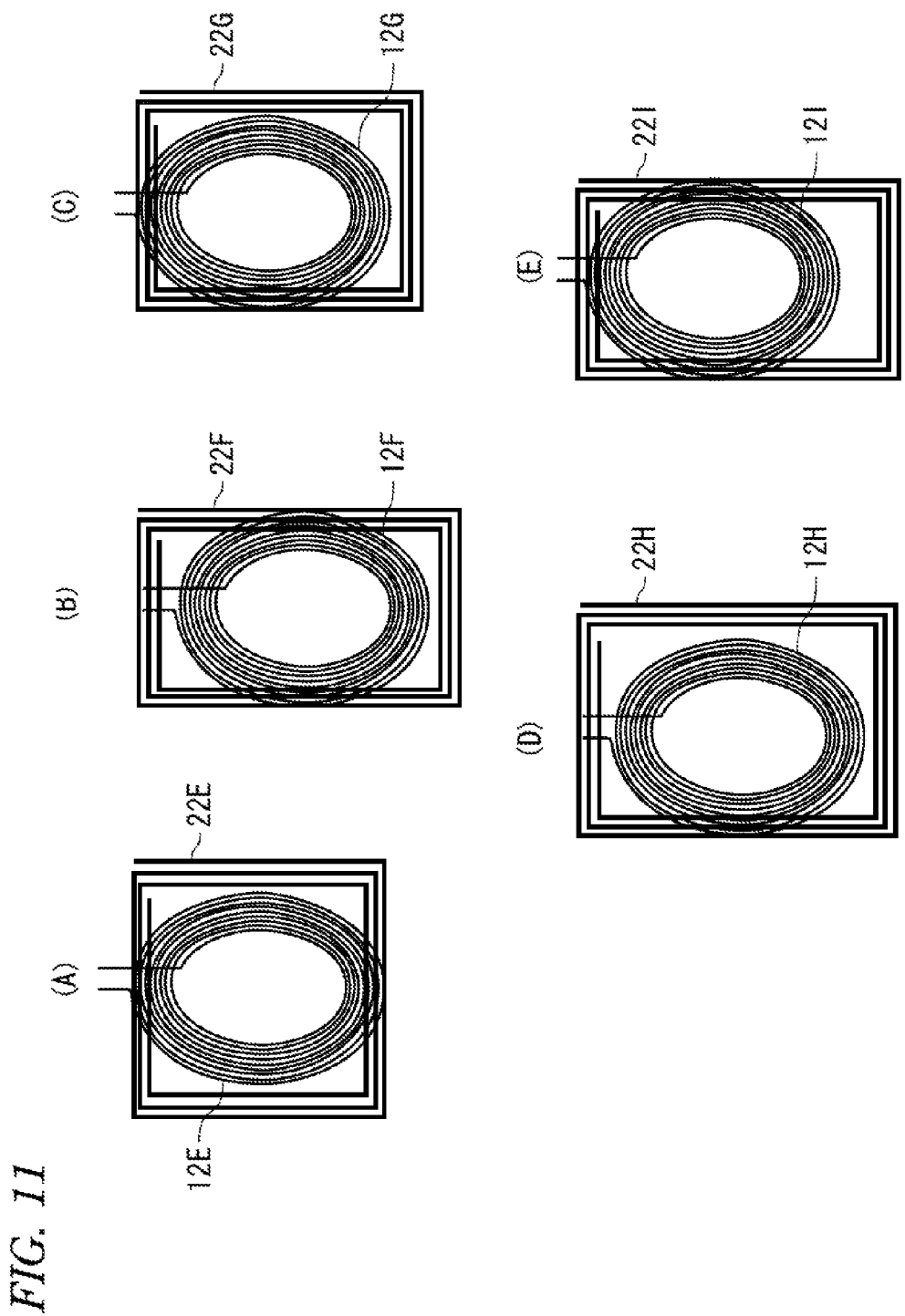

Sections (A) and (B) of FIG. 10 are diagrams illustrating modifications in which a first coil and a second coil have the same inside diameter and the same outward shape. Sections (A) to (E) of FIG. 11 are diagrams illustrating modifications in which the arrangement of two coils is changed when the first coil has an elliptical ring shape and the second coil has a rectangular ring shape.

Figure 12:
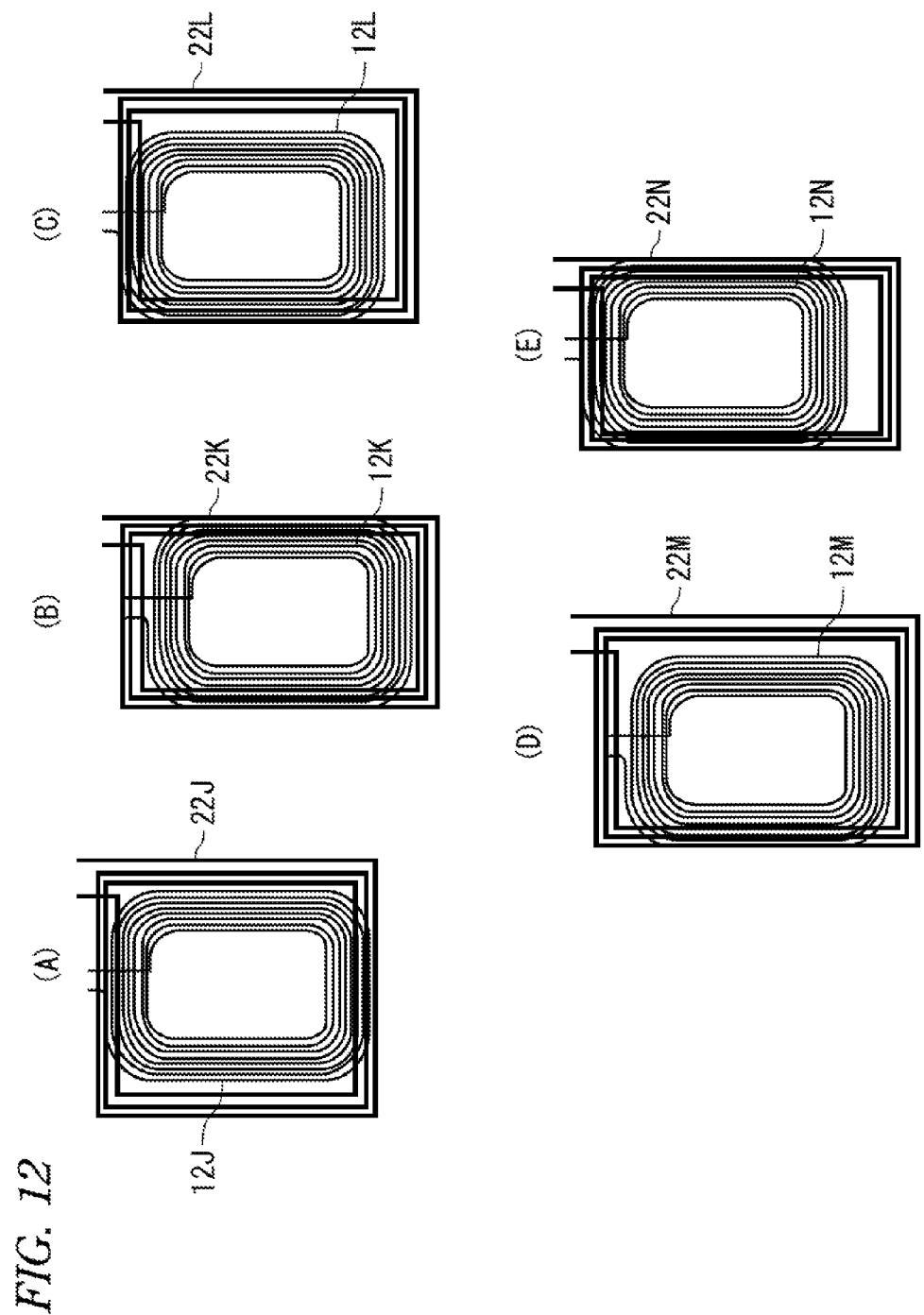

Sections (A) to (E) of FIG. 12 are diagrams illustrating modifications in which the arrangement of two coils is changed when the first coil has a rectangular ring shape with rounded corners and the second coil has a rectangular ring shape.

Figure 13:
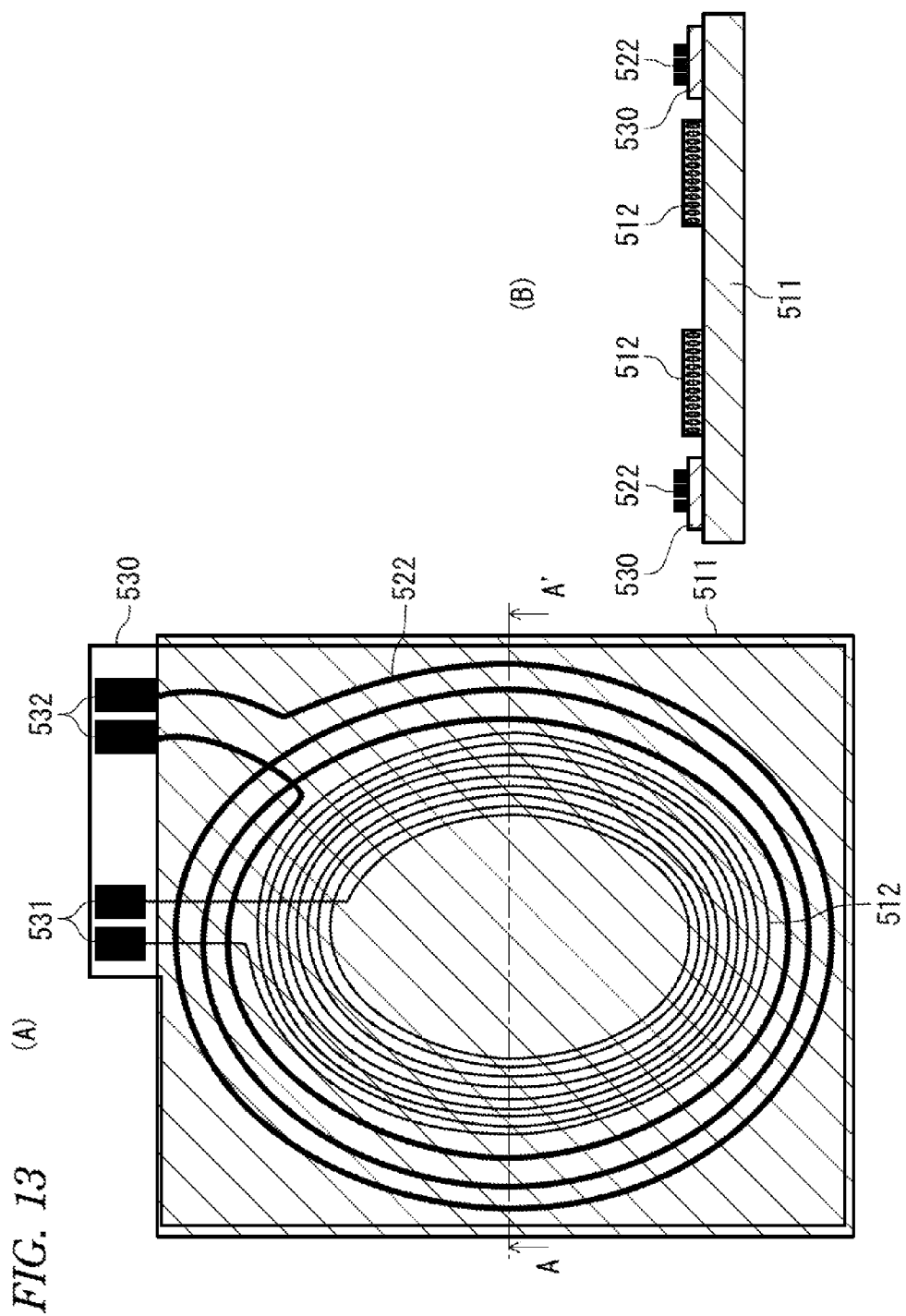

FIG. 13 is a diagram illustrating the structure of a coil unit according to a comparative embodiment. Section (A) of FIG. 13 is a plan view illustrating the coil unit and Section (B) of FIG. 13 is a cross-sectional view illustrating the coil unit taken along the line A-A' of Section (A) of FIG. 13.

Figure 14:
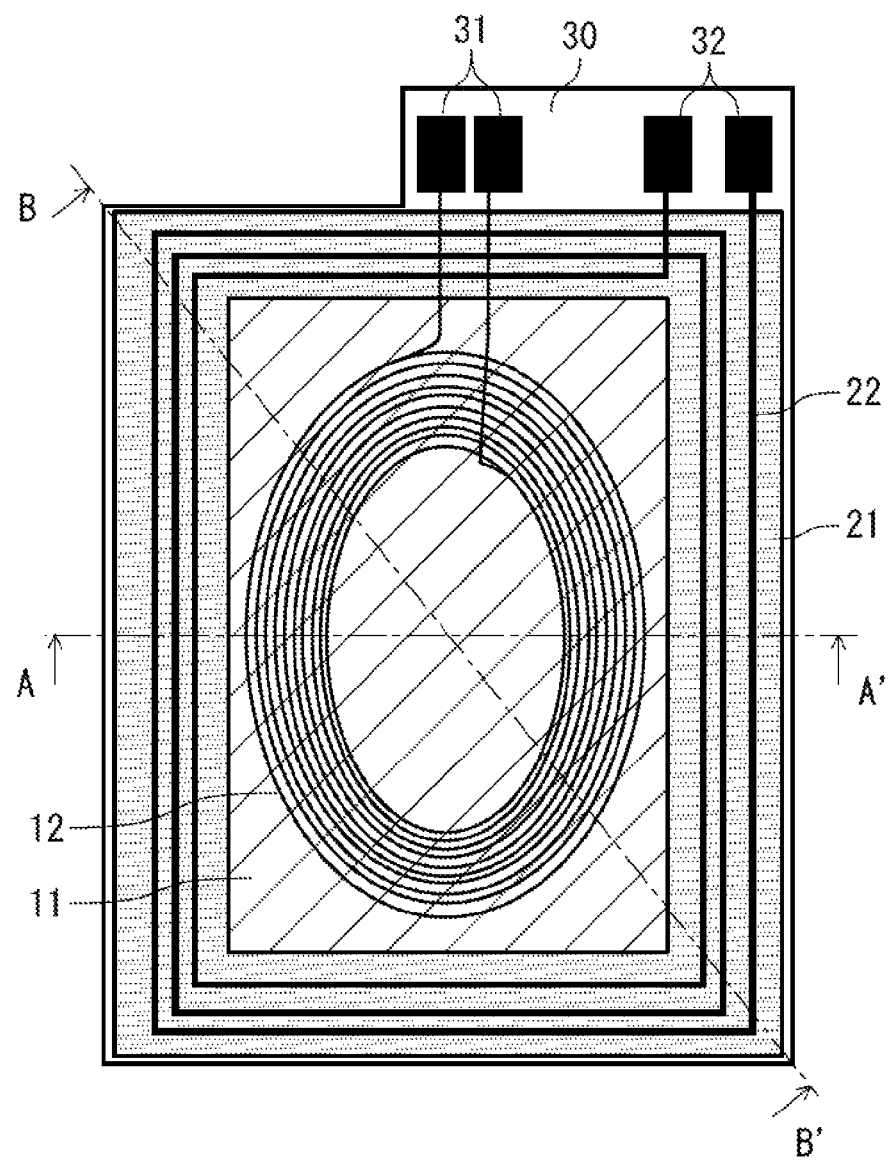

FIG. 14 is a plan view illustrating the structure of a coil unit according to a fourth embodiment.

FIG. 15 is a cross-sectional view illustrating the coil unit according to the fourth embodiment. Section (A) of FIG. 15 is a cross-sectional view illustrating the coil unit taken along the line A-A' of FIG. 14, Section (B) of FIG. 15 is a cross-sectional view illustrating the coil unit taken along the line B-B' of FIG. 14, Section (C) of FIG. 15 is an enlarged view illustrating an example of a region C shown in Section (A) of FIG. 15, and Section (D) of FIG. 15 is an enlarged view illustrating another example of the region C shown in Section (A) of FIG. 15.

Section (A) of FIG. 16 is a diagram illustrating a magnetic field distribution of the coil unit at the position (the position of Section (A) of FIG. 15) of the cross-section taken along the line A-A' of FIG. 14 when a first coil operates and Section (B) of FIG. 16 is a diagram illustrating a magnetic field distribution of the coil unit at the position (the position of Section (A) of FIG. 15) of the cross-section taken along the line A-A' of FIG. 14 when a second coil operates.

Section (A) of FIG. 17 is a diagram illustrating a magnetic field distribution of the coil unit at the position (the position of Section (B) of FIG. 15) of the cross-section taken along the line B-B' of FIG. 14 when the first coil operates and Section (B) of FIG. 17 is a diagram illustrating a magnetic field distribution of the coil unit at the position (the position of Section (B) of FIG. 15) of the cross-section taken along the line B-B' of FIG. 14 when the second coil operates.

Figure 18:
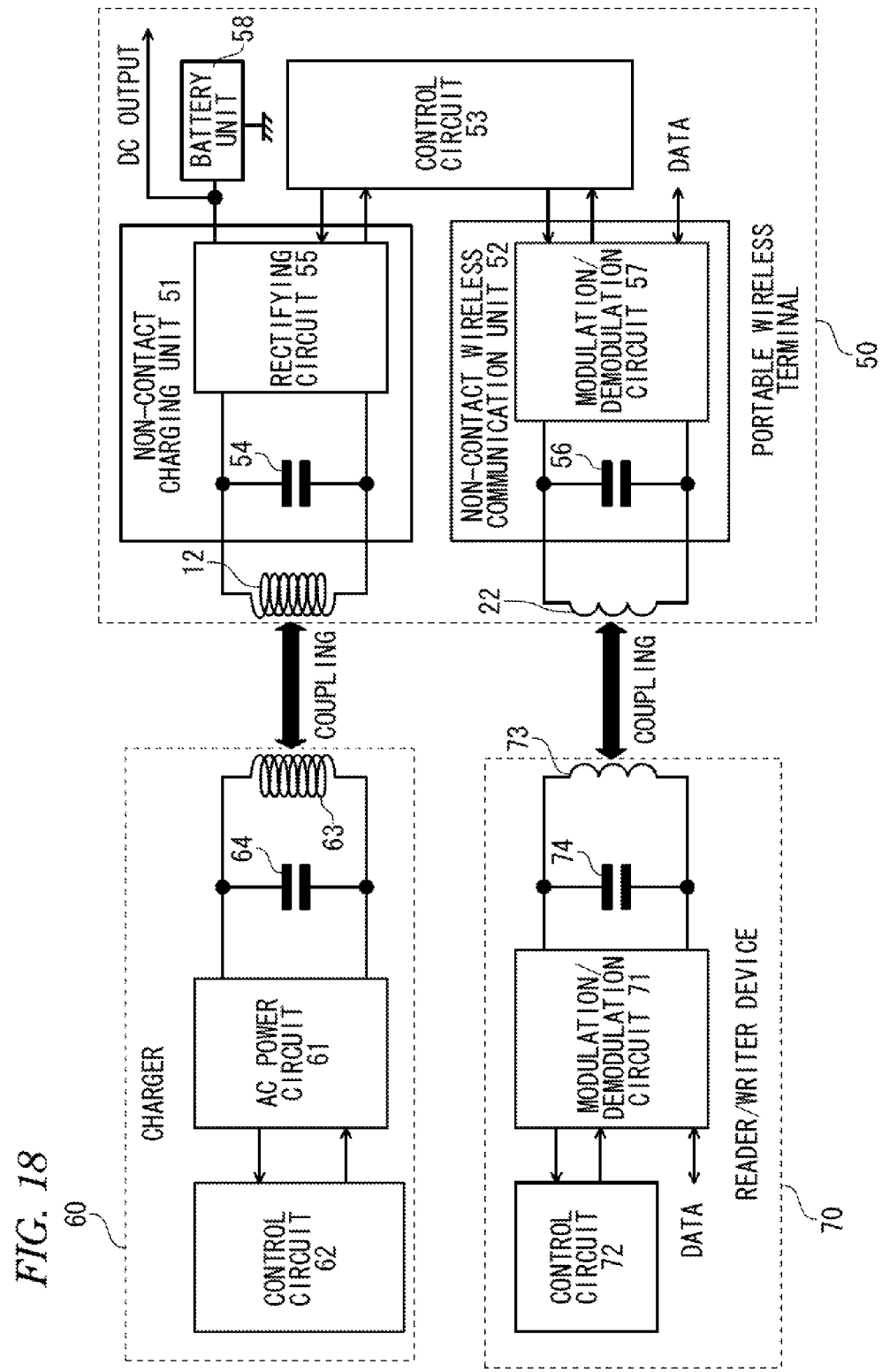

FIG. 18 is a block diagram illustrating the structure of a portable wireless terminal including the coil unit according to this embodiment, a charger which is an external device, and a reader/writer device.

Figure 19:
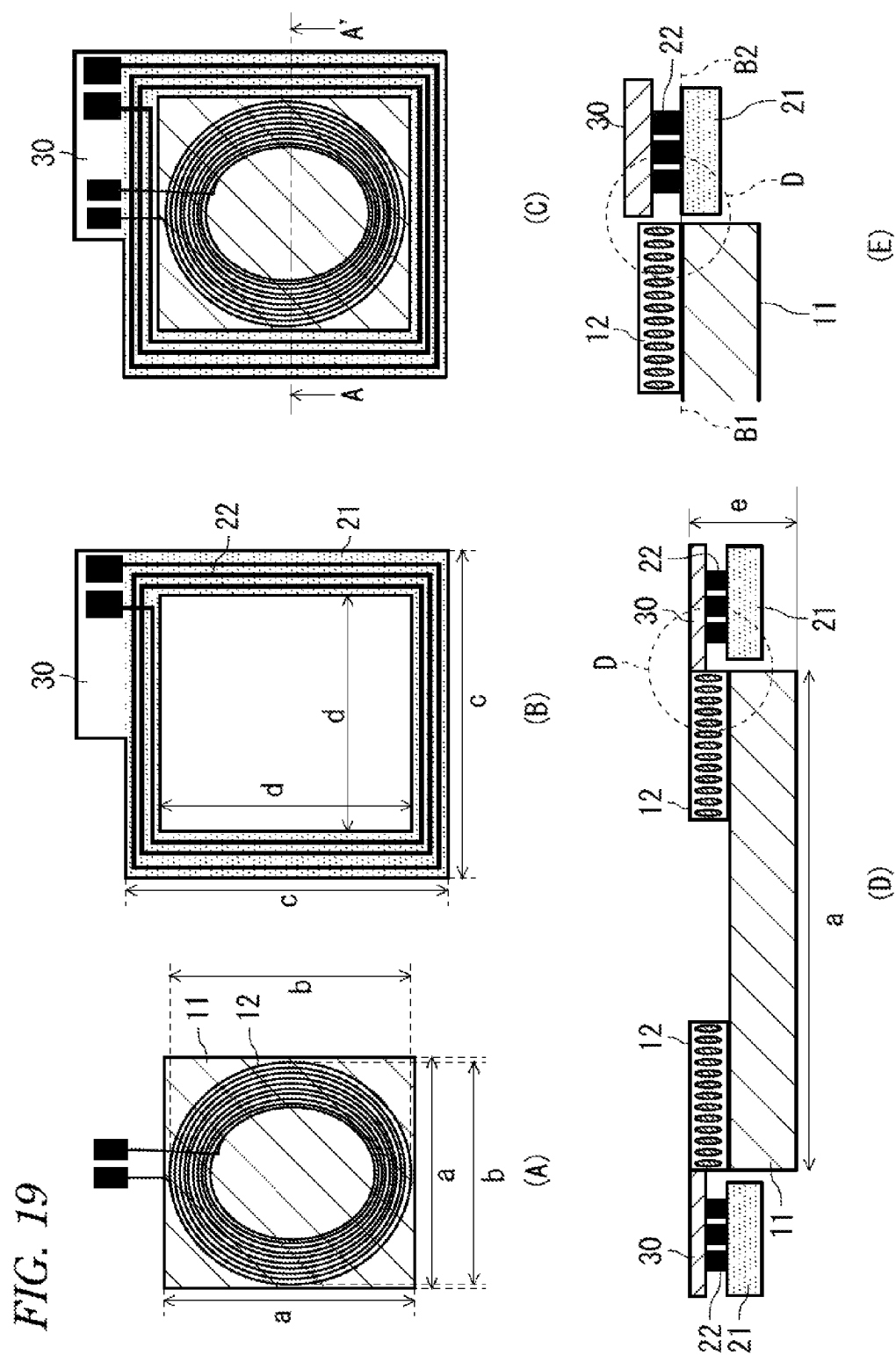

Sections (A) and (B) of FIG. 19 are diagrams illustrating an example of the dimensions of a coil unit according to an example, Section (C) of FIG. 19 is a plan view illustrating the coil unit according to the example, Section (D) of FIG. 19 is a cross-sectional view illustrating the coil unit taken along the line A-A' of Section (C) of FIG. 19, and Section (E) of FIG. 19 is an enlarged view illustrating a region D shown in Section (D) of FIG. 19.

Section (A) of FIG. 20 is a diagram illustrating the measurement result when power transmission efficiency during non-contact power transmission is measured as the performance of the coil unit according to the example and Section (B) of FIG. 20 is a diagram illustrating the measurement result when the maximum communication distance during non-contact wireless communication is measured as the performance of the coil unit according to the example.

Figure 21:
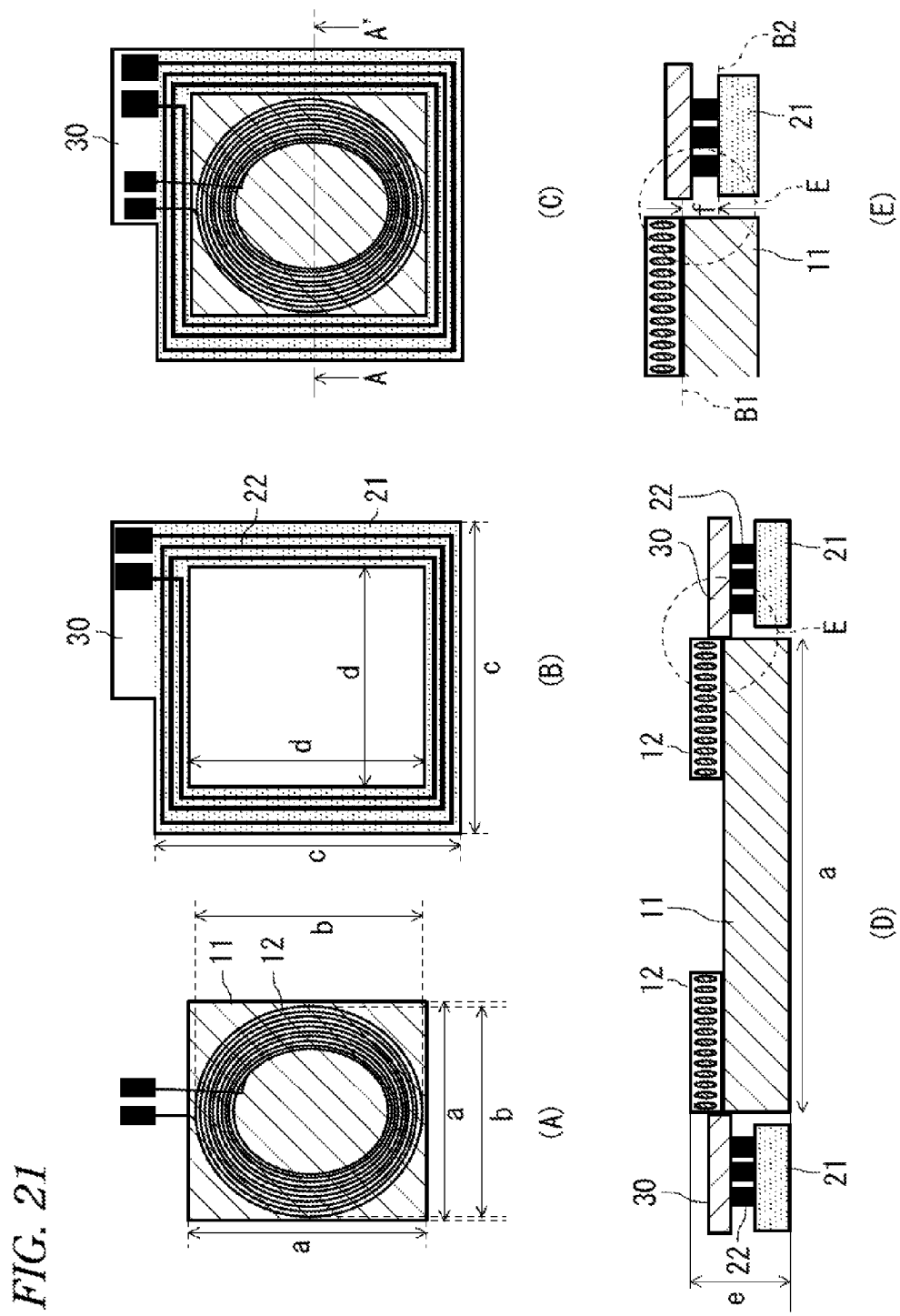

Sections (A) and (B) of FIG. 21 are diagrams illustrating an example of the dimensions of a coil unit according to a comparative embodiment, Section (C) of FIG. 21 is a plan view illustrating the coil unit according to the comparative embodiment, Section (D) of FIG. 21 is a cross-sectional view illustrating the coil unit taken along the line A-A' of Section (C) of FIG. 21, and Section (E) of FIG. 21 is an enlarged view illustrating a region E shown in Section (D) of FIG. 21.

Section (A) of FIG. 22 is a diagram illustrating the measurement result when power transmission efficiency during non-contact power transmission is measured as the performance of the coil unit according to the comparative embodiment and Section (B) of FIG. 22 is a diagram illustrating the measurement result when the maximum communication distance during non-contact wireless communication is measured as the performance of the coil unit according to the comparative embodiment.

Figure 23:
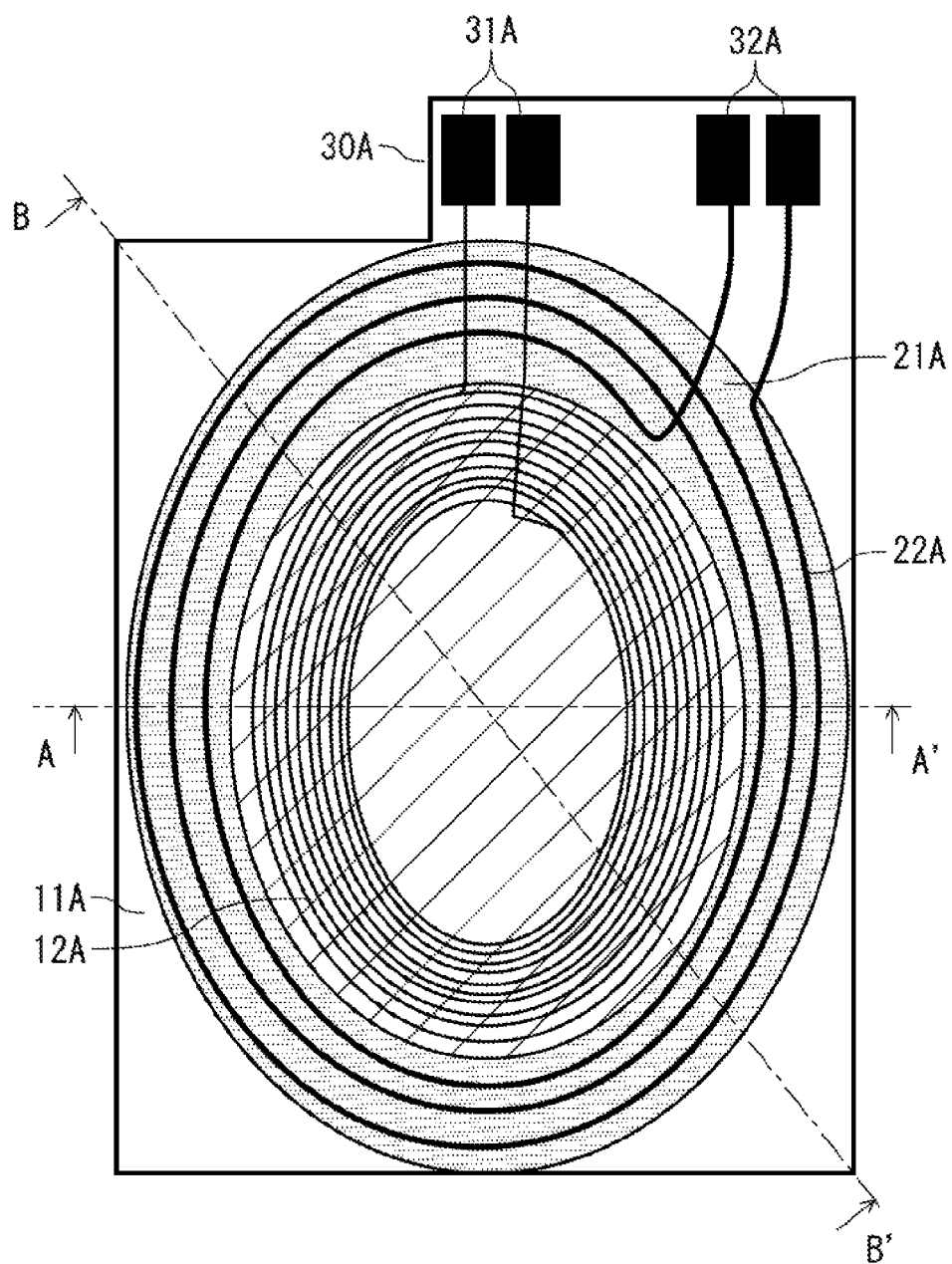

FIG. 23 is a plan view illustrating the structure of a coil unit according to a fifth embodiment.

Figure 24:
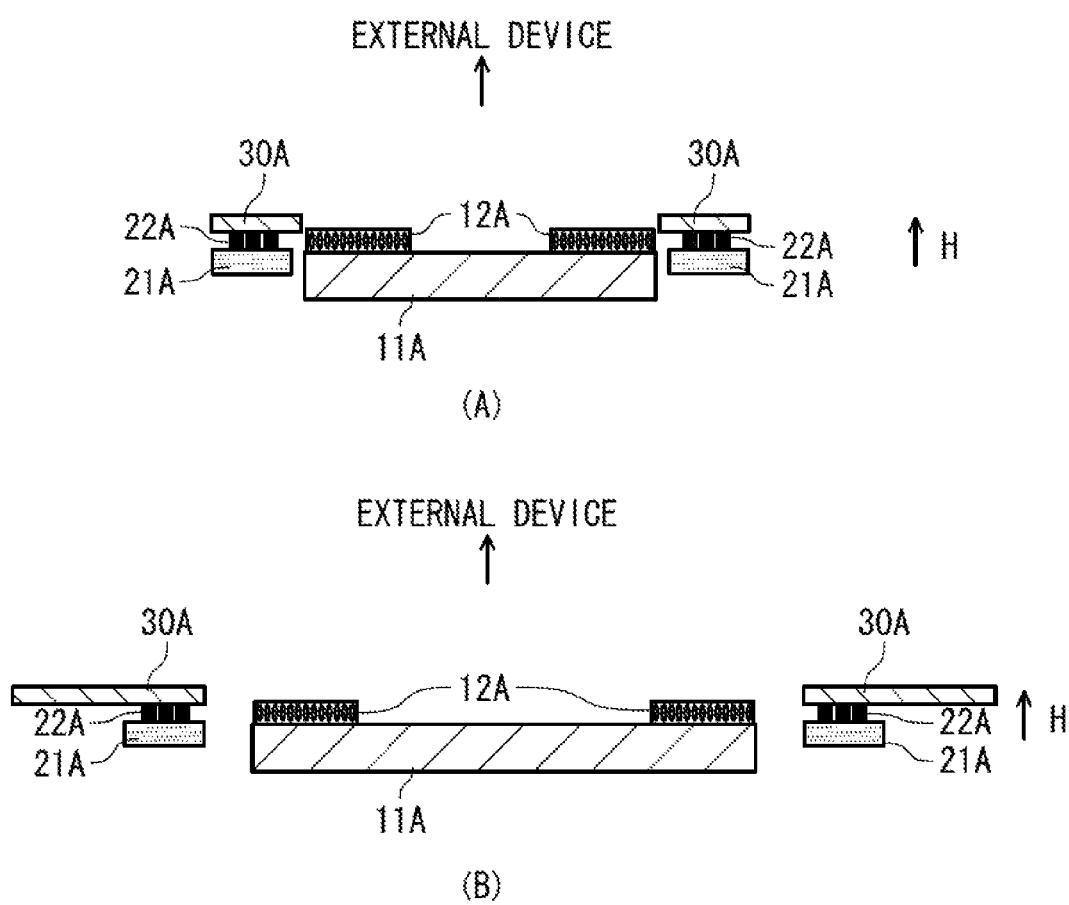

Section (A) of FIG. 24 is a cross-sectional view illustrating the coil unit taken along the line A-A' of FIG. 23 and Section (B) of FIG. 24 is a cross-sectional view illustrating the coil unit taken along the line B-B' of FIG. 23.

Figure 25:
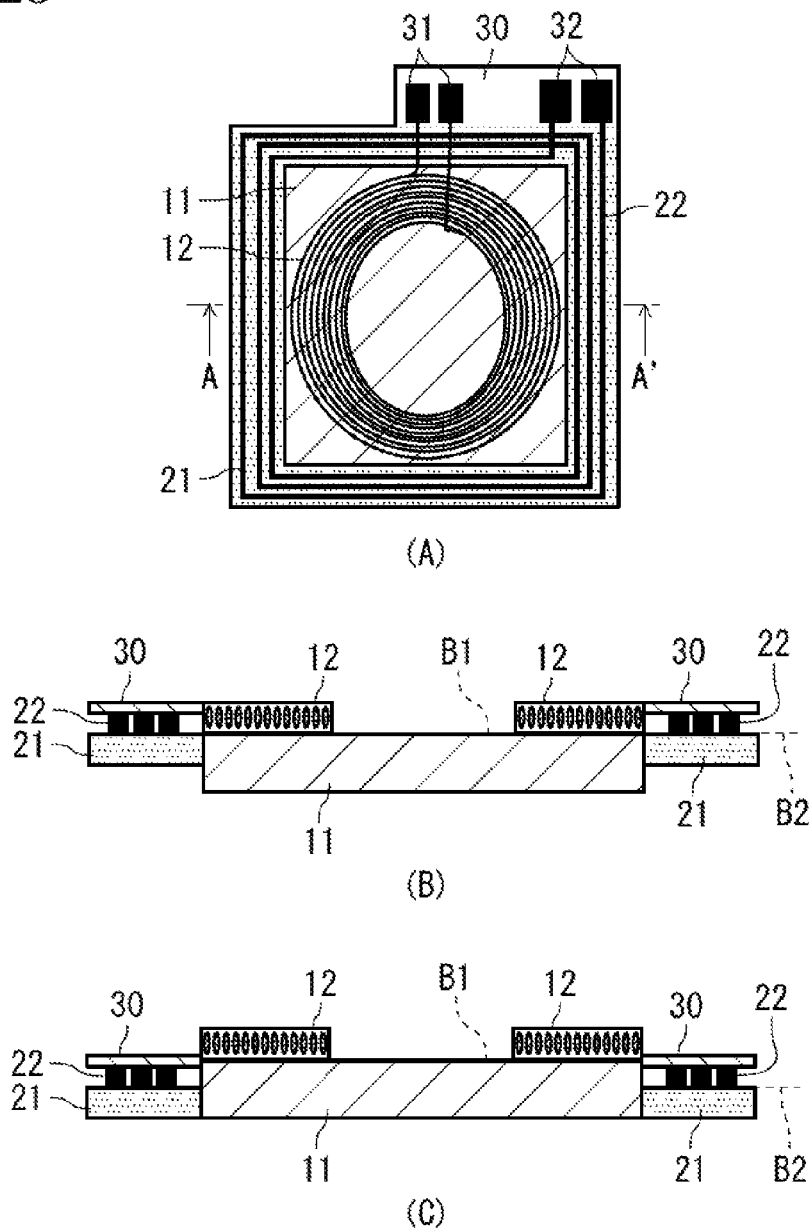

FIG. 25 is a diagram illustrating a change in the communication performance of a second coil 22 when the position of a second magnetic body 21 varies in the thickness of the coil. Section (A) of FIG. 25 is a plan view illustrating the structure of the coil unit according to the fourth embodiment, Section (B) of FIG. 25 is a cross-sectional view illustrating the coil unit taken along the line A-A' of Section (C) of FIG. 19, Section (C) of FIG. 25 a cross-sectional view illustrating the coil unit taken along the line A-A' of Section (C) of FIG. 21, and Section (D) of FIG. 25 is a diagram illustrating the comparison result of the communication performance of the second coil 22 between a state in which the position of the second magnetic body 21 varies in a direction in which the communication performance is improved in the thickness direction of the coil and a state in which the position varies in a direction in which the communication performance is reduced.

FIG. 26 is a diagram illustrating the structure of a coil unit according to a sixth embodiment. Section (A) of FIG. 26 is a plan view illustrating the structure of the coil unit and Sections (B) and (C) of FIG. 26 are cross-sectional views illustrating the coil unit taken along the line A-A' of section (A) of FIG. 26.

Figure 27:
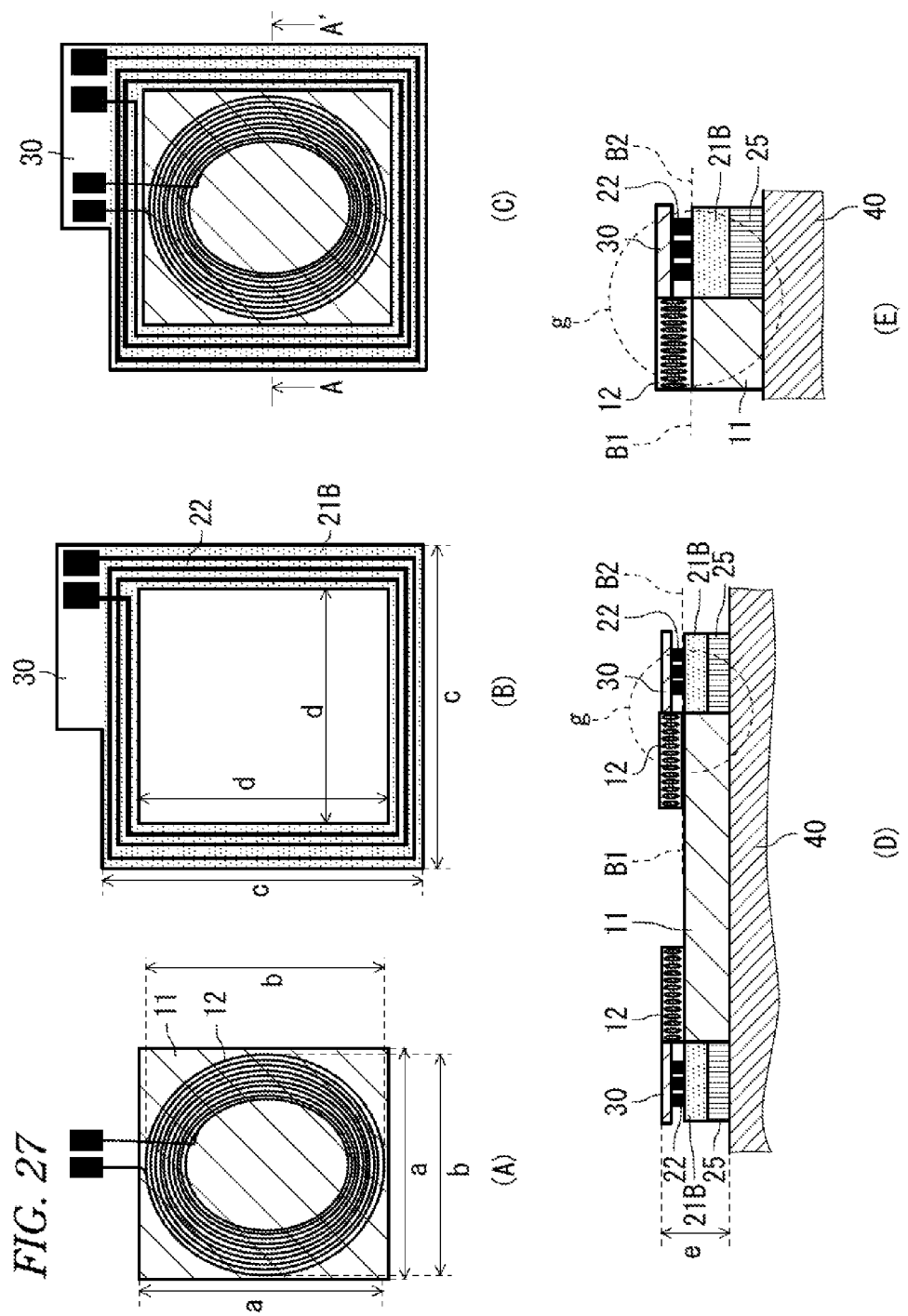

FIG. 27 is a diagram illustrating the structure of a coil unit according to Example 1 in which a spacer 25 is arranged so as to come into contact with the bottom (lower surface) of a second magnetic body 21B. Sections (A) and (B) of FIG. 27 are diagrams illustrating an example of the dimensions of the coil unit according to Example 1, Section (C) of FIG. 27 is a plan view illustrating the coil unit according to Example 1, Section (D) of FIG. 27 is a cross-sectional view illustrating the coil unit taken along the line A-A' of Section (C) of FIG. 27, and Section (E) of FIG. 27 is an enlarged view illustrating a region g shown in Section (D) of FIG. 27.

Figure 28:
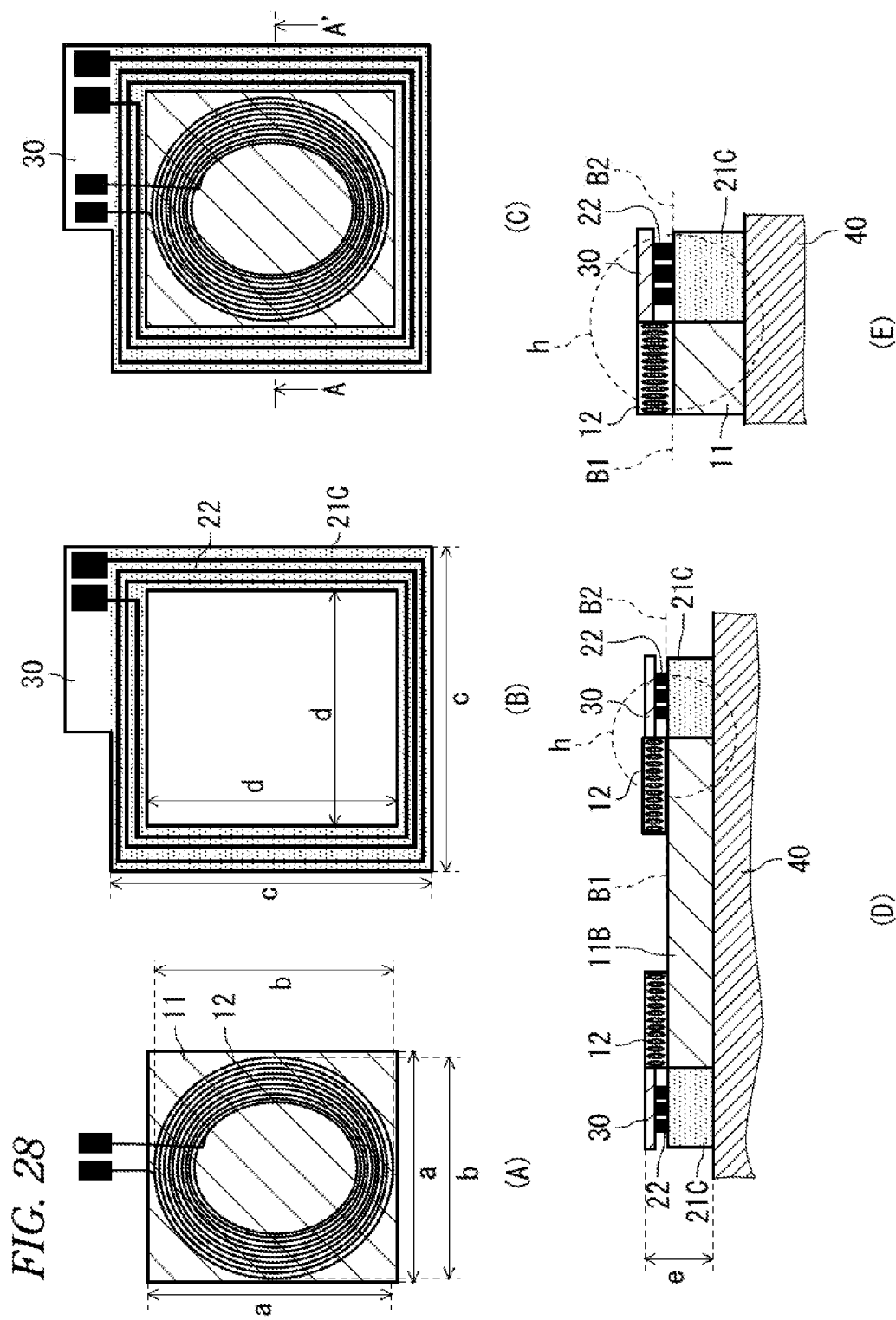

FIG. 28 is a diagram illustrating the structure of a coil unit according to Example 2 in which the thickness of a second magnetic body 21C is substantially equal to that of a first magnetic body 11. Sections (A) and (B) of FIG. 28 are diagrams illustrating an example of the dimensions of the coil unit according to Example 2, Section (C) of FIG. 28 is a plan view illustrating the coil unit according to Example 2, Section (D) of FIG. 28 is a cross-sectional view illustrating the coil unit taken along the line A-A' of Section (C) of FIG. 28, and Section (E) of FIG. 28 is an enlarged view illustrating a region h shown in Section (D) of FIG. 28.

FIG. 29 is a diagram illustrating the measurement result when power transmission efficiency during non-contact power transmission and the maximum communication distance during non-contact wireless communication are measured as the performance of the coil units according to Examples 1 and 2. Section (A) of FIG. 29 shows the measurement result of the power transmission efficiency and Section (B) of FIG. 29 shows the measurement result of the maximum communication distance.

Figure 30:
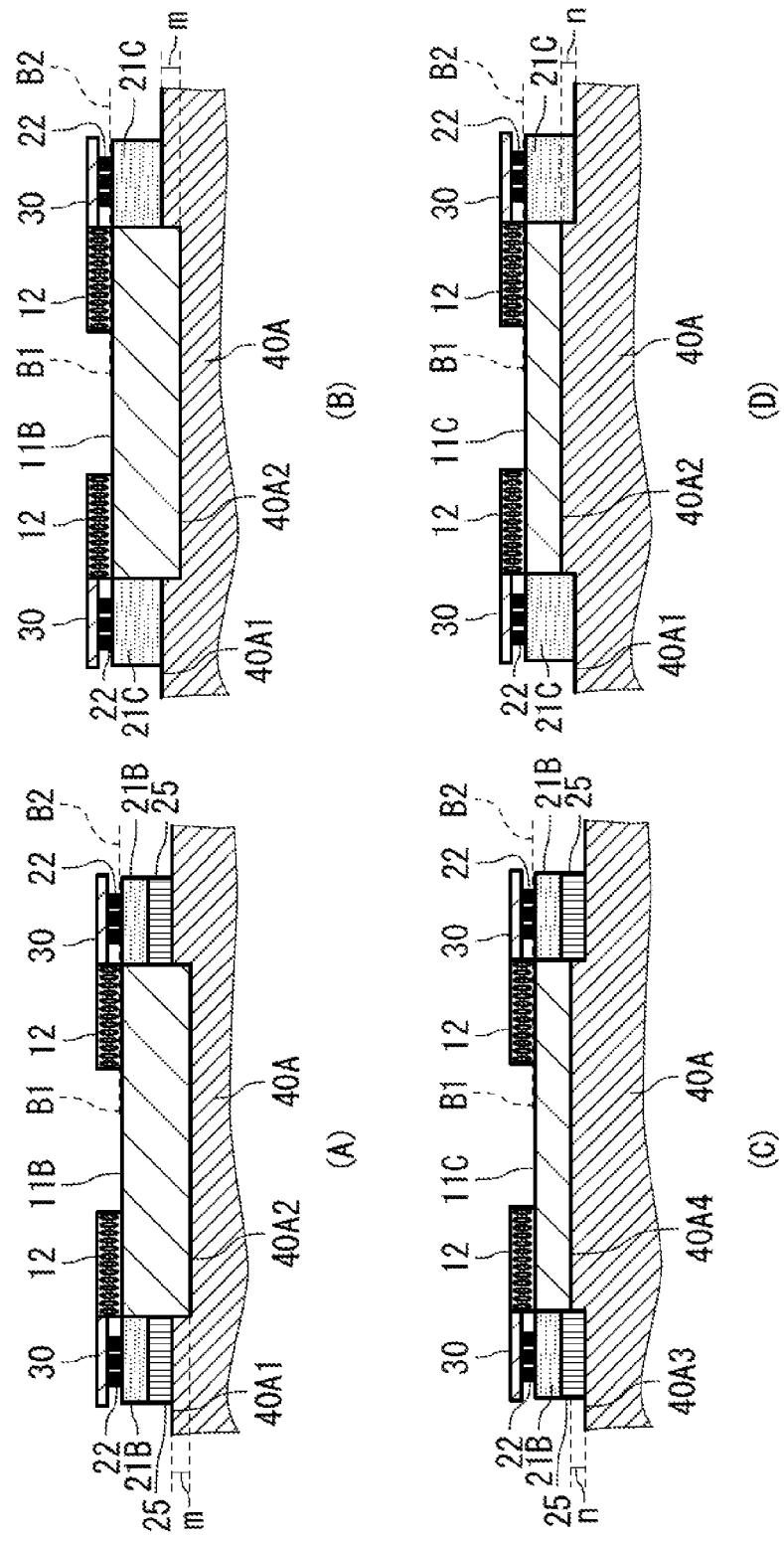

FIG. 30 is a cross-sectional view illustrating the structure of the coil unit when the surface of another member is not a flat surface. Sections (A) and (B) of FIG. 30 are cross-sectional views illustrating a case in which, in the surface of another member 40A, a surface 40A1 which faces a second magnetic body 21B is higher than a surface 40A2 which faces a first magnetic body 11B in the thickness direction of the coil and Sections (C) and (D) of FIG. 30 are cross-sectional views illustrating a case in which, in the surface of another member 40B, a surface 40A3 which faces a second magnetic body 21C is lower than a surface 40A4 which faces a first magnetic body 11C in the thickness direction of the coil.

Figure 31:
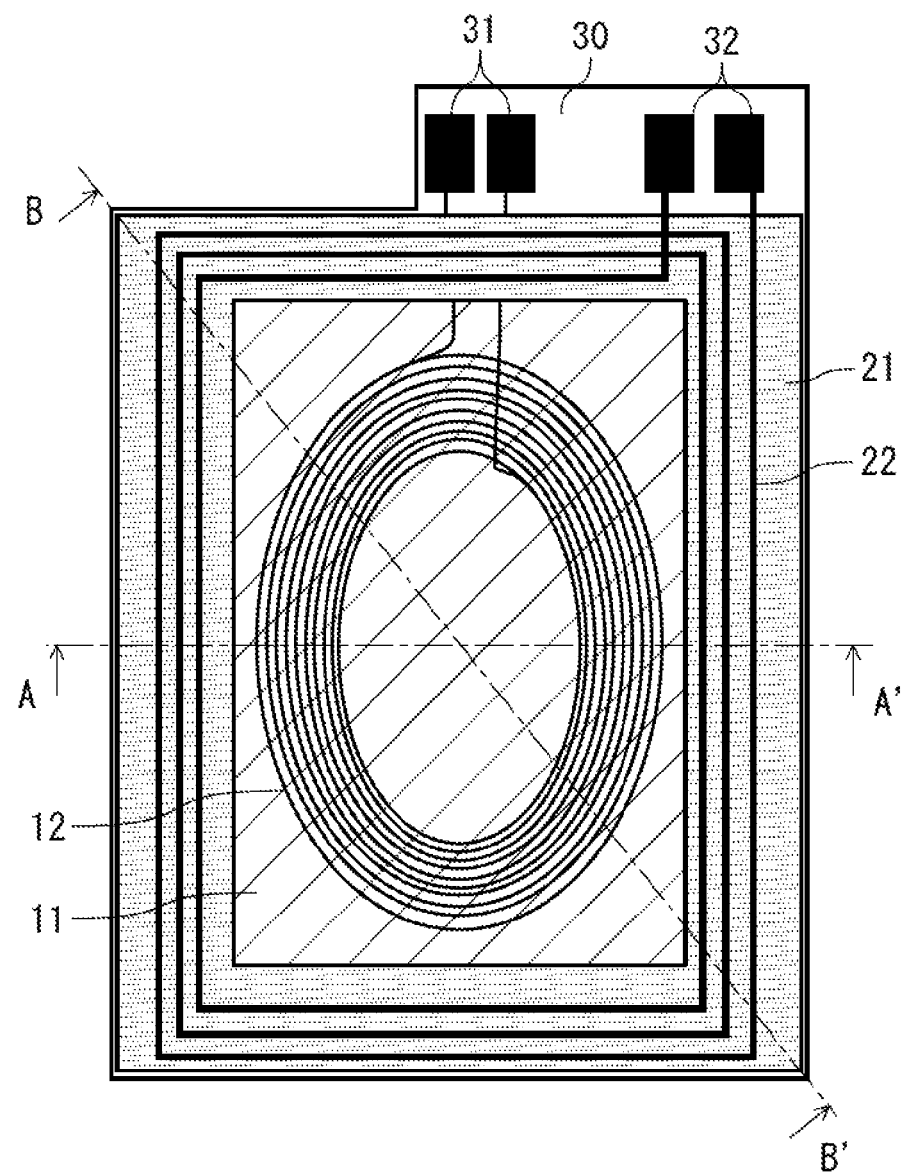

FIG. 31 is a plan view illustrating the structure of a coil unit according to a seventh embodiment.

FIG. 32 is a cross-sectional view illustrating the coil unit according to the seventh embodiment. Section (A) of FIG. 32 is a cross-sectional view illustrating the coil unit taken along the line A-A' of FIG. 31 and Section (B) of FIG. 32 is a cross-sectional view illustrating the coil unit taken along the line B-B' of FIG. 31.

Section (A) of FIG. 33 is a diagram illustrating a magnetic field distribution of the coil unit at the position (the position shown in Section (A) of FIG. 32) of the cross-section taken along the line A-A' of FIG. 31 when a first coil operates and Section (B) of FIG. 33 is a diagram illustrating a magnetic field distribution of the coil unit at the position (the position shown in Section (A) of FIG. 32) of the cross-section taken along the line A-A' of FIG. 31 when a second coil operates.

Section (A) of FIG. 34 is a diagram illustrating a magnetic field distribution of the coil unit at the position (the position shown in Section (B) of FIG. 32) of the cross-section taken along the line B-B' of FIG. 31 when the first coil operates and Section (B) of FIG. 34 is a diagram illustrating a magnetic field distribution of the coil unit at the position (the position shown in Section (B) of FIG. 32) of the cross-section taken along the line B-B' of FIG. 31 when the second coil operates.

Figure 35:
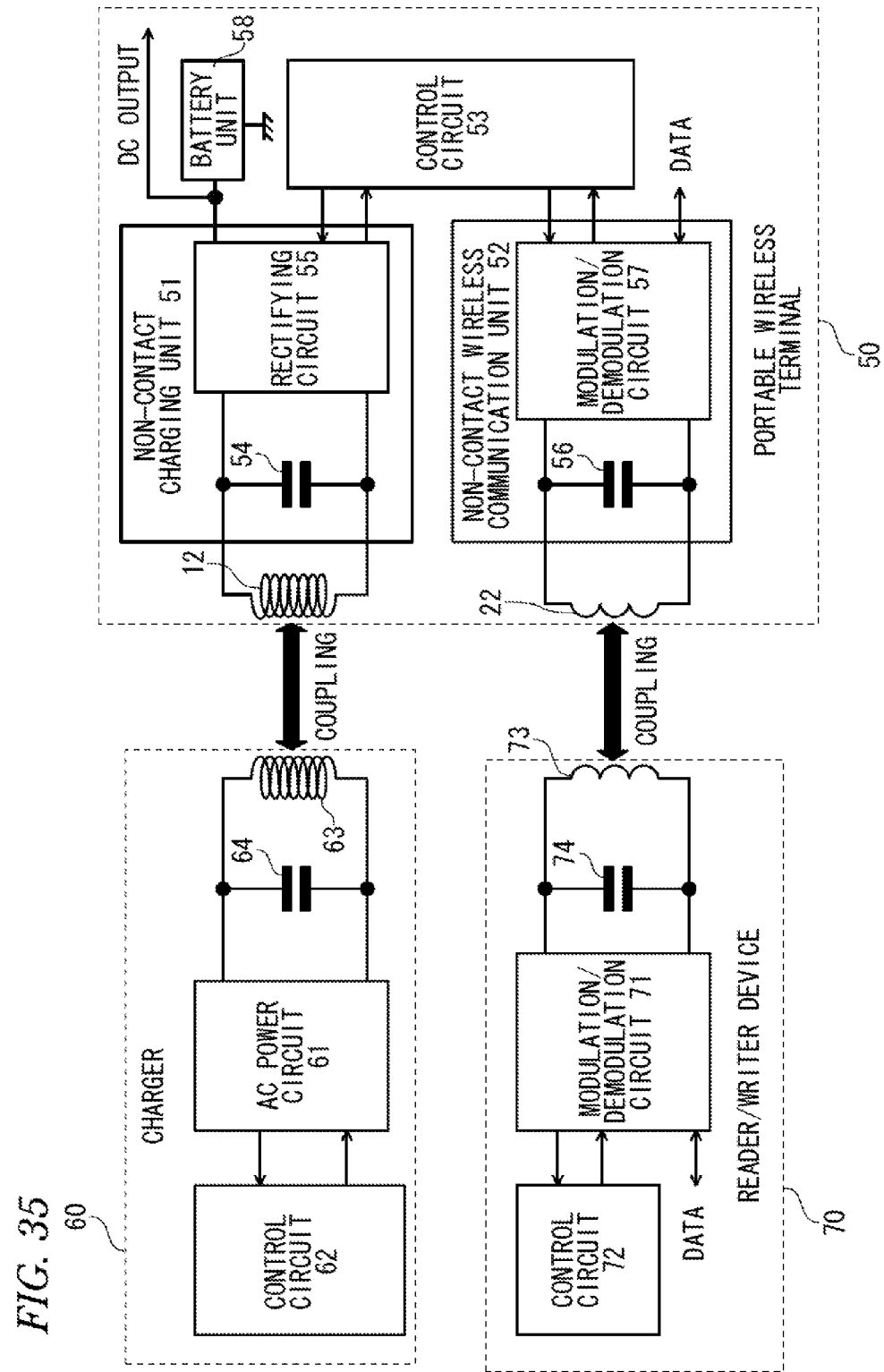

FIG. 35 is a block diagram illustrating the structure of a portable wireless terminal including the coil unit according to this embodiment, a charger which is an external device, and a reader/writer device.

Figure 36:
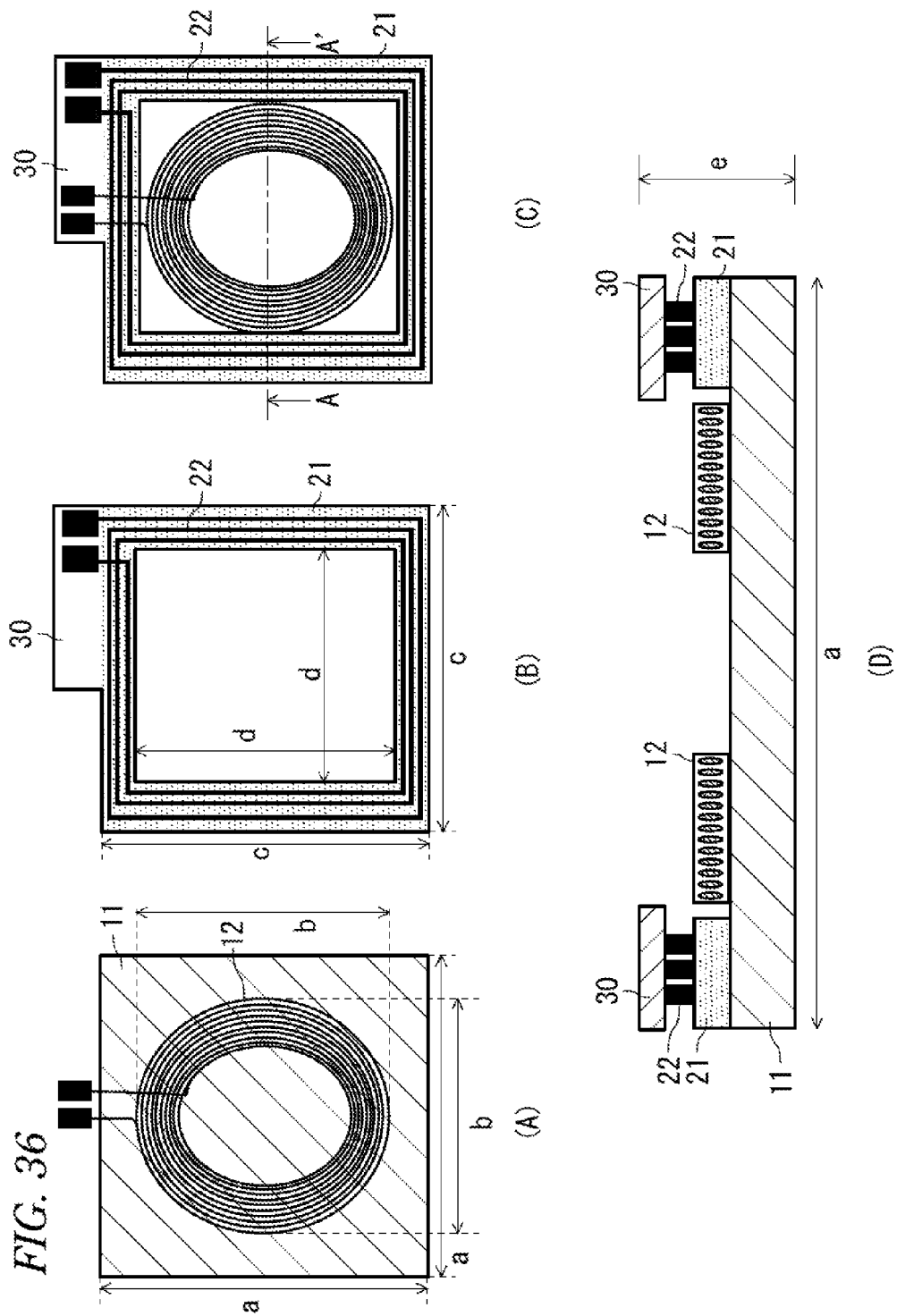

Sections (A) and (B) of FIG. 36 are diagrams illustrating an example of the dimensions of the coil unit according to the example, Section (C) of FIG. 36 is a plan view illustrating the coil unit according to the example, and Section (D) of FIG. 36 is a cross-sectional view illustrating the coil unit taken along the line A-A' of Section (C) of FIG. 36.

Sections (A) of FIG. 37 is a diagram illustrating the measurement result when power transmission efficiency during non-contact power transmission is measured as the performance of the coil unit according to the example and Section (B) of FIG. 37 is a diagram illustrating the measurement result when the maximum communication distance during non-contact wireless communication is measured as the performance of the coil unit according to the example.

Figure 38:
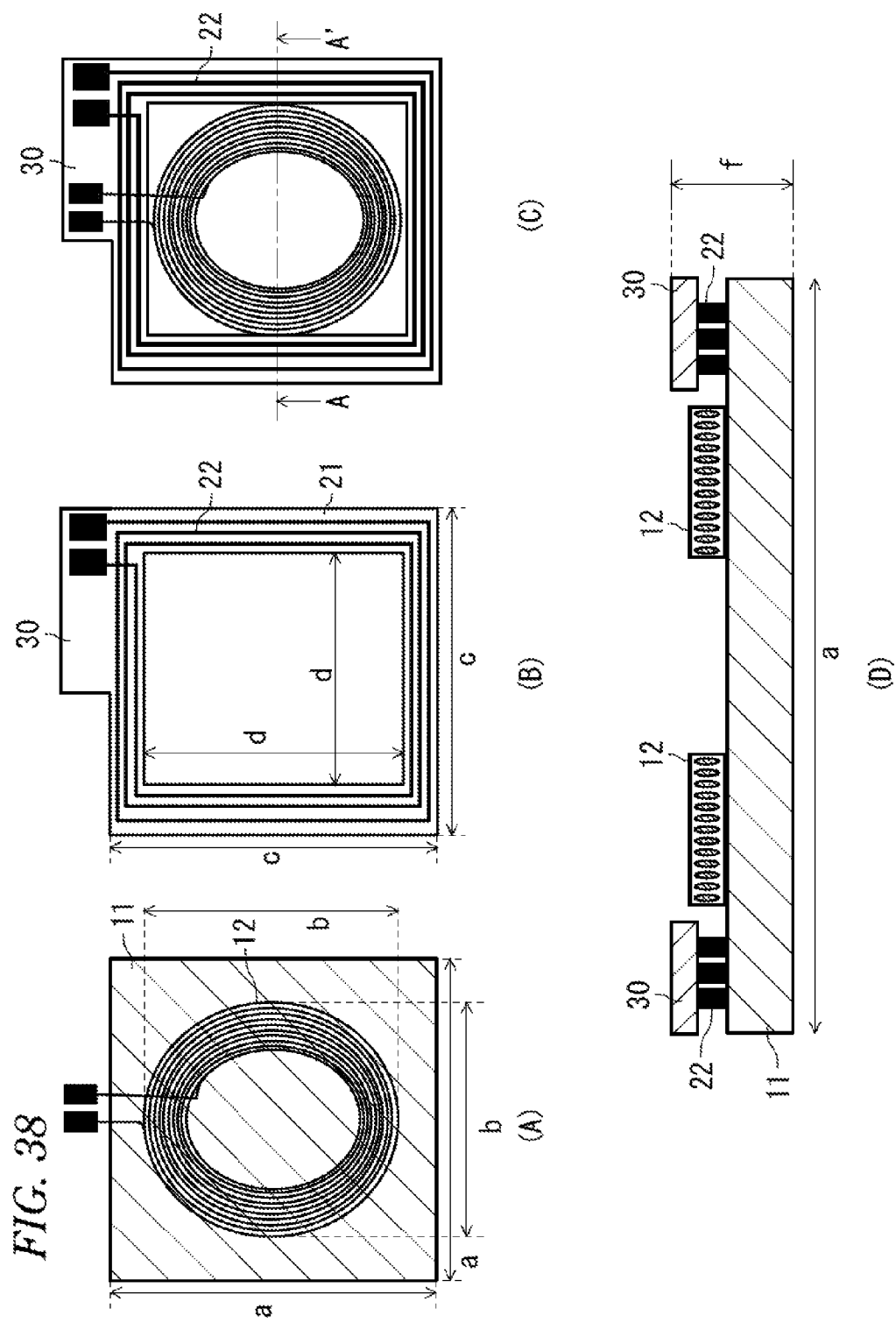

Sections (A) and (B) of FIG. 38 are diagrams illustrating an example of the dimensions of a coil unit according to a comparative embodiment, Section (C) of FIG. 38 is a plan view illustrating the coil unit according to the comparative embodiment, and Section (D) of FIG. 38 is a cross-sectional view illustrating the coil unit taken along the line A-A' of Section (C) of FIG. 38.

Section (A) of FIG. 39 is a diagram illustrating the measurement result when power transmission efficiency during non-contact power transmission is measured as the performance of the coil unit according to the comparative embodiment and Section (B) of FIG. 39 is a diagram illustrating the measurement result when the maximum communication distance during non-contact wireless communication is measured as the performance of the coil unit according to the comparative embodiment.

Figure 40:
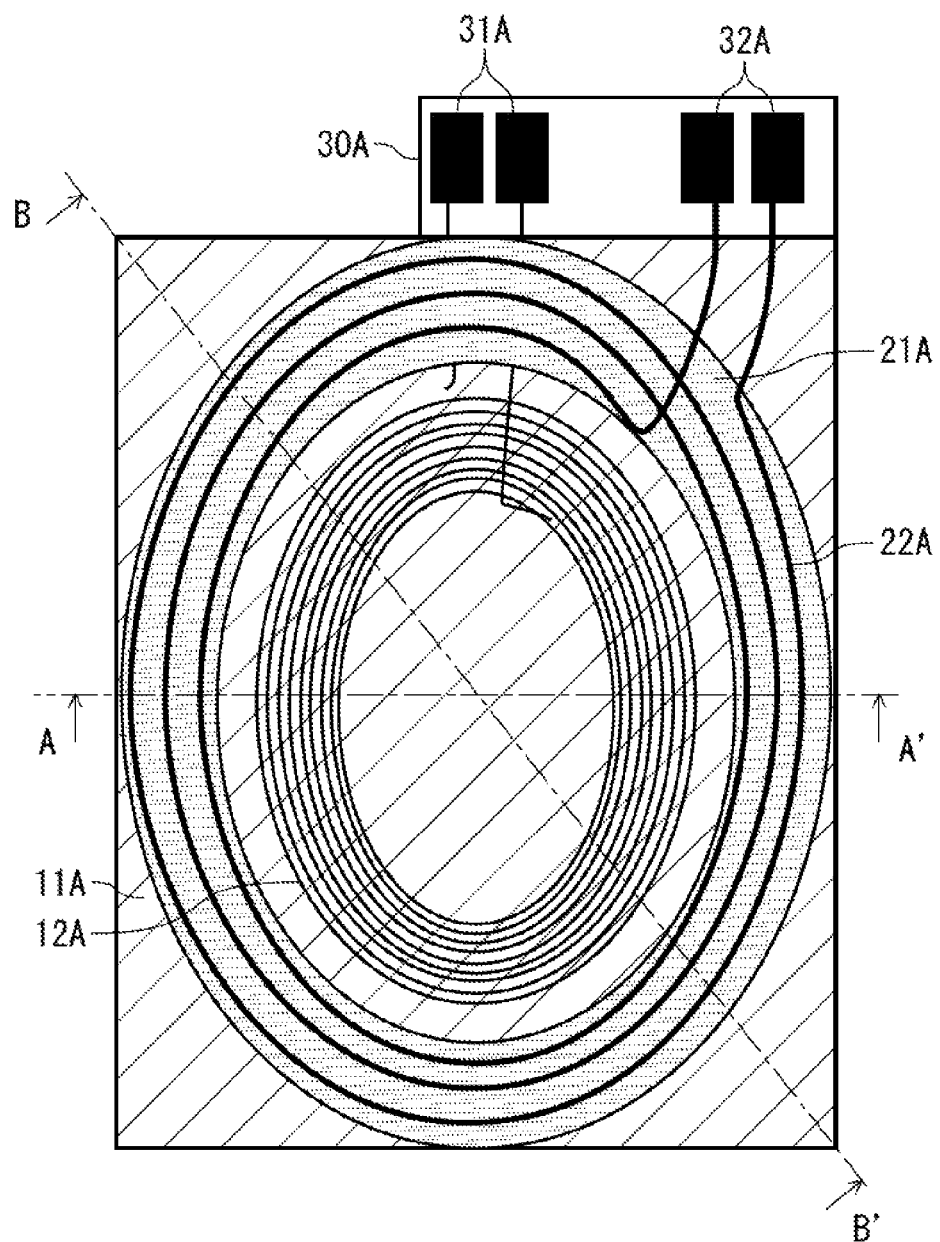

FIG. 40 is a plan view illustrating the structure of a coil unit according to an eighth embodiment.

Section (A) of FIG. 41 is a cross-sectional view illustrating the coil unit taken long the line A-A' of FIG. 40 and Section (B) of FIG. 41 is a cross-sectional view illustrating the coil unit taken long the line B-B' of FIG. 40.

Figure 42:
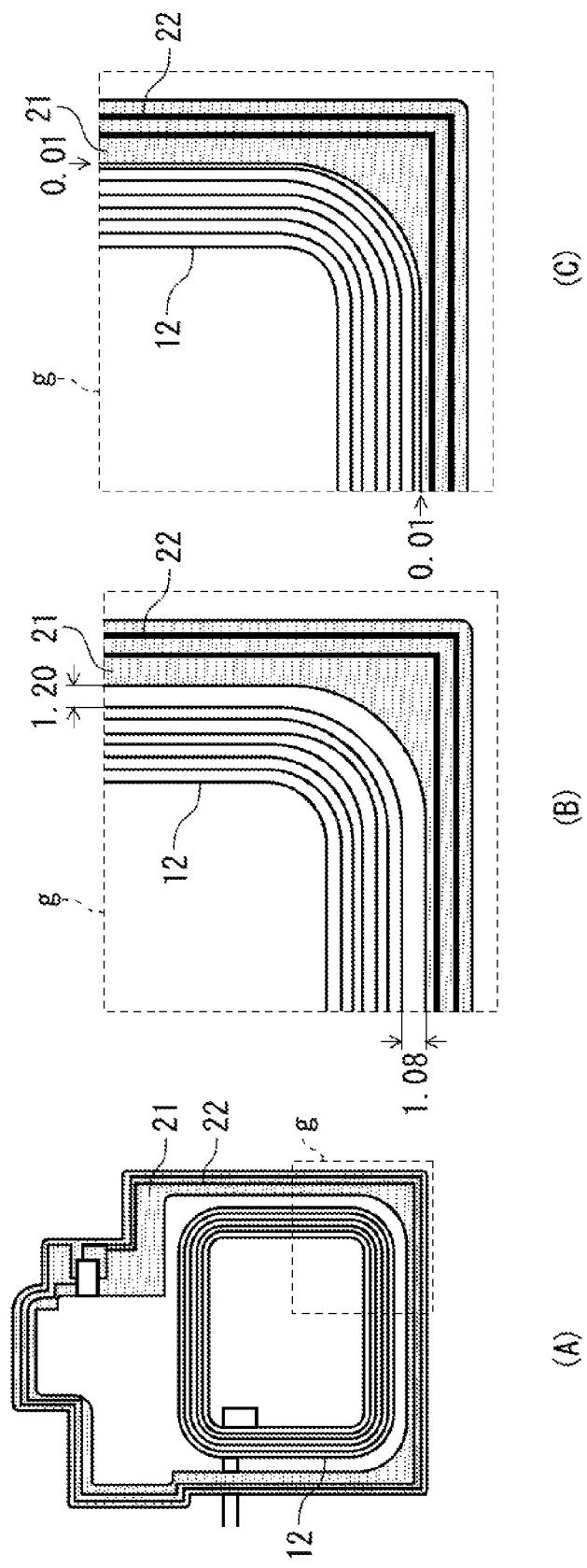

FIG. 42 is a diagram illustrating a gap between a first coil 12 and a second coil 22. Section (A) of FIG. 42 is a plan view illustrating the structure of the coil unit, Section (B) of FIG. 42 is an enlarged view illustrating a region g shown in Section (A) of FIG. 42 when the gap between the first coil 12 and the second coil 22 is proper, and Section (C) of FIG. 42 is an enlarged view illustrating the region g shown in Section (A) of FIG. 42 when the gap between the first coil 12 and the second coil 22 is not proper.

Figure 43:
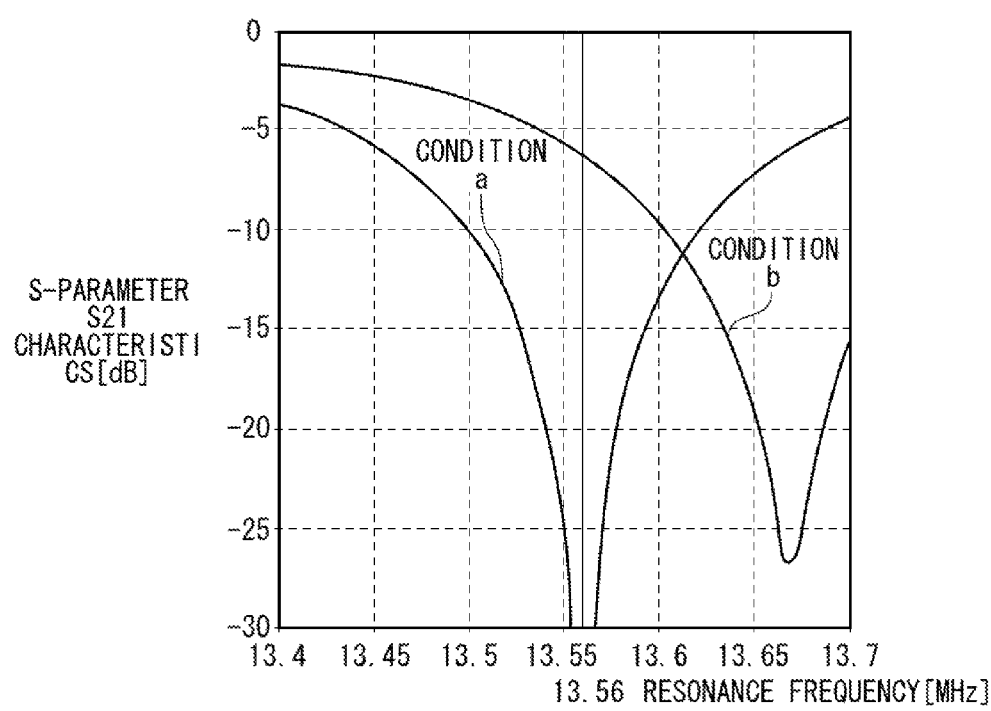

Section (A) of FIG. 43 is a table illustrating the measurement result under conditions a and b and Section (B) of FIG. 43 is a graph illustrating the measurement result under the conditions a and b.

Figure 44:
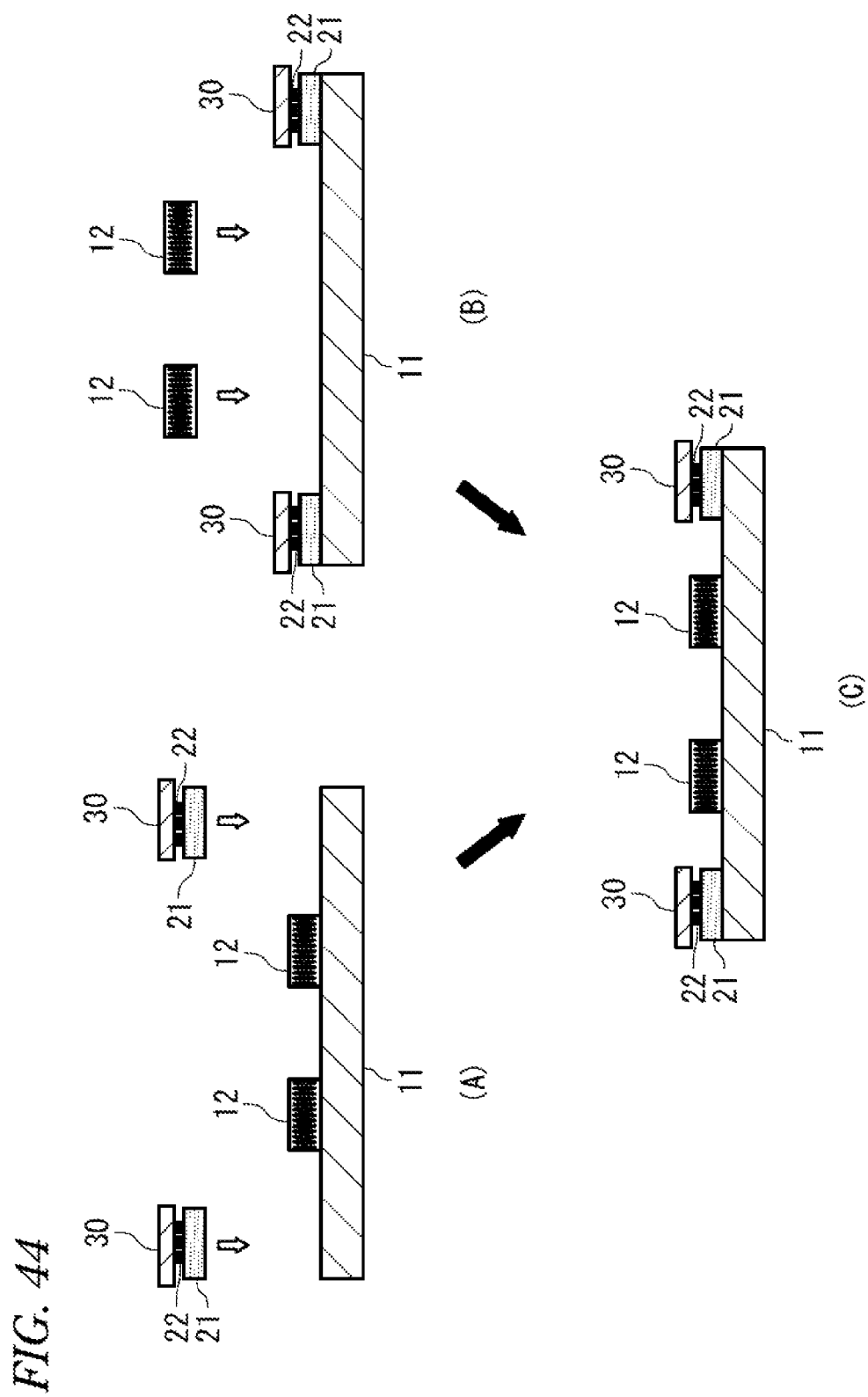

Sections (A) to (C) of FIG. 44 are cross-sectional views illustrating the assembly flow of the coil unit.

Figure 45:
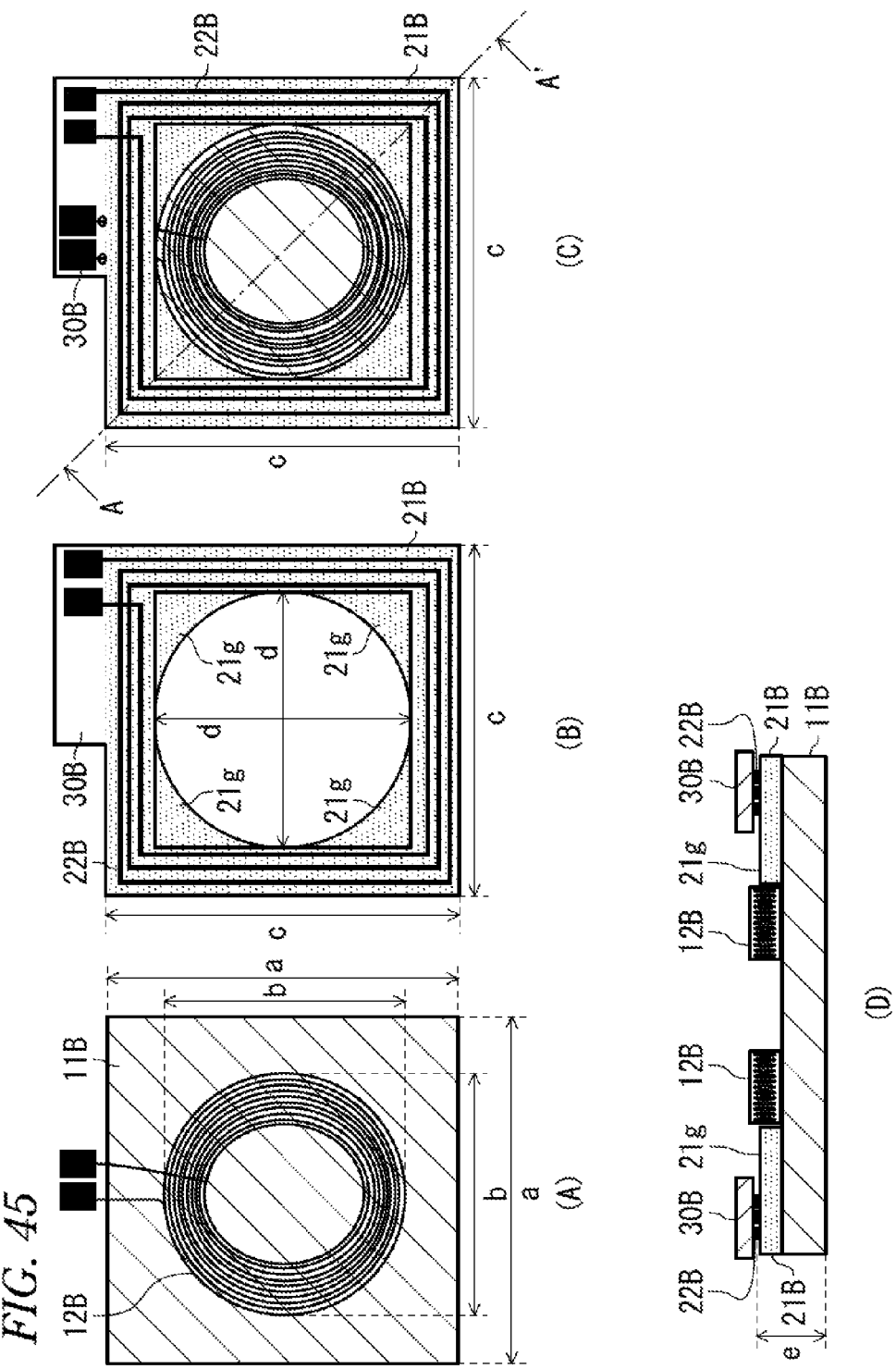

FIG. 45 is a diagram illustrating the structure of a coil unit according to Example 1 when a second magnetic body 21B is also used as a guide member 21g. Sections (A) and (B) of FIG. 45 are diagrams illustrating an example of the dimensions of the coil unit according to Example 1, Section (C) of FIG. 45 is a plan view illustrating the coil unit according to Example 1, and Section (D) of FIG. 45 is a cross-sectional view illustrating the coil unit taken along the line A-A' of Section (C) of FIG. 45.

Figure 46:
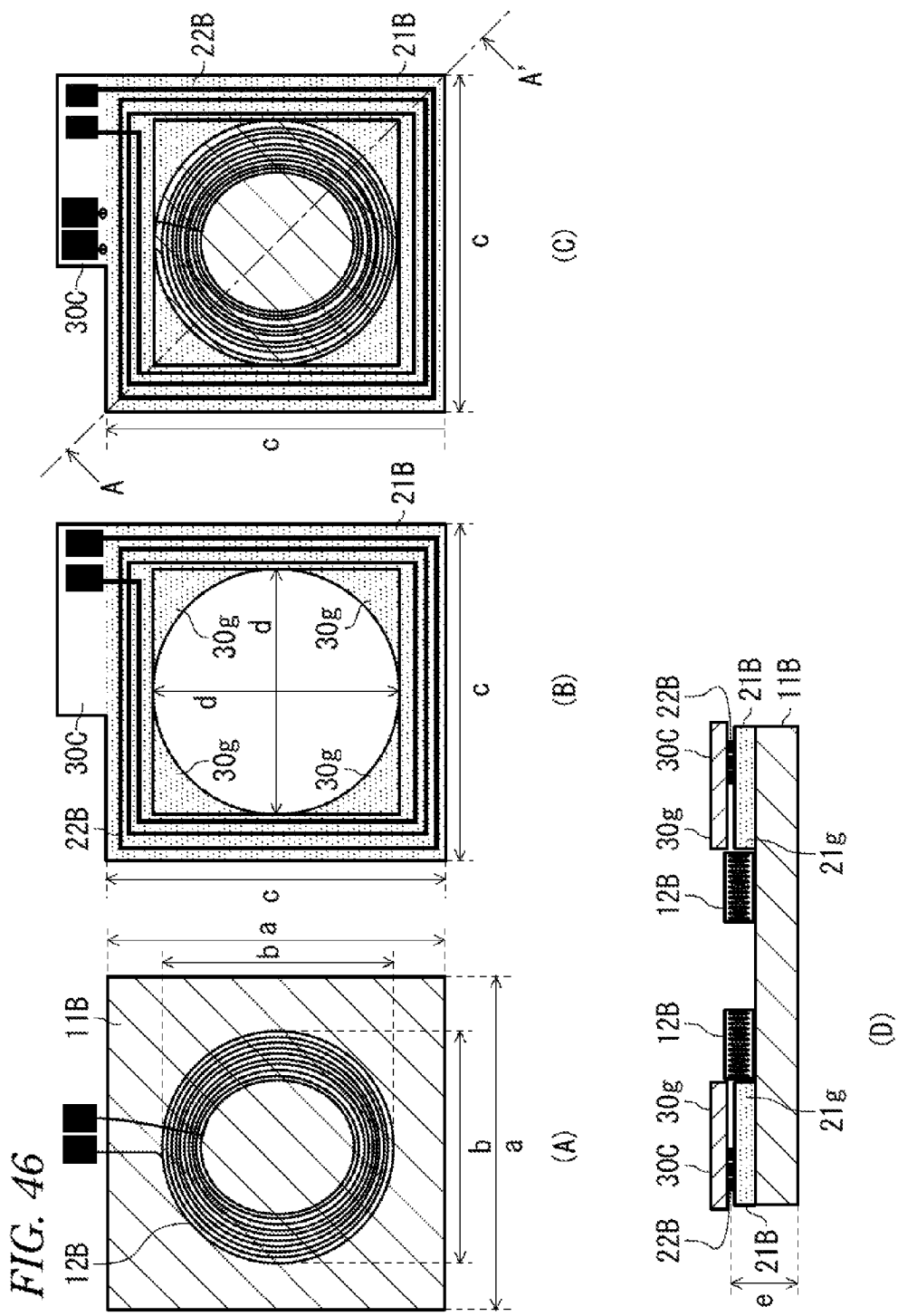

FIG. 46 is a diagram illustrating the structure of a coil unit according to Example 2 when a second magnetic body 21B and a substrate 30C are also used as guide members 21g and 30g, respectively. Sections (A) and (B) of FIG. 46 are diagrams illustrating an example of the dimensions of the coil unit according to Example 2, Section (C) of FIG. 46 is a plan view illustrating the coil unit according to Example 2, and Section (D) of FIG. 46 is a cross-sectional view illustrating the coil unit taken along the line A-A' of Section (C) of FIG. 46.

Figure 47:
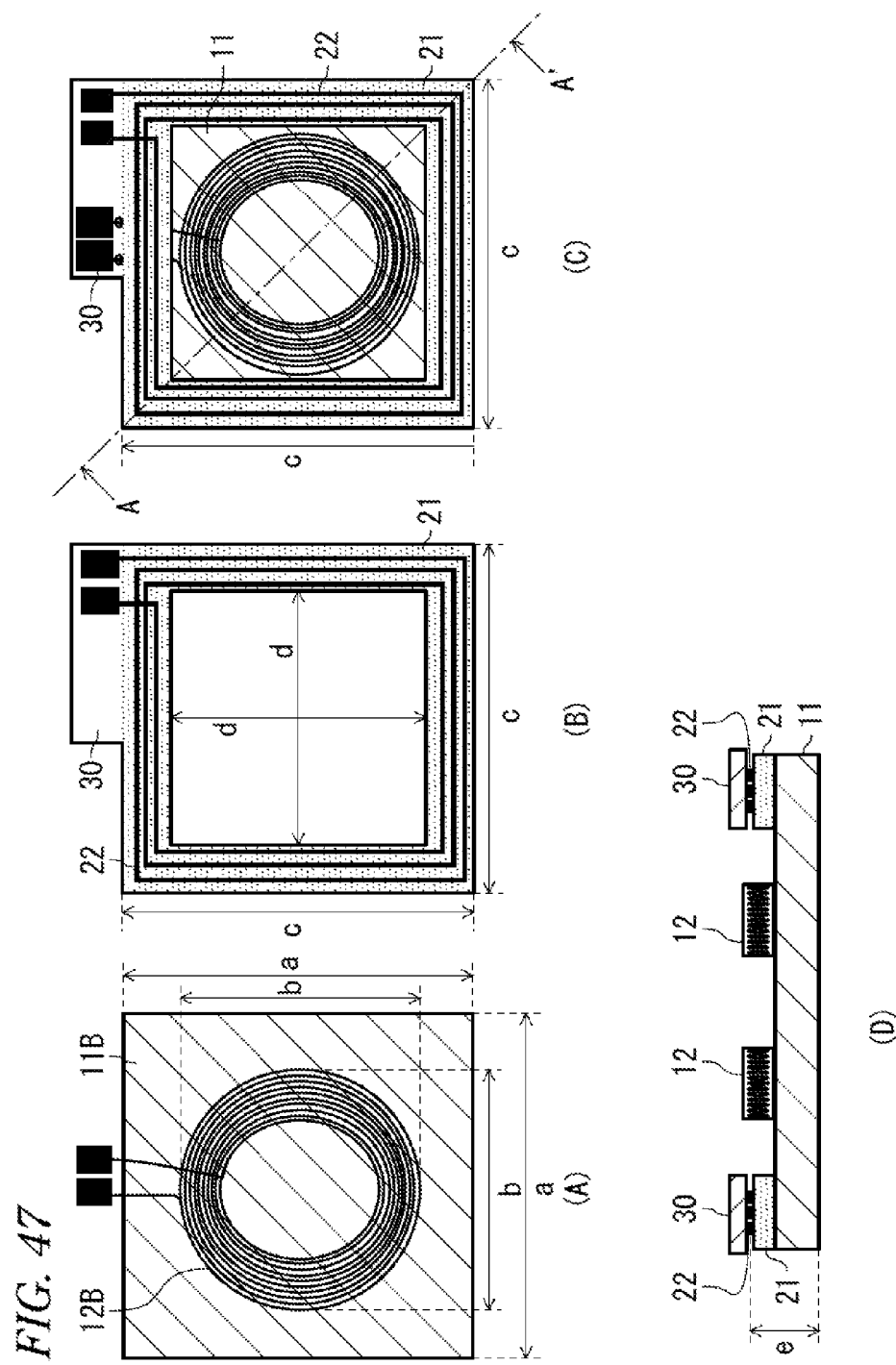

FIG. 47 is a diagram illustrating the structure of a coil unit according to a comparative embodiment when a guide member is not provided. Sections (A) and (B) of FIG. 47 are diagrams illustrating an example of the dimensions of the coil unit according to the comparative embodiment, Section (C) of FIG. 47 is a plan view illustrating the coil unit according to the comparative embodiment, and Section (D) of FIG. 47 is a cross-sectional view illustrating the coil unit taken along the line A-A' of Section (C) of FIG. 47.

FIG. 48 is a diagram illustrating the measurement result of the performance of the coil units according to Examples 1 and 2. Section (A) of FIG. 48 is a diagram illustrating power transmission efficiency during non-contact power transmission and Section (B) of FIG. 48 is a diagram illustrating the maximum communication distance during non-contact wireless communication.

Figure 49:
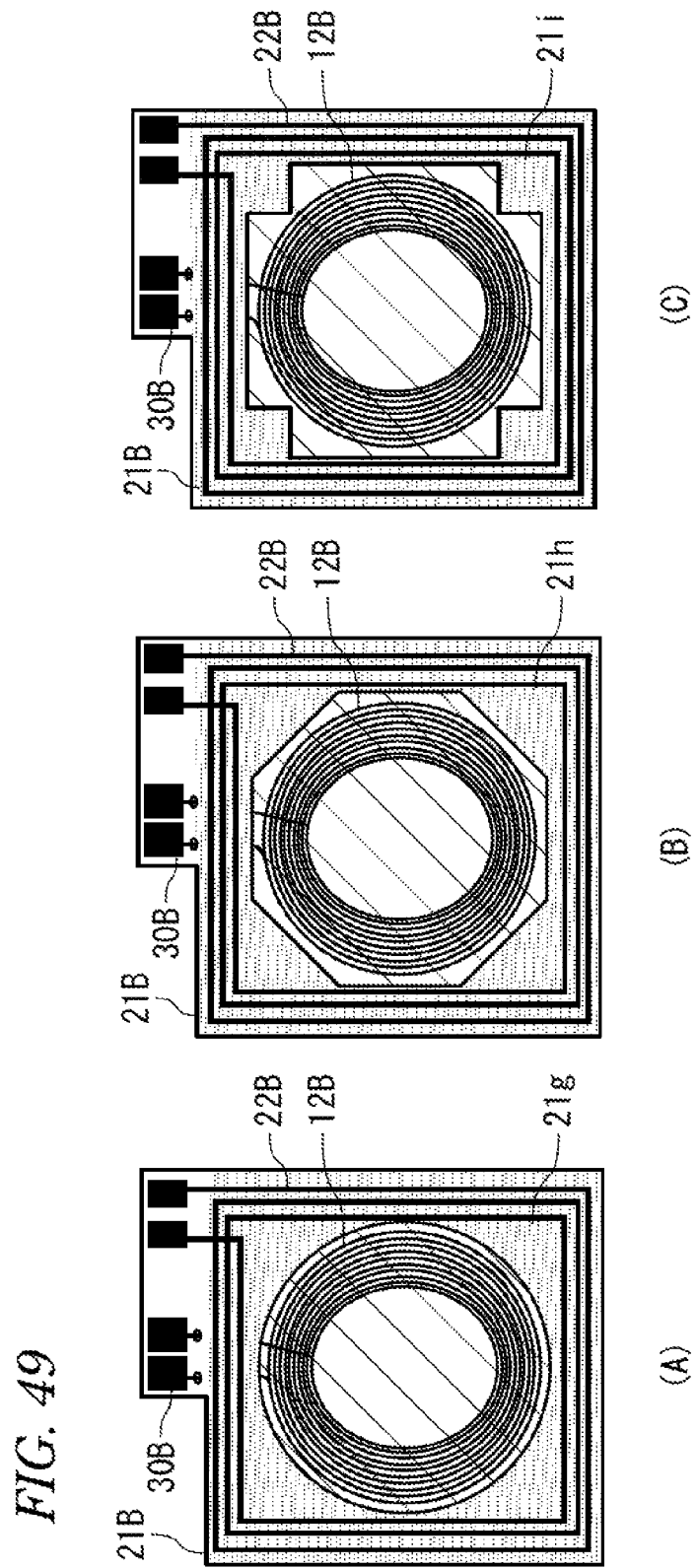

Sections (A) to (C) of FIG. 49 are diagrams illustrating examples of the shape of various guide members.

Figure 50:
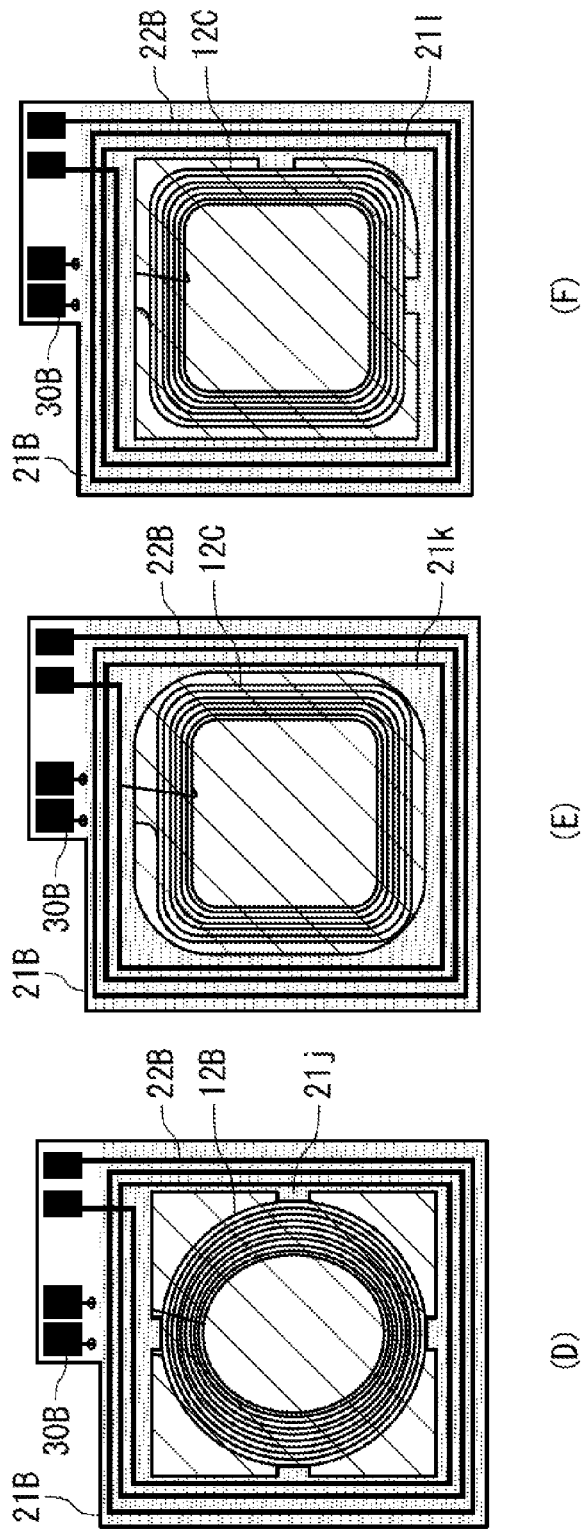

Sections (D) to (F) of FIG. 50 are diagrams illustrating examples of the shape of various guide members, following FIG. 49.

DETAILED DESCRIPTION

In the following embodiments, an example of the structure of a coil unit including a non-contact wireless communication coil and a non-contact power transmission coil and a portable wireless terminal including the coil unit is given as an example of a non-contact wireless communication coil and a portable wireless terminal including the non-contact wireless communication coil.

First Embodiment

FIG. 1 is a plan view illustrating the structure of a coil unit according to a first embodiment of the invention. FIG. 2 is a cross-sectional view illustrating the coil unit according to the first embodiment. Section (A) of FIG. 2 is a cross-sectional view taken along the line A-A' of FIG. 1 and Section (B) of FIG. 2 is a cross-sectional view taken along the line B-B' of FIG. 1.

The coil unit according to this embodiment includes a first magnetic body 11, a first coil 12 which functions as a non-contact power transmission coil, a second magnetic body 21, and a second coil 22 which functions as a non-contact wireless communication coil. The first magnetic body 11 is provided corresponding to the first coil 12 and the second magnetic body 21 is provided corresponding to the second coil 22.

The first magnetic body 11 has a rectangular plate shape and the first coil 12 is arranged on one surface of the plate. The first magnetic body 11 is made of a material with permeability greater than 1, such as ferrite. The first magnetic body 11 has a relative permeability μr1 of, for example, 200 to 2000. The first coil 12 is a coil obtained by winding a conductive winding wire in an elliptical ring shape, serves as a charging coil, and received power supplied from an external charger. A resonance frequency f1 of the first coil 12 is obtained by adjusting the resonance frequency of the first coil 12 using, for example, a capacitor which is connected in parallel or series to the first coil 12 and is, for example, about 100 kHz.

The second magnetic body 21 has a plate with a rectangular ring shape and a substrate 30 having the second coil 22 mounted thereon is arranged on one surface of the plate. The second magnetic body 21 is made of a material with permeability greater than 1, such as ferrite. The second magnetic body 21 has a relative permeability μr2 of, for example, 10 to 300. The second coil 22 is a coil that is wound in a rectangular ring shape by a conductive wiring pattern formed on the substrate 30 which is, for example, a glass epoxy substrate. The second coil 22 serves as a non-contact wireless communication coil and transmits and receives data to and from an external device, such as a reader/writer device. A resonance frequency f2 of the second coil 22 is obtained by adjusting the resonance frequency of the second coil 22 using, for example, a capacitor which is connected in parallel or series to the second coil 22 and is, for example, about 13.56 MHz.

First terminals 31 for the first coil 12 and second terminals 32 for the second coil 22 are formed at one end of the substrate 30 by a conductive wiring pattern. The first terminals 31 are connected to the first coil 12 through wiring lines and the second terminals 32 are connected to the second coil 22 through the wiring pattern of the substrate 30.

The coil unit according to this embodiment is arranged in the thickness direction (the up-down direction of FIG. 2) of the coil such that the first magnetic body 11, the first coil 12, the second magnetic body 21, the substrate 30, and the second coil 22 are laminated in this order from the lower side of in FIG. 2 in the direction of an arrow H. When the coil unit is provided in a portable wireless terminal, a housing is disposed above the second coil 22 in the direction of the arrow H and the coil unit is accommodated in the housing. Therefore, as viewed from an external device, that is, the inner wall of the housing of the portable wireless terminal, the second coil 22, the substrate 30, the second magnetic body 21, the first coil 12, and the first magnetic body 11 are laminated in this order. As such, the structure in which a plurality of magnetic bodies and a plurality of coils are laminated may reduce performance deterioration due to electromagnetic coupling between the two coils, to reduce the arrangement area of the coils while maintaining the performance of each coil, and to reduce the size of the coil unit.

In this case, the first coil 12 and the second coil 22 may entirely overlap each other. It is preferable that the first coil 12 and the second coil 22 do not at least partially overlap each other. That is, it is preferable that the first coil 12 and the second coil 22 be arranged such that they do not entirely overlap each other, but at least partially overlap each other. In the example shown in the drawings, a portion of the outer circumference of the first coil 12 overlaps a portion of the inner circumference of the second coil 22 such that a region in which the two coils do not overlap each other is formed. Since the first coil 12 has an elliptical shape and the second coil 22 has a rectangular shape, four corner portions of the second coil 22 are non-overlap regions and the second coil 22 is disposed outside the first coil 12 in the four corner portions. This structure can reduce the electromagnetic coupling between the two coils.

In this embodiment, the resonance frequency relationship between the first coil 12 and the second coil 22 is established such that the resonance frequency of the first coil 12 is lower than the resonance frequency of the second coil 22 (f1<f2). It is preferable that the permeability relationship between the first magnetic body 11 and the second magnetic body 21 is established such that the permeability of the first magnetic body 11 is greater than the permeability of the second magnetic body 21 (the relative permeability μr1>the relative permeability μr2). When the characteristics of the coil and the magnetic body are set as described above, it may be possible to effectively reduce performance deterioration due to the electromagnetic coupling between the two coils.

Next, an action when the coil unit according to this embodiment operates will be described. FIG. 3 is a diagram illustrating a magnetic field distribution of the coil unit at the position (the position shown in Section (A) of FIG. 2) of the cross-section taken along the line A-A' of FIG. 1. Section (A) of FIG. 3 shows the magnetic field distribution when the first coil 12 operates and Section (B) of FIG. 3 shows the magnetic field distribution when the second coil 22 operates. FIG. 4 is a diagram illustrating a magnetic field distribution of the coil unit at the position (the position shown in Section (B) of FIG. 2) of the cross-section taken along the line B-B' of FIG. 1. Section (A) of FIG. 4 shows the magnetic field distribution when the first coil 12 operates and Section (B) of FIG. 4 shows the magnetic field distribution when the second coil 22 operates.

When the first coil 12 operates, that is, when power is transmitted, the magnetic field is generated in the vicinity of the first coil 12 such that magnetic field lines pass through the first magnetic body 11 and are then emitted to a space, as shown in Section (A) of FIG. 3 and Section (A) of FIG. 4. In this case, the influence of the magnetic field from the first coil 12 to the second coil 22 is small. When the second coil 22 operates, that is, when data is transmitted by non-contact wireless communication, the magnetic field is generated in the vicinity of the second coil 22 such that magnetic field lines pass through the second magnetic body 21 and are then emitted to a space, as shown in Section (B) of FIG. 3 and Section (B) of FIG. 4. In this case, the influence of the magnetic field from the second coil 22 to the first coil 12 is small.

In this embodiment, since the laminated first and second coils 12 and 22 have a non-overlap region therebetween, the electromagnetic coupling between the coils is reduced. In particular, it may be possible to sufficiently reduce the electromagnetic coupling in four corner regions of the coils in which the two coils do not overlap each other, as shown in Sections (A) and (B) of FIG. 4.

FIG. 5 is a block diagram illustrating the structure of the portable wireless terminal including the coil unit according to this embodiment, the charger which is an external device, and the reader/writer device.

A portable wireless terminal 50 includes the first coil 12 for charging and the second coil 22 for non-contact wireless communication. The first coil 12 is connected to a non-contact charging unit 51 and the second coil 22 is connected to a non-contact wireless communication unit 52. Here, the first coil 12 is connected in parallel to a capacitor 54 and is also connected to a rectifying circuit 55 of the non-contact charging unit 51. The second coil 22 is connected in parallel to a capacitor 56 and is also connected to a modulation/demodulation circuit 57 of the non-contact wireless communication unit 52. The non-contact charging unit 51 and the non-contact wireless communication unit 52 are connected to a control circuit 53. The control circuit 53 controls the operation of each unit.

A charger 60 includes a non-contact power transmission coil 63. The non-contact power transmission coil 63 is connected in parallel to a capacitor 64 and is also connected to an AC power circuit 61. The AC power circuit 61 is connected to a control circuit 62 and the output of charging AC power is controlled by the control circuit 62.

A reader/writer device 70 includes a non-contact wireless communication coil 73. The non-contact wireless communication coil 73 is connected in parallel to a capacitor 74 and is also connected to a modulation/demodulation circuit 71. The modulation/demodulation circuit 71 is connected to a control circuit 72 and the control circuit 72 controls an operation of modulating and demodulating data transmitted by non-contact wireless communication.

In the above-mentioned structure, when the portable wireless terminal 50 is charged, the non-contact power transmission coil 63 of the charger 60 is arranged close to the first coil 12 of the portable wireless terminal 50 so as to face the first coil 12 and power is supplied from the charger 60 to the portable wireless terminal 50. In this case, the non-contact power transmission coil 63 and the first coil 12 are electromagnetically coupled and charging power is transmitted through the two coils in a non-contact manner. The resonance frequency f1 for supplying power from the non-contact power transmission coil 63 to the first coil 12 is adjusted by the capacitor 54 which is connected in parallel to the first coil 12 and the capacitor 64 which is connected in parallel to the non-contact power transmission coil 63 and is 100 kHz in this embodiment. AC power which is generated and output from the AC power circuit 61 is transmitted from the non-contact power transmission coil 63 to the first coil 12 and is received by the portable wireless terminal 50. The transmitted AC power is rectified into DC power by the rectifying circuit 55 and the DC output is supplied to a battery unit 58. In this way, the portable wireless terminal 50 is charged. In addition, the DC output may be supplied as power for operating each unit to a circuit in the portable wireless terminal 50.

When non-contact wireless communication is performed, the non-contact wireless communication coil 73 of the reader/writer device 70 is arranged close to the second coil 22 of the portable wireless terminal 50 so as to face the second coil 22 and data is transmitted and received between the reader/writer device 70 and the portable wireless terminal 50. In this case, the non-contact wireless communication coil 73 and the second coil 22 are electromagnetically coupled to each other and data is transmitted through the two coils by non-contact wireless communication. The resonance frequency f2 for communication between the non-contact wireless communication coil 73 and the second coil 22 is adjusted by the capacitor 56 which is connected in parallel to the second coil 22 and the capacitor 74 which is connected in parallel to the non-contact wireless communication coil 73 and is 13.56 MHz in this embodiment. Data transmitted from the reader/writer device 70 to the portable wireless terminal 50 is modulated by the modulation/demodulation circuit 71. The modulated data is transmitted from the non-contact wireless communication coil 73 to the second coil 22 and is then received by the portable wireless terminal 50. The transmitted data is demodulated by the modulation/demodulation circuit 57 of the portable wireless terminal 50. Data transmitted from the portable wireless terminal 50 to the reader/writer device 70 is modulated by the modulation/demodulation circuit 57. The modulated data is transmitted from the second coil 22 to the non-contact wireless communication coil 73 and is then received by the reader/writer device 70. The transmitted data is demodulated by the modulation/demodulation circuit 71 of the reader/writer device 70. As such, the use of the non-contact wireless communication function of the portable wireless terminal 50 makes it possible for the reader/writer device 70 to write and read data to and from the portable wireless terminal 50 using non-contact wireless communication.

Next, an example in which the performance of the coil unit according to this embodiment is measured using evaluation samples that are actually manufactured will be described. FIG. 6 is a diagram illustrating the dimensions of a coil unit according to the example. Section (A) of FIG. 6 shows only the first coil 12, Section (B) of FIG. 6 shows only the second coil 22, Section (C) of FIG. 6 shows a coil unit obtained by laminating and integrating the first coil 12 and the second coil 22 (the structure shown in FIG. 1), and Section (D) of FIG. 6 shows the cross-section of the coil unit shown in Section (C) of FIG. 6.

In the example, the first magnetic body 11 had a long side a of 48 mm and a short side b of 32 mm. The outside diameter c of the first coil 12 in the longitudinal direction was 41 mm and the outside diameter d thereof in the lateral direction was 30 mm. The second magnetic body 21 and the second coil 22 each had a long side e of 41 mm and a short side f of 31 mm. The coil unit obtained by laminating the first and second magnetic bodies had a thickness g of 1.5 mm. In this case, with the first coil 12 and the second coil 22 being laminated, the two coils overlap each other such that the outer circumference dimensions thereof are substantially equal to each other and a region in which the two coils do not overlap each other is formed on the inner circumferential side. Since the first coil 12 has an elliptical shape and the second coil 22 has a rectangular shape, four corner portions of the second coil 22 are the non-overlap regions.

FIG. 7 is a diagram illustrating the measurement result of power transmission efficiency during non-contact power transmission and the measurement result of the maximum communication distance during non-contact wireless communication as the performance of the coil unit according to the example shown in FIG. 6. Section (A) of FIG. 7 shows the measurement result of the power transmission efficiency and Section (B) of FIG. 7 shows the measurement result of the maximum communication distance. The power transmission efficiency is not the transmission efficiency of only the coil, and the efficiency of the entire charging system from an AC power circuit of the charger to the DC output of the portable wireless terminal shown in FIG. 5 was measured.

In the state shown in Section (A) of FIG. 6 in which only the first coil 12 was provided, the power transmission efficiency was 40.3[%]. In the state shown in Section (C) of FIG. 6 in which the first coil 12 and the second coil 22 coexisted, the power transmission efficiency was 40.4[%]. In this case, even when two coils are laminated and coexist and the second coil 22 is arranged on the external-apparatus-side of the first coil 12, performance deterioration due to electromagnetic coupling may not occur in non-contact power transmission.

In the state shown in Section (B) of FIG. 6 in which only the second coil 22 was provided, the maximum communication distance was 126 [mm] and a dead region (Null region) was not generated. In addition, in the state shown in Section (C) of FIG. 6 in which the first coil 12 and the second coil 22 coexisted, the maximum communication distance was 127 [mm] and a dead region (Null region) was not generated. In this case, even when two coils are laminated and coexist and the first coil 12 is arranged in the vicinity of the second coil 22, performance deterioration due to electromagnetic coupling may not occur in non-contact power transmission.

It is confirmed that, when the second magnetic body 21 is removed from the state shown in Section (C) of FIG. 6, the maximum communication distance is reduced to 120 [mm] due to the electromagnetic coupling between the coils. Since the second magnetic body 21 corresponding to the second coil is provided between the first coil and the second coil, it may be possible to reduce electromagnetic coupling in non-contact wireless communication and to increase the maximum communication distance.

As such, according to this embodiment, when a plurality of coils, that is, the first coil 12 and the second coil 22 coexist, it may be possible to reduce the electromagnetic coupling between the coils and to reduce performance deterioration due to the electromagnetic coupling. In addition, since a plurality of coils are arranged so as to be laminated, it may be possible to reduce an arrangement area and to achieve a small coil with small performance deterioration. Therefore, in the portable wireless terminal provided with the coil unit including the non-contact wireless communication coil according to this embodiment, it may be possible to reduce performance deterioration both during non-contact power transmission and during non-contact wireless communication while reducing the size of the portable wireless terminal and to obtain a desired performance with a small coil unit.

Second Embodiment

FIG. 8 is a diagram illustrating the structure of a coil unit according to a second embodiment of the invention. Section (A) of FIG. 8 is a plan view illustrating the coil unit, Section (B) of FIG. 8 is a cross-sectional view illustrating the coil unit taken along the line A-A' of Section (A) of FIG. 8, and Section (C) of FIG. 8 is a cross-sectional view illustrating the coil unit taken along the line B-B' of Section (A) of FIG. 8. The same components as those in the first embodiment shown in FIGS. 1 and 2 are denoted by the same reference numerals and the description thereof will not be repeated.

The second embodiment is an example in which the shape of the first coil according to the first embodiment is changed. Similarly to the first embodiment, a first magnetic body 11A has a rectangular plate shape. A first coil 12A is a coil obtained by winding a conductive winding wire in a rectangular ring shape with rounded corners. A second magnetic body 21A and a second coil 22A have substantially the same structure as those in the first embodiment. That is, the second magnetic body 21A is a plate with a rectangular ring shape and the second coil 22A is a coil which is wound in a rectangular ring shape by a conductive wiring pattern formed on a substrate 30A such as a glass epoxy substrate.

Similarly to the first embodiment, in the thickness direction of the coil (in the up-down direction in Sections (B) and (C) of FIG. 8), the first magnetic body 11A, the first coil 12A, the second magnetic body 21A, the substrate 30A, and the second coil 22A are laminated in this order from the lower side in the direction of an arrow H. As viewed from an external device, that is, the inner wall of a housing of a portable wireless terminal, the second coil 22A, the substrate 30A, the second magnetic body 21A, the first coil 12A, and the first magnetic body 11A are arranged so as to be laminated in this order.

The first coil 12A and the second coil 22A are arranged so as to at least partially overlap each other and to have a non-overlap region therebetween. In this case, the outside of the first coil 12A overlaps the outside of the second coil 22A such that a region in which the coils do not overlap each other is formed on the inner circumferential side of the coils. Since the first coil 12A has a rectangular shape with rounded corners and the second coil 22A has a rectangular shape, four corner portions of the second coil 22A are the non-overlap regions.

According to this structure, similarly to the first embodiment, even when two coils are laminated and coexist, it may be possible to reduce the electromagnetic coupling between the two coils and to reduce performance deterioration due to the electromagnetic coupling. In addition, since two coils are arranged so as to be laminated, it is possible to reduce the size of the coil unit.

Third Embodiment

FIG. 9 is a diagram illustrating the structure of a coil unit according to a third embodiment of the invention. Section (A) of FIG. 9 is a plan view illustrating the coil unit, Section (B) of FIG. 9 is a cross-sectional view illustrating the coil unit taken along the line A-A' of Section (A) of FIG. 9, and Section (C) of FIG. 9 is a cross-sectional view illustrating the coil unit taken along the B-B' of Section (A) of FIG. 9). The same components as those in the first embodiment shown in FIGS. 1 and 2 are denoted by the same reference numerals and the description thereof will not be repeated.

The third embodiment is an example in which the shape of the second coil according to the first embodiment is changed. A first magnetic body 11B and a first coil 12B have substantially the same structure as those in the first embodiment. That is, the first magnetic body 11B has a rectangular plate shape and the first coil 12B is a coil obtained by winding a conductive winding wire in an elliptical ring shape. The second magnetic body 21B is a plate with an elliptical ring shape and the second coil 22B is a coil which is wound in an elliptical ring shape by a conductive wiring pattern formed on a substrate 30B such as a glass epoxy substrate.

Similarly to the first embodiment, in the thickness direction (in the up-down direction of Sections (B) and (C) of FIG. 9) of the coil, the first magnetic body 11B, the first coil 12B, the second magnetic body 21B, the substrate 30B, and the second coil 22B are arranged in this order from the lower side in the direction of an arrow H. As viewed from an external device, that is, the inner wall of a housing of a portable wireless terminal, the second coil 22B, the substrate 30B, the second magnetic body 21B, the first coil 12B, and the first magnetic body 11B are arranged so as to be laminated in this order.

The first coil 12B and the second coil 22B are arranged so as to at least partially overlap each other and to have a non-overlap region therebetween. In this case, the outside of the first coil 12B overlaps the outside of the second coil 22B such that a region in which the coils do not overlap each other is formed on the inner circumferential side of the coils. That is, the first coil 12B and the second coil 22B at least partially overlap each other on the outer circumferential side of the first coil 12B.

According to this structure, similarly to the first embodiment, even when two coils are laminated and coexist, it may be possible to reduce the electromagnetic coupling between the two coils and to reduce performance deterioration due to the electromagnetic coupling. In addition, since two coils are arranged so as to be laminated, it is possible to reduce the size of the coil unit.

Modifications

Next, some modifications of the arrangement of the first coil and the second coil will be described.

FIG. 10 shows an example in which the first coil and the second coil have the same inside diameter and the same outward shape. In the example shown in Section (A) of FIG. 10, a first coil 12C having an elliptical ring shape and a second coil 22C having a rectangular ring shape are arranged so as to be laminated. In an example shown in Section (B) of FIG. 10, a first coil 12D having a rectangular ring shape with rounded corners and a second coil 22D having a rectangular ring shape are arranged so as to be laminated.

In this case, the first coil and the second coil substantially entirely overlap each other. However, since the second magnetic body corresponding to the second coil is provided between the second coil and the first coil as shown in FIG. 2, it may be possible to reduce performance deterioration due to electromagnetic coupling.

FIG. 11 shows an example in which the arrangement of the first and second coils is ranged when the first coil has an elliptical ring shape and the second coil has a rectangular ring shape, similarly to FIG. 1. In the example shown in Section (A) of FIG. 11, a first coil 12E with an elliptical ring shape and a second coil 22E with a rectangular ring shape are arranged so as to overlap each other on the outer circumferential side of two sides which are disposed at both ends of the coils in the longitudinal direction. In the example shown in Section (B) of FIG. 11, a first coil 12F with an elliptical ring shape and a second coil 22F with a rectangular ring shape are arranged so as to overlap each other on the outer circumferential side of two sides which are disposed at both ends of the coils in the lateral direction.

In the example shown in Section (C) of FIG. 11, a first coil 12G with an elliptical ring shape and a second coil 22G with a rectangular ring shape are arranged so as to overlap each other in the outer circumference of two adjacent sides. In the example shown in Section (D) of FIG. 11, a first coil 12H with an elliptical ring shape and a second coil 22H with a rectangular ring shape are arranged so as to overlap each other in the outer circumference of one side. In the example shown in Section (E) of FIG. 11, a first coil 12I with an elliptical ring shape and a second coil 22I with a rectangular ring shape are arranged so as to overlap each other in the outer circumference of three sides.

In this case, similarly to the first embodiment, a portion of the outer circumference of the first coil overlaps the second coil. Since the second magnetic body corresponding to the second coil is provided between the first coil and the second coil as shown in FIG. 2, it may be possible to reduce performance deterioration due to electromagnetic coupling.

As the number of non-overlap sides between the first coil and the second coil increases, the overall arrangement area of the coil increases and deterioration of characteristics due to the electromagnetic coupling between the coils can be reduced.

FIG. 12 shows an example in which the arrangement of the first and second coils is changed when the first coil has a rectangular ring shape with rounded corners and the second coil has a rectangular ring shape, similarly to FIG. 8. In the example shown in Section (A) of FIG. 12, a first coil 12J a rectangular ring shape with rounded corners and a second coil 22J having a rectangular ring shape are arranged so as to overlap each other in the outer circumference of two sides which are disposed at both ends in the longitudinal direction of the coils. In the example shown in Section (B) of FIG. 12, a first coil 12K a rectangular ring shape with rounded corners and a second coil 22K having a rectangular ring shape are arranged so as to overlap each other in the outer circumference of two sides which are disposed at both ends in the lateral direction of the coils.

In the example shown in Section (C) of FIG. 12, a first coil 12L a rectangular ring shape with rounded corners and a second coil 22L having a rectangular ring shape are arranged so as to overlap each other in the outer circumference of two adjacent sides. In the example shown in Section (D) of FIG. 12, a first coil 12M a rectangular ring shape with rounded corners and a second coil 22M having a rectangular ring shape are arranged so as to overlap each other in the outer circumference of one side. In the example shown in Section (E) of FIG. 12, a first coil 12N having a rectangular ring shape with rounded corners and a second coil 22N having a rectangular ring shape are arranged so as to overlap each other in the outer circumference of three sides.

In this case, similarly to the first and second embodiments, a portion of the outer circumference of the first coil overlaps the second coil. Since the second magnetic body corresponding to the second coil is provided between the first coil and the second coil as shown in FIGS. 2 and 8, it may be possible to reduce performance deterioration due to electromagnetic coupling.

As the number of non-overlap sides between the first coil and the second coil increases, the overall arrangement area of the coil increases and deterioration of characteristics due to the electromagnetic coupling between the coils can be reduced.

Comparative Embodiment

FIG. 13 is a diagram illustrating the structure of a coil unit according to a comparative embodiment. Section (A) of FIG. 13 is a plan view illustrating a coil unit and Section (B) of FIG. 13 is a cross-sectional view illustrating the coil unit taken along the line A-A' of Section (A) of FIG. 13.

The coil unit according to the comparative embodiment includes a first magnetic body 511, a first coil 512 which functions as a non-contact power transmission coil, and a second coil 522 which functions as a non-contact wireless communication coil.

The first magnetic body 511 has a rectangular plate shape and the first coil 512 and the second coil 522 are arranged on one surface of the plate. The first coil 512 is a coil obtained by winding a conductive winding wire in an elliptical ring shape, serves as a charging coil, and receives power supplied from an external charger. The second coil 522 is a coil which is wound in an elliptical ring shape by a conductive wiring pattern formed on a substrate 530 such as a glass epoxy substrate. The second coil 522 is a coil for non-contact wireless communication and transmits and receives data to and from an external device such as a reader/writer device. The second coil 522 is arranged on the outer circumferential side of the first coil 512. The first coil 512 and the second coil 522 are disposed substantially in the same plane so as not to overlap each other.

First terminals 531 for the first coil 512 and second terminals 532 for the second coil 522 are formed at one end of the substrate 530 by a conductive wiring pattern. The first terminals 531 are connected to the first coil 512 through wiring lines and the second terminals 532 are connected to the second coil 522 by the wiring pattern of the substrate 530.

In the comparative embodiment, the first coil 512 and the second coil 522 are arranged so as not to overlap each other and a second magnetic body is not provided. Therefore, when the first coil 512 and the second coil 522 are close to each other, the electromagnetic coupling between the two coils increases and performance deterioration may occur due to the influence of the electromagnetic coupling. For example, it is confirmed that the maximum communication distance of non-contact wireless communication is reduced to 117 [mm]. It may be difficult to increase the maximum communication distance of the non-contact wireless communication using the coil unit. In addition, the second coil 522 is arranged outside the first coil 512 and two coils are provided in parallel so as not to overlap each other. Therefore, the arrangement area of the coils increases and the size of the wireless communication terminal including the coil unit increases.

In contrast, in the above-described embodiment of the invention, when a plurality of coils coexist, the above-mentioned structure may reduce the size of the wireless communication terminal and may reduce the performance deterioration of each coil.

Prehistory of Fourth to Sixth Embodiments

In the structure disclosed in PTL 1, since two coils are arranged so as to form a double ring, the arrangement area of the coils is large. In addition, a plurality of coils are simply provided in parallel, without considering the performance of each coil, and it is expected that performance deterioration may occur due to the electromagnetic coupling between the coils. In particular, when a plurality of coils are arranged close to each other in order to reduce the size of the terminal including the coils, performances, such as power transmission efficiency and the communication distance, may deteriorate due to the electromagnetic coupling between the coils.

In addition, when the arrangement of two coils in the wireless card disclosed in PTL 1 is applied to a portable wireless terminal having the non-contact charge function and the non-contact wireless communication function, the simple arrangement of each coil may be used, which is capable of reducing performance deterioration due to the parallel arrangement of two coils and reducing the size of the portable wireless terminal.

In the fourth to sixth embodiments, a transmission coil and a portable wireless terminal will be described which can simply reduce the thickness of a housing while reducing the performance deterioration of each coil when a plurality of coils, such as a non-contact wireless communication coil and a non-contact power transmission coil, coexist in the housing.

In the following fourth to sixth embodiments, an example of the structure of a coil unit serving as the transmission coil including the non-contact wireless communication coil and the non-contact power transmission coil and a portable wireless terminal including the coil unit is given as an example of the transmission coil according to the invention and the portable wireless terminal including the transmission coil.

Fourth Embodiment

FIG. 14 is a plan view illustrating the structure of a coil unit according to the fourth embodiment. FIG. 15 is a cross-sectional view illustrating the coil unit according to the fourth embodiment. Section (A) of FIG. 15 is a cross-sectional view illustrating the coil unit taken along the line A-A' of FIG. 14. Section (B) of FIG. 15 is a cross-sectional view illustrating the coil unit taken along the line B-B' of FIG. 14. Section (C) of FIG. 15 is an enlarged view illustrating an example of a region C shown in Section (A) of FIG. 15. Section (D) of FIG. 15 is an enlarged view illustrating another example of a region C shown in Section (A) of FIG. 15. The direction of an arrow H in Section (A) of FIG. 15 is a direction toward the inner wall of a rear housing of the portable wireless terminal including the coil unit according to this embodiment and a direction opposite to the direction of the arrow H in Section (A) of FIG. 15 is a direction toward the inside of the housing of the portable wireless terminal, that is, a direction toward the inside of a front housing.

In the following description, the direction of the arrow H and the direction opposite to the direction of the arrow H are referred to as a "thickness direction of the coil" and a direction perpendicular to the thickness direction of the coil is referred to as a "plane direction of the coil".

The coil unit according to this embodiment includes a first magnetic body 11 with a predetermined permeability, a first coil 12 which functions as a non-contact power transmission coil, a second magnetic body 21 with a permeability different from the predetermined permeability of the first magnetic body 11, and a second coil 22 which functions as a non-contact wireless communication coil. In the coil unit according to this embodiment, the first magnetic body 11 is provided corresponding to the first coil 12 and the second magnetic body 21 is provided corresponding to the second coil 22.

The first magnetic body 11 has a rectangular plate shape. The first coil 12 is arranged on one surface (a surface facing the inner wall of the rear housing of the portable wireless terminal) of the plate. For example, a battery pack or a shield case (not shown) is arranged on the other surface (a surface facing the inside of the housing of the portable wireless terminal) of the plate. The first magnetic body 11 is made of, for example, a material with permeability greater than 1, such as ferrite. The first magnetic body 11 has a relative permeability µr1 of, for example, 200 to 2000.

The first coil 12 is a coil obtained by winding a conductive winding wire in an elliptical ring shape, serves as a charging coil, and receives power supplied (transmitted) from an external charger. A resonance frequency f1 of the first coil 12 is a frequency which is adjusted by, for example, a capacitor that is connected in parallel or series to the first coil 12 and is, for example, about 100 kHz. The first magnetic body 11 and the first coil 12 have substantially the same outside diameter.

The second magnetic body 21 is a plate with a rectangular ring shape. The second coil 22 which is provided on one side of the substrate 30 in the direction (the direction toward the inside of the housing of the portable wireless terminal) opposite to the direction of the arrow H shown in Section (A) of FIG. 15 is arranged on one surface (a surface facing the inner wall of the rear housing of the portable wireless terminal) of the second magnetic body 21. In addition, in the second magnetic body 21, a spacer (not shown) which is a plate with a rectangular ring shape is arranged on the other surface (a surface facing the inside of the housing of the portable wireless terminal) of the plate. One surface (a surface facing the inner wall of the rear housing of the portable wireless terminal) of the spacer comes into contact with the other surface (the surface facing the inside of the housing of the portable wireless terminal) of the second magnetic body 21. The spacer is arranged such that the other surface (the surface facing the inside of the housing of the portable wireless terminal) of the first magnetic body 11 and the other surface (the surface facing the inside of the housing of the portable wireless terminal) of the spacer are in the same plane.

The entire surface of the second magnetic body 21 is arranged outside the outer circumference of the first magnetic body 11 in the plane direction of the coil. The second magnetic body 21 is made of a material with permeability greater than 1, such as ferrite. The second magnetic body 21 has a relative permeability µr2 of, for example, 10 to 300. A second boundary surface B2 between the second magnetic body 21 and the second coil 22 is higher than a first boundary surface B1 between the first magnetic body 11 and the first coil 12 in the thickness direction of the coil, particularly, in the direction of the arrow H (see Section (C) of FIG. 15). Alternatively, the first boundary surface B1 between the first magnetic body 11 and the first coil 12 may be substantially flush with the second boundary surface B2 between the second magnetic body 21 and the second coil 22 (see Section (D) of FIG. 15).

The second coil 22 is a coil which is wound in a rectangular ring shape by a conductive wiring pattern formed on the surface of the substrate 30 that faces in the direction opposite to the direction of the arrow H shown in Section (A) of FIG. 15 (the surface facing the inside of the housing of the portable wireless terminal). The second coil 22 serves as a non-contact wireless communication coil and transmits and receives data to and from an external device such as a reader/writer device. A resonance frequency f2 of the second coil 22 is adjusted by, for example, a capacitor which is connected in parallel or series to the second coil 22 and is, for example, about 13.56 MHz. The second magnetic body 21 and the second coil 22 have substantially the same outside diameter.

The substrate 30 is formed using, for example, a glass epoxy resin or a flexible printed substrate. The rear housing of the portable wireless terminal which is formed of, for example, an acrylonitrile butadiene styrene (ABS) resin is arranged on a surface of the substrate 30 which faces in the direction of the arrow H in Section (A) of FIG. 15. A pair of first terminals 31 for the first coil 12 and a pair of second terminals 32 for the second coil 22 are formed at one end of the substrate 30 by a conductive wiring pattern. The first terminals 31 are connected to the first coil 12 through a wiring pattern and the second terminals 32 are connected to the second coil 22 by the wiring pattern of the substrate 30. In Sections (A) to (D) of FIG. 15, for simplicity of illustration, wiring patterns from the first and second terminals 31 and 32 to the first and second coils 12 and 22 are not shown.

In the coil unit according to this embodiment, the first magnetic body 11 and the second magnetic body 21 are arranged in the thickness direction (in the up-down direction of FIG. 15) of the coils such that the second boundary surface B2 is higher than the first boundary surface B1 (in the direction of the arrow H in FIG. 15) or is substantially flush with the first boundary surface B1 in the direction of the arrow H (a direction toward the inner wall of the rear housing of the portable wireless terminal) from the lower side of FIG. 15. The first coil 12 is laminated on the surface of the first magnetic body 11. In addition, in the thickness of the coil, the second coil 22 and the substrate 30 are sequentially laminated on the surface of the second magnetic body 21 in the direction of the arrow H (the direction toward the inner wall of the rear housing of the portable wireless terminal) from the lower side of FIG. 15. When the coil unit according to this embodiment is provided in the portable wireless terminal, the rear housing of the portable wireless terminal is disposed above the substrate 30 in the direction of the arrow H and the coil unit is accommodated in the housing. Therefore, as viewed from an external device, that is, the inner wall of the rear housing of the portable wireless terminal, the substrate 30, the second coil 22, and the second magnetic body 21 are sequentially laminated. The second magnetic body 21 and the first magnetic body 11 are arranged such that the second boundary surface B2 is higher than the first boundary surface B1 (in the direction of the arrow H in FIG. 15) or is substantially flush with the first boundary surface B1. The first coil 12 and the first magnetic body 11 are sequentially laminated. As such, when a plurality of magnetic bodies are laminated on the coils and the coils are arranged in parallel to each other, it may be possible to reduce performance deterioration due to the electromagnetic coupling between two coils and to reduce the thickness of the coil unit while ensuring the performance of each coil. Therefore, it is possible to reduce the size of the portable wireless terminal.

In this case, it is preferable that the first coil 12 and the second coil 22 be arranged so as not to overlap each other in the thickness direction of the coil. Since the first coil 12 has an elliptical shape and the second coil 22 has a rectangular shape, the first coil 12 and the second coil 22 do not overlap each other in four corner portions of the second coil 22. The second coil 22 is positioned outside the first coil 12 in the four corner portions. According to this structure, it may be possible to reduce the electromagnetic coupling between two coils. In FIG. 14, the first coil 12 is obtained by winding a conductive winding wire in an elliptical ring shape. However, the first coil 12 may be a coil obtained by winding a conductive winding wire in a rectangular ring shape which has a curvature radius in four corner portions.

In this embodiment, the resonance frequency relationship between the first coil 12 and the second coil 22 is established such that the resonance frequency of the first coil 12 is lower than that of the second coil 22 (f1<f2). It is preferable that the permeability relationship between the first magnetic body 11 and the second magnetic body 21 be established such that the permeability of the first magnetic body 11 is greater than that of the second magnetic body 21 (relative permeability μr1>relative permeability μr2). When the characteristics of the first coil 12, the second coil 22, the first magnetic body 11, and the second magnetic body 21 are set as described above, it may be possible to effectively reduce performance deterioration due to the electromagnetic coupling between two coils.

Next, an action when the unit coil according to this embodiment operates will be described. Section (A) of FIG. 16 is a diagram illustrating a magnetic field distribution of the coil unit at the position (the position shown in Section (A) of FIG. 15) of the cross-section taken along the line A-A' of FIG. 14 when the first coil 12 operates. Section (B) of FIG. 16 is a diagram illustrating a magnetic field distribution of the coil unit at the position (the position shown in Section (A) of FIG. 15) of the cross-section taken along the line A-A' of FIG. 14 when the second coil 22 operates. Section (A) of FIG. 17 is a diagram illustrating a magnetic field distribution of the coil unit at the position (the position shown in Section (B) of FIG. 15) of the cross-section taken along the line B-B' of FIG. 14 when the first coil 12 operates. Section (B) of FIG. 17 is a diagram illustrating a magnetic field distribution of the coil unit at the position (the position shown in Section (B) of FIG. 15) of the cross-section taken along the line B-B' of FIG. 14 when the second coil 22 operates. In FIGS. 16 and 17, a spacer is not shown for simplicity of explanation.

When the first coil 12 operates, that is, when power is transmitted, the magnetic field is generated in the vicinity of the first coil 12 such that magnetic field lines pass through the first magnetic body 11 and are then emitted to a space, as shown in Section (A) of FIG. 16 and Section (A) of FIG. 17. In this case, the influence of the magnetic field from the first coil 12 to the second coil 22 is small.

When the second coil 22 operates, that is, when data is transmitted by non-contact wireless communication, the magnetic field is generated in the vicinity of the second coil 22 such that magnetic field lines pass through the second magnetic body 21 and are then emitted to a space, as shown in Section (B) of FIG. 16 and Section (B) of FIG. 17. In this case, the influence of the magnetic field from the second coil 22 to the first coil 12 is small.

In this embodiment, since the coil unit has the region in which the first coil 12 and the second coil 22 do not overlap each other, the electromagnetic coupling between the coils is reduced. In particular, it may be possible to sufficiently reduce the electromagnetic coupling in four corner regions of the coils in which the two coils do not overlap each other, as shown in Sections (A) and (B) of FIG. 17.

FIG. 18 is a block diagram illustrating the structure of the portable wireless terminal including the coil unit according to this embodiment, a charger which is an external device, and the reader/writer device.

A portable wireless terminal 50 includes the first coil 12 for charging and a second coil 22 for non-contact wireless communication. The first coil 12 is connected to a non-contact charging unit 51 and the second coil 22 is connected to a non-contact wireless communication unit 52. The first coil 12 is connected in parallel to a capacitor 54 and is also connected to a rectifying circuit 55 of the non-contact charging unit 51. The second coil 22 is connected in parallel to a capacitor 56 and is also connected to a modulation/demodulation circuit 57 of the non-contact wireless communication unit 52. The non-contact charging unit 51 and the non-contact wireless communication unit 52 are connected to a control circuit 53. The control circuit 53 controls the operation of each unit.

A charger 60 includes a non-contact power transmission coil 63. The non-contact power transmission coil 63 is connected in parallel to a capacitor 64 and is also connected to an AC power circuit 61. The AC power circuit 61 is connected to a control circuit 62 and the output of charging AC power is controlled by the control circuit 62.

A reader/writer device 70 includes a non-contact wireless communication coil 73. The non-contact wireless communication coil 73 is connected in parallel to a capacitor 74 and is also connected to a modulation/demodulation circuit 71. The modulation/demodulation circuit 71 is connected to a control circuit 72 and the control circuit 72 controls an operation of modulating and demodulating data transmitted by non-contact wireless communication.

In the above-mentioned structure, when the portable wireless terminal 50 is charged, the non-contact power transmission coil 63 of the charger 60 is arranged close to the first coil 12 of the portable wireless terminal 50 so as to face the first coil 12 and power is supplied from the charger 60 to the portable wireless terminal 50. In this case, the non-contact power transmission coil 63 and the first coil 12 are electromagnetically coupled and charging power is transmitted through the two coils in a non-contact manner. The resonance frequency f1 for supplying power from the non-contact power transmission coil 63 to the first coil 12 is adjusted by the capacitor 54 which is connected in parallel to the first coil 12 and the capacitor 64 which is connected in parallel to the non-contact power transmission coil 63 and is 100 kHz in this embodiment. AC power which is generated and output from the AC power circuit 61 is transmitted from the non-contact power transmission coil 63 to the first coil 12 and is received by the portable wireless terminal 50. The transmitted AC power is rectified into DC power by the rectifying circuit 55 and the DC output is supplied to a battery unit 58. In this way, the portable wireless terminal 50 is charged. In addition, the DC output may be supplied as power for operating each unit to a circuit in the portable wireless terminal 50.

When non-contact wireless communication is performed, the non-contact wireless communication coil 73 of the reader/writer device 70 is arranged close to the second coil 22 of the portable wireless terminal 50 so as to face the second coil 22 and data is transmitted and received between the reader/writer device 70 and the portable wireless terminal 50. In this case, the non-contact wireless communication coil 73 and the second coil 22 are electromagnetically coupled to each other and data is transmitted through the two coils by non-contact wireless communication. The resonance frequency f2 for communication between the non-contact wireless communication coil 73 and the second coil 22 is adjusted by the capacitor 56 which is connected in parallel to the second coil 22 and the capacitor 74 which is connected in parallel to the non-contact wireless communication coil 73 and is 13.56 MHz in this embodiment. Data transmitted from the reader/writer device 70 to the portable wireless terminal 50 is modulated by the modulation/demodulation circuit 71. The modulated data is transmitted from the non-contact wireless communication coil 73 to the second coil 22 and is then received by the portable wireless terminal 50. The transmitted data is demodulated by the modulation/demodulation circuit 57 of the portable wireless terminal 50. Data transmitted from the portable wireless terminal 50 to the reader/writer device 70 is modulated by the modulation/demodulation circuit 57. The modulated data is transmitted from the second coil 22 to the non-contact wireless communication coil 73 and is then received by the reader/writer device 70. The transmitted data is demodulated by the modulation/demodulation circuit 71 of the reader/writer device 70. As such, the use of the non-contact wireless communication function of the portable wireless terminal 50 makes it possible for the reader/writer device 70 to write and read data to and from the portable wireless terminal 50 using non-contact wireless communication.

Example of Coil Unit

Next, an example in which the performance of the coil unit according to this embodiment is measured using actually manufactured evaluation samples will be described. Sections of (A) and (B) of FIG. 19 are diagrams illustrating the dimensions of a coil unit according to the example. Section (C) of FIG. 19 is a plan view illustrating the coil unit according to the example. Section (D) of FIG. 19 is a cross-sectional view illustrating the coil unit taken along the line A-A' of Section (C) of FIG. 19. Section (E) of FIG. 19 is an enlarged view illustrating a region D shown in Section (D) of FIG. 19. That is, Section (A) of FIG. 19 shows only the first coil 12 laminated on the surface of the first magnetic body 11, Section (B) of FIG. 19 shows only the second coil 22 laminated on the surface of the second magnetic body 21 (the description of the substrate 30 is omitted), Section (C) of FIG. 19 shows the coil unit in which the first coil 12 and the second coil 22 are incorporated and coexist, Section (D) of FIG. 19 shows the cross-section of the coil unit shown in Section (C) of FIG. 19 (the spacer which is provided so as to come into contact with the second magnetic body 21 is not shown), and Section (E) of FIG. 19 is an enlarged view illustrating a first boundary surface B1 and a second boundary surface B2 shown in Section (D) of FIG. 19. As shown in Section (E) of FIG. 19, the coil unit according to the example is formed such that the first boundary surface B1 is substantially flush with the second boundary surface B2.

In the example, the first magnetic body 11 had a square shape with a side a of 30 mm, the first coil 12 had a circular shape with an outside diameter b of 29 mm, the second magnetic body 21 had a shape in which a square having a dimension d of 30 mm was cut out from a substantially central portion of a square with a side c of 40 mm, and the coil unit had a thickness e of 0.8 mm. In this case, the first magnetic body 11 and the first coil 12 overlap each other such that the dimensions of the outer circumferences thereof are substantially equal to each other, the second magnetic body 21 and the second coil 22 overlap each other such that the dimensions of the outer circumferences thereof are substantially equal to each other, and the first coil 12 and the second coil 22 do not overlap each other. In particular, since the first coil 12 has a circular shape and the second coil 22 has a rectangular shape, the distance between the first coil 12 and the second coil 22 in four corner portions of the second coil 22 is large.

Section (A) of FIG. 20 is a diagram illustrating the measurement result when power transmission efficiency during non-contact power transmission is measured as the performance of the coil unit according to the example. Section (B) of FIG. 20 is a diagram illustrating the measurement result when the maximum communication distance during non-contact wireless communication is measured as the performance of the coil unit according to the example. The power transmission efficiency is not the transmission efficiency of only the coil, and the efficiency of the entire charging system from the DC input of the AC power circuit of the charger to the DC output of the portable wireless terminal shown in FIG. 18 was measured.

In a state in which the second coil 22 was removed from Section (D) of FIG. 19 and only the first coil 12 was provided, the power transmission efficiency was 38.2[%]. In the state shown in Section (D) of FIG. 19 in which the first coil 12 and the second coil 22 coexisted, the power transmission efficiency was 38.1[%]. In this case, even when two coils coexist and the second coil 22 is arranged outside the first coil 12, performance deterioration due to electromagnetic coupling may not occur in non-contact power transmission.

In a state in which the first coil 12 was removed from Section (D) of FIG. 19 and only the second coil 22 was provided, the maximum communication distance was 141 [mm] and a dead region (Null region) was not generated. In addition, in the state shown in Section (D) of FIG. 19 in which the first coil 12 and the second coil 22 coexisted, the maximum communication distance was 128 [mm] and a dead region (Null region) was not generated. In this case, even when two coils coexist and the first coil 12 is arranged in the vicinity of the second coil 22, performance deterioration due to electromagnetic coupling may occur in non-contact power transmission, and the absolute value of the maximum communication distance may be large compared with the following comparative embodiment.

Comparative Embodiment of Coil Unit

Next, the performance of a coil unit according to a comparative embodiment which is compared with the performance of the coil unit according to the above-described embodiment is measured using evaluation samples. Sections (A) and (B) of FIG. 21 are diagrams illustrating an example of the dimensions of the coil unit according to the comparative embodiment. Section (C) of FIG. 21 is a plan view illustrating the coil unit according to the comparative embodiment. Section (D) of FIG. 21 is a cross-sectional view illustrating the coil unit taken along the line A-A' of Section (C) of FIG. 21. Section (E) of FIG. 21 is an enlarged view illustrating a region E shown in Section (D) of FIG. 21. That is, Section (A) of FIG. 21 shows only a first coil 12 which is laminated on the surface of a first magnetic body 11, Section (B) of FIG. 21 shows only a second coil 22 which is laminated on the surface of a second magnetic body 21 (the description of a substrate 30 is omitted), Section (C) of FIG. 21 shows the coil unit in which the first coil 12 and the second coil 22 are incorporated and coexist, Section (D) of FIG. 21 shows the cross-section of the coil unit shown in Section (C) of FIG. 21, and Section (E) of FIG. 21 is an enlarged view illustrating a first boundary surface B1 and a second boundary surface B2 shown in Section (D) of FIG. 21. As shown in Section (E) of FIG. 21, in the coil unit according to the comparative embodiment, the second boundary surface B2 is f (=0.2 mm) lower than the first boundary surface in the thickness direction (in the up-down direction of FIG. 21) of the coil.

In the comparative embodiment, the first magnetic body 11 had a square shape with a side a of 30 mm, the first coil 12 had a circular shape with an outside diameter b of 29 mm, the second coil 22 was formed in the range of a shape in which a square with a dimension d of 30 mm was cut out from a substantially central portion of a square with a side c of 40 mm, and the coil unit had a thickness e of 0.8 mm. In addition, in the coil unit according to the comparative embodiment, as shown in Section (E) of FIG. 21, the second boundary surface B2 is f (=0.2 mm) lower than the first boundary surface in the thickness direction (in the up-down direction of FIG. 21) of the coil. In this case, the first coil 12 and the second coil 22 are provided so as not to overlap each other. In particular, since the first coil 12 has a circular shape and the second coil 22 has a rectangular shape, the distance between the first coil 12 and the second coil 22 is large in four corner portions of the second coil 22.

Section (A) of FIG. 22 is a diagram illustrating the measurement result when power transmission efficiency during non-contact power transmission is measured as the performance of the coil unit according to the comparative embodiment. Section (B) of FIG. 22 is a diagram illustrating the measurement result when the maximum communication distance during non-contact wireless communication is measured as the performance of the coil unit according to the comparative embodiment. The power transmission efficiency is not the transmission efficiency of only the coil, and the efficiency of the entire charging system from the DC input of the AC power circuit of the charger to the DC output of the portable wireless terminal shown in FIG. 18 was measured.

In a state in which the second coil 22 was removed from Section (D) of FIG. 21 and only the first coil 12 was provided, the power transmission efficiency was 38.1[%]. In the state shown in Section (D) of FIG. 21 in which the first coil 12 and the second coil 22 coexisted, the power transmission efficiency was 38.0[%]. In this case, there is no large difference in power transmission performance between the coil unit according to the example and the coil unit according to the comparative embodiment.

In a state in which the first coil 12 was removed from Section (D) of FIG. 21 and only the second coil 22 was provided, the second magnetic body was not provided and the second coil 22 was closely adhered to the first magnetic body. Therefore, the maximum communication distance was 130 [mm] and a dead region (Null region) was not generated. In the state shown in Section (D) of FIG. 21 in which the first coil 12 and the second coil 22 coexisted, the maximum communication distance was 117 [mm] and a dead region (Null region) was not generated. In this case, two coils coexist and the maximum communication distance is reduced due to the electromagnetic coupling between the coils.

Therefore, in the coil unit according to the example, the second magnetic body 21 corresponding to the second coil 22 is provided outside the first magnetic body 11 corresponding to the first coil 12, and the first boundary surface B1 between the first coil 12 and the first magnetic body 11 is substantially flush with the second boundary surface B2 between the second coil 22 and the second magnetic body 21 or the second boundary surface B2 is higher than the first boundary surface B1 in the thickness direction of the coil. Therefore, it may be possible to increase the maximum communication distance during non-contact wireless communication.

As such, according to the above-described embodiment, when a plurality of coils, such as the first coil 12 and the second coil 22, coexist in the housing, it may be possible to reduce the electromagnetic coupling between the coils and to reduce performance deterioration due to the electromagnetic coupling. In addition, as such, when a plurality of magnetic bodies are parallel to the coils and the coils are arranged close to each other, it may be possible to provide a coil with low performance deterioration and to simply reduce the thickness of the housing. Therefore, in the portable wireless terminal provided with the coil unit including the non-contact wireless communication coil according to this embodiment, it may be possible to reduce performance deterioration both during non-contact power transmission and during non-contact wireless communication while reducing the size of the portable wireless terminal. The use of the coil unit capable of simply reducing the thickness of the housing of the portable wireless terminal makes it possible to obtain a desired performance (a power transmission performance and a communication performance).

Fifth Embodiment

FIG. 23 is a plan view illustrating the structure of a coil unit according to a fifth embodiment. Section (A) of FIG. 24 is a cross-sectional view illustrating the coil unit taken along the line A-A' of FIG. 23. Section (B) of FIG. 24 is a cross-sectional view illustrating the coil unit taken along the line B-B' of FIG. 23. In the description of FIG. 23 and Sections (A) and (B) of FIG. 24, the same components as those in the fourth embodiment shown in FIGS. 14 and 15 are denoted by the same reference numerals and the description thereof will not be repeated. In Sections (A) and (B) of FIG. 24, for simplicity of illustration, wiring patterns from first and second terminals 31 and 32 to first and second coils 12 and 22 are not shown.

The fifth embodiment is an example in which the shape of the second magnetic body 21 and the second coil 22 according to the fourth embodiment is changed. A first magnetic body 11A and a first coil 12A have substantially the same structure as those in the fourth embodiment. That is, the first magnetic body 11A has a rectangular plate shape and the first coil 12A is a coil obtained by winding a conductive winding wire in an elliptical ring shape. The second magnetic body 21A is a plate with an elliptical ring shape and the second coil 22A is a coil which is wound in an elliptical ring shape by a conductive wiring pattern formed on a surface of a substrate 30A that faces a direction opposite to the direction of an arrow H shown in FIG. 24.

In the coil unit according to this embodiment, similarly to the first embodiment, the first magnetic body 11A and the second magnetic body 21A are arranged in the thickness direction (in the up-down direction of Sections (A) and (B) of FIG. 24) of the coils such that the second boundary surface B2 is higher than the first boundary surface B1 (in the direction of the arrow H in FIG. 15) or is substantially flush with the first boundary surface B1 in the direction of the arrow H (a direction toward the inner wall of the rear housing of the portable wireless terminal) from the lower side of FIG. 24. The first coil 12A is laminated on the surface of the first magnetic body 11A. In addition, in the thickness of the coils, the second coil 22A and the substrate 30A are sequentially laminated on the surface of the second magnetic body 21A in the direction of the arrow H (the direction toward the inner wall of the rear housing of the portable wireless terminal) from the lower side of FIG. 24. As viewed from an external device, that is, the inner wall of the rear housing of the portable wireless terminal, the substrate 30A, the second coil 22A, and the second magnetic body 21A are sequentially laminated. The first magnetic body 11A and the second magnetic body 21A are arranged such that the second boundary surface B2 is higher than the first boundary surface B1 (in the direction of the arrow H in FIG. 24) or is substantially flush with the first boundary surface B1. In addition, the first coil 12A and the first magnetic body 11A are sequentially laminated.

The first coil 12A and the second coil 22A are arranged so as not to overlap each other in the thickness direction of the coil.

According to this structure, similarly to the fourth embodiment, even when two coils coexist so as to be close to each other, it may be possible to reduce the electromagnetic coupling between the coils and to reduce performance deterioration due to the electromagnetic coupling. In addition, since two coils coexist and are arranged in parallel to each other, it is possible to simply reduce the thickness of the housing of the portable wireless terminal including the coil unit. Therefore, it is possible to reduce the size of the portable wireless terminal.

Prehistory of Sixth Embodiment

FIG. 25 is a diagram illustrating a change in the communication performance of the second coil 22 when the position of the second magnetic body 21 varies in the thickness of the coils. Section (A) of FIG. 25 is a plan view illustrating the structure of the coil unit according to the fourth embodiment. Section (B) of FIG. 25 is a cross-sectional view illustrating the coil unit taken along the line A-A' of Section (C) of FIG. 19. Section (C) of FIG. 25 is a cross-sectional view illustrating the coil unit taken along the line A-A' of Section (C) of FIG. 21. Section (D) of FIG. 25 is a diagram illustrating the comparison result of the communication performance of the second coil 22 between a state in which the position of the second magnetic body 21 varies in a direction in which the communication performance is improved, in the thickness of the coil, and a state in which the position of the second magnetic body 21 varies in a direction in which the communication performance is reduced, in the thickness of the coil. In the following description, in the coil unit, the same components as those of the coil unit according to the fourth embodiment are denoted by the same reference numerals.

Section (B) of FIG. 25 shows a case in which the first boundary surface B1 is substantially flush with the second boundary surface B2 in the plane direction of the coil.

Section (C) of FIG. 25 shows a case in which the second boundary surface B2 is lower than the first boundary surface B1 in the plane direction of the coil and the bottom (lower surface) of the first magnetic body 11 is substantially flush with the bottom (lower surface) of the second magnetic body 21 in the plane direction of the coil. In this case, the bottoms (lower surfaces) of the first magnetic body 11 and the second magnetic body 21 come into contact with the flat surface of another member (not shown).

As shown in Section (D) of FIG. 25, when the first boundary surface B1 and the second boundary surface B2 are flush with each other in the plane direction of the coil (see Section (B) of FIG. 25), the maximum communication distance obtained by the second coil 22 is 128 [mm].

As shown in Section (D) of FIG. 25, when the position of the second magnetic body 21 varies in the direction in which communication performance is reduced in the thickness direction of the coil, the second boundary surface B2 is lower than the first boundary surface B1 in the plane direction of the coil, and the bottom (lower surface) of the first magnetic body 11 is flush with the bottom (lower surface) of the second magnetic body 21 in the plane direction of the coil (see Section (C) of FIG. 25), the maximum communication distance obtained by the second coil 22 is 117 [mm]. In addition, no dead region (Null region) was generated. The measurement was performed under the same conditions as those in the example of the above-described fourth embodiment and those in Examples 1 and 2 of the following sixth embodiment.

This result proved that, when the position of the second magnetic body 21 varied in the direction in which communication performance was reduced in the thickness direction of the coil, the maximum communication distance was changed in the range of 117 [mm] to 128 [mm] and it was difficult to stabilize the communication performance obtained by the second coil 22.

Sixth Embodiment

In the sixth embodiment, for example, it is considered that the positional of a second magnetic body is likely to vary in a direction in which communication performance is reduced in the thickness of a coil when a portable wireless terminal is manufactured, and an example of a coil unit will be described which prevents the positional deviation of the second magnetic body such that the variation does not occur in the direction in which the communication performance of the second coil is reduced.

FIG. 26 is a diagram illustrating the structure of the coil unit according to the sixth embodiment. Section (A) of FIG. 26 is a plan view illustrating the structure of the coil unit. A first magnetic body 11, a first coil 12, a second coil 22, and a substrate 30 forming this embodiment are the same as those in the coil unit according to the first embodiment and are denoted by the same reference numerals as those in the first embodiment and the description thereof will not be repeated. In this embodiment, second magnetic bodies 21B and 21C have a rectangular plate shape, similarly to the second magnetic body 21 according to the first embodiment.

Sections (B) and (C) of FIG. 26 are cross-sectional views illustrating the coil unit taken along the line A-A' of Section (A) of FIG. 26. In this embodiment, the second magnetic body 21B is arranged such that the position of the second magnetic body 21B does not vary in the direction in which communication performance is reduced, in the thickness direction of the coil.

Specifically, in Section (B) of FIG. 26, a spacer 25 which is a position regulation member for regulating the position of the second magnetic body 21B is arranged so as to come into contact with the bottom (lower surface) of the second magnetic body 21B, and the bottom (lower surface) of the first magnetic body 11 and the bottom (lower surface) of the spacer 25 come into contact with the surface of another member 40. Therefore, the position of the second magnetic body 21B does not vary such that communication performance is reduced in the thickness direction of the coil, but is fixed to the surface of another member 40. A second boundary surface B2 is not lower than a first boundary surface B1 in the plane direction of the coil. Another member 40 is, for example, a battery pack, a shield case, or the inner wall of a housing.

The spacer 25 is a plate with a rectangular ring shape, similarly to the second magnetic body 21B. The shape of the spacer 25 is not limited to the plate with a rectangular ring shape as long as the spacer 25 can regulate the position of the second magnetic body 21B. For example, the spacer 25 may have a block shape which is arranged only at four corners of the bottom (lower surface) of the second magnetic body 21B. The spacer 25 may be made of, for example, a metal material, a resin, or a substrate (a glass epoxy substrate or a flexible substrate). The material forming the spacer 25 is not particularly limited.

In Section (C) of FIG. 26, instead of arranging the spacer 25, the thickness of the second magnetic body 21C is equal to or more than that of the first magnetic body 11B in the thickness direction of the coil. Therefore, the position of the second magnetic body 21B does not vary in the direction in which communication performance is reduced, in the thickness direction of the coil, but is fixed to the surface of another member 40. The second boundary surface B2 is not lower than the first boundary surface B1 in the plane direction of the coil.

Example of Coil Unit

Next, two examples (Examples 1 and 2) will be described in which the performance of the coil unit according to the sixth embodiment is measured using evaluation samples which are actually manufactured. FIG. 27 is a diagram illustrating the structure of a coil unit according to Example 1 in which the spacer 25 is arranged so as to come into contact with the bottom (lower surface) of the second magnetic body 21B. Sections (A) and (B) of FIG. 27 are diagrams illustrating an example of the dimensions of the coil unit according to Example 1. Section (C) of FIG. 27 is a plan view illustrating the coil unit according to Example 1. Section (D) of FIG. 27 is a cross-sectional view illustrating the coil unit taken along the line A-A' of Section (C) of FIG. 27. Section (E) of FIG. 27 is an enlarged view illustrating a region g shown in Section (D) of FIG. 27.

Section (A) of FIG. 27 shows the first coil 12 which is laminated on the surface of the first magnetic body 11 and Section (B) of FIG. 27 shows the second coil 22 which is laminated on the surface of the second magnetic body 21B. Since the substrate 30 is the same as that shown in FIG. 19, the description thereof will not be repeated. Section (C) of FIG. 27 shows the coil unit according to Example 1 in which the first coil 12 and the second coil 22 are incorporated and coexist, Section (D) of FIG. 27 is a cross-sectional view illustrating the coil unit taken along the line A-A' of Section (C) in FIG. 27, and Section (E) of FIG. 27 is an enlarged view illustrating the first boundary surface B1 and the second boundary surface B2 shown in Section (D) of FIG. 27.

As shown in Section (E) of FIG. 27, the coil unit according to Example 1 is formed such that the first boundary surface B1 is substantially flush with the second boundary surface B2.

In Example 1, the first magnetic body 11 had a square shape with a side a of 30 mm, the first coil 12 had a circular shape with an outside diameter b of 29 mm, and the second magnetic body 21 had a shape in which a square having a side d of 31 mm was cut out from a substantially central portion of a square with a side c of 40 mm. In addition, the coil unit had a thickness e of 0.8 mm.

In this case, the first magnetic body 11 and the first coil 12 overlap each other such that the dimensions of the outer circumferences thereof are substantially equal to each other, the second magnetic body 21B and the second coil 22 overlap each other such that the dimensions of the outer circumferences thereof are substantially equal to each other, and the first coil 12 and the second coil 22 are provided so as not to overlap each other. In particular, since the first coil 12 has a circular shape and the second coil 22 has a rectangular shape, the distance between the first coil 12 and the second coil 22 in four corner portions of the second coil 22 is large.

In addition, in the coil unit according to Example 1, in order to prevent the position of the second magnetic body 21B from varying in the direction in which communication performance is reduced in the thickness direction of the coil, the spacer 25 for regulating the position of the second magnetic body 21B is arranged so as to come into contact with the bottom (lower surface) of the second magnetic body 21B. Therefore, the bottom (lower surface) of the first magnetic body 11 and the bottom (lower surface) of the spacer 25 are flush with each other and come into contact with the opposite member 40 (for example, a battery pack, a shield case, or the inner wall of the housing).

FIG. 28 is a diagram illustrating the structure of a coil unit according to Example 2 in which the thickness of the second magnetic body 21C is substantially equal to that of the first magnetic body 11. Sections (A) and (B) of FIG. 28 are diagrams illustrating an example of the dimensions of the coil unit according to Example 2. Section (C) of FIG. 28 is a plan view illustrating the coil unit according to Example 2. Section (D) of FIG. 28 is a cross-sectional view illustrating the coil unit taken along the line A-A' of Section (C) in FIG. 28. Section (E) of FIG. 28 is an enlarged view illustrating a region h shown in Section (D) of FIG. 28.

The dimensions of the coil unit according to Example 2 are the same as those of the coil unit according to Example 1 except that the spacer 25 is omitted and the thickness of the second magnetic body is different. Therefore, the description of Sections (A) to (C) in FIG. 28 will be omitted.

Section (D) of FIG. 28 is a cross-sectional view illustrating the coil unit according to Example 2 shown in Sections (C) and (E) of FIG. 28 is an enlarged view illustrating a region h shown in Section (D) of FIG. 28, that is, the first boundary surface B1 and the second boundary surface B2. As shown in Sections (D) and (E) of FIG. 28, the thickness of the second magnetic body 21C is substantially equal to that of the first magnetic body 11. Therefore, the bottom (lower surface) of the second magnetic body 21C and the bottom (lower surface) of the first magnetic body 11 are flush with each other and come into contact with a flat surface of another opposite member 40 (for example, a battery pack, a shield case, or the inner wall of a housing).

FIG. 29 is a diagram illustrating the measurement result when power transmission efficiency during non-contact power transmission and the maximum communication distance during non-contact wireless communication are measured as the performance of the coil units according to Examples 1 and 2. Section (A) of FIG. 29 shows the measurement result of the power transmission efficiency. Section (B) of FIG. 29 shows the measurement result of the maximum communication distance. The power transmission efficiency is not the transmission efficiency of only the coil, and the efficiency of the entire charging system from the DC input of the AC power circuit of the charger to the DC output of the portable wireless terminal shown in FIG. 18 was measured.

As shown in Section (A) of FIG. 29, in the coil unit according to the example of the fourth embodiment (see FIG. 19), the power transmission efficiency, that is, charging efficiency by the first coil 12 was 38.1[%]. In each coil unit according to Examples 1 and 2 of the sixth embodiment (see FIGS. 27 and 28), charging efficiency by the first coil 12 was 38.2[%] and 38.1[%]. As such, there is no difference in the power transmission efficiency between the coil units.

As shown in Section (B) of FIG. 29, in the coil unit according to the example of the fourth embodiment (see FIG. 19), the maximum communication distance was 128 [mm] and a dead region (Null region) was not generated. In the coil units according to Examples 1 and 2 of the sixth embodiment (see FIGS. 27 and 28), the maximum communication distance obtained by the second coil 22 was 128 [mm] and a dead region (Null region) was not generated. As such, there is no difference in the measurement performance of the maximum communication distance between the coil units. As shown in Section (D) of FIG. 25, when the second boundary surface B2 was lower than the first boundary surface B1 in the thickness direction of the coil since there was a variation in the position of the second magnetic body, the maximum communication distance was 117 [mm].

As such, according to the sixth embodiment, since the spacer 25 is provided so as to come into contact with the bottom (lower surface) of the second magnetic body 21B or since the thickness of the second magnetic body 21C is equal to or greater than that of the first magnetic body 11, the position of the second magnetic bodies 21B and 21C in the thickness direction of the coil is regulated. Therefore, in the coil unit according to this embodiment, it is possible to prevent the position of the second magnetic body from varying in the direction in which communication performance is reduced in the thickness direction of the coil and to stabilize the communication performance (for example, the maximum communication distance) of the second coil.

In addition, the surface of the member 40 may not be a flat surface. FIG. 30 is a cross-sectional view illustrating the structure of the coil unit when the surface of the member 40 is not a flat surface.

Sections (A) and (B) of FIG. 30 are cross-sectional views illustrating a case in which, in the surface of another member 40A, a surface 40A1 which faces the second magnetic body 21B is higher than a surface 40A2 which faces the first magnetic body 11B in the thickness direction of the coil. In Section (A) of FIG. 30, the sum of the height of a step portion m of the member 40A, the thickness of the spacer 25, and the thickness of the second magnetic body 21B is equal to or greater than the thickness of the first magnetic body 11B. In Section (B) of FIG. 30, the sum of the height of the step portion m of the member 40A and the thickness of the second magnetic body 21C is equal to or greater than the thickness of the first magnetic body 11B.

Sections (C) and (D) of FIG. 30 are cross-sectional views illustrating a case in which, in the surface of another member 40B, a surface 40A3 which faces the second magnetic body 21C is lower than a surface 40A4 which faces the first magnetic body 11C in the thickness direction of the coil. In Section (C) of FIG. 30, the sum of the thickness of the spacer 25 and the thickness of the second magnetic body 21C is equal to or greater than the sum of the thickness of the first magnetic body 11C and the height of a step portion n of the member 40B. In Section (D) of FIG. 30, the thickness of the second magnetic body 21C is equal to or greater than the sum of the thickness of the first magnetic body 11C and the height of the step portion n of the member 40B.

As such, when the member 40 does not have a flat surface, but has a shape corresponding to the bottom of the coil unit, the height of the second boundary surface B2 is equal to or greater than that of the first boundary surface B 1, considering the difference in the height of the surface of the member 40. Therefore, it is possible to adjust the thickness of the spacer 25 or the thickness of the second magnetic bodies 21B and 21C.

The shape of the coil is not particularly limited. For example, the coil may have any shape, such as a rectangular shape, a circular shape, or an elliptical shape.

In the above-described sixth embodiment, when the thickness of the second magnetic body 21 is equal to or less than that of the first magnetic body 11, the spacer 25 is provided. However, when the thickness of the second magnetic body 21 is equal to or greater than that of the first magnetic body 11, the spacer may be provided below the second magnetic body 21. In this case, it is also possible to stabilize the communication performance of the second coil 22.

In the above-described embodiments, for ease of understanding, the coil unit is arranged in the up-down direction. However, the coil unit may be arranged in any direction such as the left-right direction.

Prehistory of Seventh to Ninth Embodiments

In the structure disclosed in PTL 1, since two coils are arranged so as to form a double ring, the arrangement area of the coils is large. In addition, a plurality of coils are simply provided in parallel, without considering the performance of each coil, and performance deterioration may occur due to the electromagnetic coupling between the coils. In particular, when a plurality of coils are arranged so as to be close to each other in order to reduce the size of the terminal including the coils, performances, such as power transmission efficiency and the communication distance, may deteriorate due to the electromagnetic coupling between the coils.

In addition, PTL 1 does not disclose a technique for simplifying a wireless card manufacturing process when two coils are used. The portable wireless terminal including the non-contact charge function and the non-contact wireless communication function is likely to be spread in the future. When the portable wireless terminal is mass-produced, the arrangement of the coils may be considered which is capable of reducing the performance deterioration of two coils and being simply manufactured.

In the seventh to ninth embodiments, a transmission coil and a portable wireless terminal will be described which may be simply manufactured with a small size, and may reduce the performance deterioration of each coil when a plurality of coils, such as a non-contact wireless communication coil and a non-contact power transmission coil, coexist.

In the following seventh to ninth embodiments, an example of the structure of a coil unit serving as a transmission coil including the non-contact wireless communication coil and the non-contact power transmission coil and a portable wireless terminal including the coil unit is given as an example of the transmission coil according to the invention and the portable wireless terminal including the transmission coil.

Seventh Embodiment

FIG. 31 is a plan view illustrating the structure of a coil unit according to the seventh embodiment. FIG. 32 is a cross-sectional view illustrating the coil unit according to the seventh embodiment. Section (A) of FIG. 32 is a cross-sectional view illustrating the coil unit taken along the line A-A' of FIG. 31. Section (B) of FIG. 32 is a cross-sectional view illustrating the coil unit taken along the line B-B' of FIG. 31. The direction of an arrow H in Section (A) of FIG. 32 is a direction toward the inner wall of a rear housing of the portable wireless terminal including the coil unit according to this embodiment and a direction opposite to the direction of the arrow H in Section (A) of FIG. 32 is a direction toward the inside of the housing of the portable wireless terminal, that is, a direction toward the inside of a front housing.

The coil unit according to this embodiment includes a first magnetic body 11 with predetermined permeability, a first coil 12 which functions as a non-contact power transmission coil, a second magnetic body 21 with a permeability different from the predetermined permeability of the first magnetic body 11, and a second coil 22 which functions as a non-contact wireless communication coil. In the coil unit according to this embodiment, the first magnetic body 11 is provided corresponding to the first coil 12 and the second magnetic body 21 is provided corresponding to the second coil 22.

The first magnetic body 11 has a rectangular plate shape. The first coil 12 is arranged on one surface (a surface facing the inner wall of the rear housing of the portable wireless terminal) of the plate. For example, a battery pack or a shield case (not shown) is arranged on the other surface (a surface facing the inside of the housing of the portable wireless terminal) of the plate. The first magnetic body 11 is made of, for example, a material with permeability greater than 1, such as ferrite. The first magnetic body 11 has a relative permeability µr1 of, for example, 200 to 2000.

The first coil 12 is a coil obtained by winding a conductive winding wire in an elliptical ring shape, serves as a charging coil, and receives power supplied (transmitted) from an external charger. A resonance frequency f1 of the first coil 12 is a frequency which is adjusted by, for example, a capacitor that is connected in parallel or series to the first coil 12 and is, for example, about 100 kHz.

The second magnetic body 21 is a plate with a rectangular ring shape. One surface (a surface facing the inside of the housing of the portable wireless terminal) of the plate is arranged so as to come into contact with one surface (a surface facing the inner wall of the rear housing of the portable wireless terminal) of the first magnetic body 11. The second coil 22 which is provided on one side of the substrate 30 in a direction (a direction toward the inside of the housing of the portable wireless terminal) opposite to the direction of the arrow H shown in Section (A) of FIG. 32 is arranged on the other surface (a surface facing the inner wall of the rear housing of the portable wireless terminal) of the second magnetic body 21. The entire surface of the second magnetic body 21 is arranged outside the outer circumference of the first coil 12 and the outside diameter of the second magnetic body 21 is substantially equal to that of the first magnetic body 11. The second magnetic body 21 is made of a material with permeability greater than 1, such as ferrite. The second magnetic body 21 has a relative permeability µr2 of, for example, 10 to 300.

The second coil 22 is a coil which is wound in a rectangular ring shape by a conductive wiring pattern formed on the surface of the substrate 30 that faces in the direction opposite to the direction of the arrow H shown in Section (A) of FIG. 32 (the surface facing the inside of the housing of the portable wireless terminal). The second coil 22 serves as a non-contact wireless communication coil and transmits and receives data to and from an external device such as a reader/writer device. A resonance frequency f2 of the second coil 22 is adjusted by, for example, a capacitor which is connected in parallel or series to the second coil 22 and is, for example, about 13.56 MHz.

The substrate 30 is formed using, for example, a glass epoxy resin or a flexible printed substrate. The rear housing of the portable wireless terminal which is formed of, for example, acrylonitrile butadiene styrene (ABS) is arranged on a surface of the substrate 30 which faces in the direction of the arrow H in Section (A) of FIG. 32. A pair of first terminals 31 for the first coil 12 and a pair of second terminals 32 for the second coil 22 are formed at one end of the substrate 30 by a conductive wiring pattern. The first terminals 31 are connected to the first coil 12 through a wiring pattern and the second terminals 32 are connected to the second coil 22 by the wiring pattern of the substrate 30. In Sections (A) and (B) of FIG. 32, for simplicity of illustration, wiring patterns from the first and second terminals 31 and 32 to the first and second coils 12 and 22 are not shown.

In the coil unit according to this embodiment, in the thickness direction (in the up-down direction of FIG. 32) of the coil, the first magnetic body 11 is provided and the first coil 12 and the second magnetic body 21 are laminated on the surface of the first magnetic body 11 in the direction of the arrow H (the direction toward the inner wall of the rear housing of the portable wireless terminal) from the lower side of FIG. 32. In addition, in the thickness of the coil, the second coil 22 and the substrate 30 are sequentially laminated on the surface of the second magnetic body 21 in the direction of the arrow H (the direction toward the inner wall of the rear housing of the portable wireless terminal) from the lower side of FIG. 32. When the coil unit according to this embodiment is provided in the portable wireless terminal, the rear housing of the portable wireless terminal is disposed above the second coil 22 in the direction of the arrow H and the coil unit is accommodated in the housing. Therefore, as viewed from an external device, that is, the inner wall of the rear housing of the portable wireless terminal, the substrate 30, the second coil 22, the second magnetic body 21 and the first coil 12, and the first magnetic body 11 are sequentially laminated. As such, when a plurality of magnetic bodies are laminated on the coils and the coils are arranged close to each other, it may be possible to reduce performance deterioration due to the electromagnetic coupling between two coils and to reduce the arrangement area of the coil unit while ensuring the performance of each coil. Therefore, it is possible to reduce the size of the portable wireless terminal.

In this case, it is preferable that the first coil 12 and the second coil 22 be arranged so as not to overlap each other in the thickness direction of the coil. Since the first coil 12 has an elliptical shape and the second coil 22 has a rectangular shape, the first coil 12 and the second coil 22 do not overlap each other in four corner portions of the second coil 22. The second coil 22 is positioned outside the first coil 12 in the four corner portions. According to this structure, it may be possible to reduce the electromagnetic coupling between two coils.

In this embodiment, the resonance frequency relationship between the first coil 12 and the second coil 22 is established such that the resonance frequency of the first coil 12 is lower than that of the second coil 22 (f1<f2). It is preferable that the permeability relationship between the first magnetic body 11 and the second magnetic body 21 be established such that the permeability of the first magnetic body 11 is greater than that of the second magnetic body 21 (relative permeability µr1>relative permeability µr2). When the characteristics of the first coil 12, the second coil 22, the first magnetic body 11, and the second magnetic body 21 are set as described above, it may be possible to effectively reduce performance deterioration due to the electromagnetic coupling between two coils.

Next, an action when the unit coil according to this embodiment operates will be described. Section (A) of FIG. 33 is a diagram illustrating a magnetic field distribution of the coil unit at the position (the position shown in Section (A) of FIG. 32) of the cross-section taken along the line A-A' of FIG. 31 when the first coil 12 operates. Section (B) of FIG. 33 is a diagram illustrating a magnetic field distribution of the coil unit at the position (the position shown in Section (A) of FIG. 32) of the cross-section taken along the line A-A' of FIG. 31 when the second coil 22 operates. Section (A) of FIG. 34 is a diagram illustrating a magnetic field distribution of the coil unit at the position (the position shown in Section (B) of FIG. 32) of the cross-section taken along the line B-B' of FIG. 31 when the first coil 12 operates. Section (B) of FIG. 34 is a diagram illustrating a magnetic field distribution of the coil unit at the position (the position shown in Section (B) of FIG. 32) of the cross-section taken along the line B-B' of FIG. 31 when the second coil 22 operates.

When the first coil 12 operates, that is, when power is transmitted, the magnetic field is generated in the vicinity of the first coil 12 such that magnetic field lines pass through the first magnetic body 11 and are then emitted to a space, as shown in Section (A) of FIG. 33 and Section (A) of FIG. 34. In this case, the influence of the magnetic field from the first coil 12 to the second coil 22 is small.

When the second coil 22 operates, that is, when data is transmitted by non-contact wireless communication, the magnetic field is generated in the vicinity of the second coil 22 such that magnetic field lines pass through the second magnetic body 21 and are then emitted to a space, as shown in Section (B) of FIG. 33 and Section (B) of FIG. 34. In this case, the influence of the magnetic field from the second coil 22 to the first coil 12 is small.

In this embodiment, since the coil unit has the region in which the first coil 12 and the second coil 22 do not overlap each other, the electromagnetic coupling between the coils is reduced. In particular, it may be possible to sufficiently reduce the electromagnetic coupling in four corner regions of the coils in which the two coils do not overlap each other, as shown in Sections (A) and (B) of FIG. 34.

FIG. 35 is a block diagram illustrating the structure of the portable wireless terminal including the coil unit according to this embodiment, a charger which is an external device, and the reader/writer device.

A portable wireless terminal 50 includes the first coil 12 for charging and a second coil 22 for non-contact wireless communication. The first coil 12 is connected to a non-contact charging unit 51 and the second coil 22 is connected to a non-contact wireless communication unit 52. The first coil 12 is connected in parallel to a capacitor 54 and is also connected to a rectifying circuit 55 of the non-contact charging unit 51. The second coil 22 is connected in parallel to a capacitor 56 and is also connected to a modulation/demodulation circuit 57 of the non-contact wireless communication unit 52. The non-contact charging unit 51 and the non-contact wireless communication unit 52 are connected to a control circuit 53. The control circuit 53 controls the operation of each unit.

A charger 60 includes a non-contact power transmission coil 63. The non-contact power transmission coil 63 is connected in parallel to a capacitor 64 and is also connected to an AC power circuit 61. The AC power circuit 61 is connected to a control circuit 62 and the output of charging AC power is controlled by the control circuit 62.

A reader/writer device 70 includes a non-contact wireless communication coil 73. The non-contact wireless communication coil 73 is connected in parallel to a capacitor 74 and is also connected to a modulation/demodulation circuit 71. The modulation/demodulation circuit 71 is connected to a control circuit 72 and the control circuit 72 controls an operation of modulating and demodulating data transmitted by non-contact wireless communication.

In the above-mentioned structure, when the portable wireless terminal 50 is charged, the non-contact power transmission coil 63 of the charger 60 is arranged close to the first coil 12 of the portable wireless terminal 50 so as to face the first coil 12 and power is supplied from the charger 60 to the portable wireless terminal 50. In this case, the non-contact power transmission coil 63 and the first coil 12 are electromagnetically coupled and charging power is transmitted through the two coils in a non-contact manner. The resonance frequency f1 for supplying power from the non-contact power transmission coil 63 to the first coil 12 is adjusted by the capacitor 54 which is connected in parallel to the first coil 12 and the capacitor 64 which is connected in parallel to the non-contact power transmission coil 63 and is 100 kHz in this embodiment. AC power which is generated and output from the AC power circuit 61 is transmitted from the non-contact power transmission coil 63 to the first coil 12 and is received by the portable wireless terminal 50. The transmitted AC power is rectified into DC power by the rectifying circuit 55 and the DC output is supplied to a battery unit 58. In this way, the portable wireless terminal 50 is charged. In addition, the DC output may be supplied as power for operating each unit to a circuit in the portable wireless terminal 50.

When non-contact wireless communication is performed, the non-contact wireless communication coil 73 of the reader/writer device 70 is arranged close to the second coil 22 of the portable wireless terminal 50 so as to face the second coil 22 and data is transmitted and received between the reader/writer device 70 and the portable wireless terminal 50. In this case, the non-contact wireless communication coil 73 and the second coil 22 are electromagnetically coupled to each other and data is transmitted through the two coils by non-contact wireless communication. The resonance frequency f2 for communication between the non-contact wireless communication coil 73 and the second coil 22 is adjusted by the capacitor 56 which is connected in parallel to the second coil 22 and the capacitor 74 which is connected in parallel to the non-contact wireless communication coil 73 and is 13.56 MHz in this embodiment. Data transmitted from the reader/writer device 70 to the portable wireless terminal 50 is modulated by the modulation/demodulation circuit 71. The modulated data is transmitted from the non-contact wireless communication coil 73 to the second coil 22 and is then received by the portable wireless terminal 50. The transmitted data is demodulated by the modulation/demodulation circuit 57 of the portable wireless terminal 50. Data transmitted from the portable wireless terminal 50 to the reader/writer device 70 is modulated by the modulation/demodulation circuit 57. The modulated data is transmitted from the second coil 22 to the non-contact wireless communication coil 73 and is then received by the reader/writer device 70. The transmitted data is demodulated by the modulation/demodulation circuit 71 of the reader/writer device 70. As such, the use of the non-contact wireless communication function of the portable wireless terminal 50 makes it possible for the reader/writer device 70 to write and read data to and from the portable wireless terminal 50 using non-contact wireless communication.

Example of Coil Unit

Next, an example in which the performance of the coil unit according to this embodiment is measured using evaluation samples that are actually manufactured will be described. Sections (A) and (B) of FIG. 36 are diagrams illustrating the dimensions of the coil unit according to the example. Section (C) of FIG. 36 is a plan view illustrating the coil unit according to the example. Section (D) of FIG. 36 is a cross-sectional view illustrating the coil unit taken along the line A-A' of Section (C) of FIG. 36. That is, Section (A) of FIG. 36 shows only the first coil 12 laminated on the surface of the first magnetic body 11, Section (B) of FIG. 36 shows only the second coil 22 laminated on the surface of the second magnetic body 21, Section (C) of FIG. 36 shows the coil unit in which the first coil 12 and the second coil 22 are incorporated and coexist, and Section (D) of FIG. 36 shows the cross-section of the coil unit shown in Section (C) of FIG. 36.

In the example, the first magnetic body 11 had a square shape with a side a of 40 mm, the first coil 12 had a circular shape with an outside diameter b of 29 mm, the second magnetic body 21 had a shape in which a square having a dimension d of 30 mm was cut out from a substantially central portion of a square with a side c of 40 mm, and the coil unit had a thickness e of 1.0 mm. In this case, the first magnetic body 11 and the second magnetic body 21 overlap each other such that the dimensions of the outer circumferences thereof are substantially equal to each other, and the first coil 12 and the second coil 22 do not overlap each other. In particular, since the first coil 12 has a circular shape and the second coil 22 has a rectangular shape, the distance between the first coil 12 and the second coil 22 in four corner portions of the second coil 22 is large.

Section (A) of FIG. 37 is a diagram illustrating the measurement result when power transmission efficiency during non-contact power transmission is measured as the performance of the coil unit according to the example. Section (B) of FIG. 37 is a diagram illustrating the measurement result when the maximum communication distance during non-contact wireless communication is measured as the performance of the coil unit according to the example. The power transmission efficiency is not the transmission efficiency of only the coil, and the efficiency of the entire charging system from the DC input of the AC power circuit of the charger to the DC output of the portable wireless terminal shown in FIG. 35 was measured.

In a state in which the second coil 22 was removed from Section (D) of FIG. 36 and only the first coil 12 was provided, the power transmission efficiency was 37.4[%]. In the state shown in Section (D) of FIG. 36 in which the first coil 12 and the second coil 22 coexisted, the power transmission efficiency was 38.2[%]. In this case, even when two coils coexist and the second coil 22 is arranged outside the first coil 12, performance deterioration due to electromagnetic coupling may not occur in non-contact power transmission.

In a state in which the first coil 12 was removed from Section (D) of FIG. 36 and only the second coil 22 was provided, the maximum communication distance was 141 [mm] and a dead region (Null region) was not generated. In addition, in the state shown in Section (D) of FIG. 36 in which the first coil 12 and the second coil 22 coexisted, the maximum communication distance was 130 [mm] and a dead region (Null region) was not generated. In this case, even when two coils coexist and the first coil 12 is arranged in the vicinity of the second coil 22, performance deterioration due to electromagnetic coupling may occur in non-contact power transmission, but the amount of deterioration is less than that in the following comparative embodiment.

Comparative Embodiment of Coil Unit

Next, the performance of a coil unit according to a comparative embodiment which is compared with the performance of the coil unit according to the above-described embodiment is measured using evaluation samples. Sections (A) and (B) of FIG. 38 are diagrams illustrating an example of the dimensions of the coil unit according to the comparative embodiment. Section (C) of FIG. 38 is a plan view illustrating the coil unit according to the comparative embodiment. Section (D) of FIG. 38 is a cross-sectional view illustrating the coil unit taken along the line A-A' of Section (C) of FIG. 38. That is, Section (A) of FIG. 38 shows only a first coil 12 which is laminated on the surface of a first magnetic body 11, Section (B) of FIG. 38 shows only a second coil 22 which is laminated on the surface of a second magnetic body 21, Section (C) of FIG. 38 shows the coil unit in which the first coil 12 and the second coil 22 are incorporated and coexist, and Section (D) of FIG. 38 shows the cross-section of the coil unit shown in Section (C) of FIG. 38.

In the comparative embodiment, the first magnetic body 11 had a square shape with a side a of 40 mm, the first coil 12 had a circular shape with an outside diameter b of 29 mm, the second coil 22 was formed in the range of a shape in which a square with a dimension d of 30 mm was cut out from a substantially central portion of a square with a side c of 40 mm, the second coil 22 was closely adhered to the first magnetic body 11, and the coil unit had a thickness e of 0.8 mm. In this case, the first coil 12 and the second coil 22 were provided so as not to overlap each other. In particular, since the first coil 12 has a circular shape and the second coil 22 has a rectangular shape, the distance between the first coil 12 and the second coil 22 in four corner portions of the second coil 22 is large.

Section (A) of FIG. 39 is a diagram illustrating the measurement result when power transmission efficiency during non-contact power transmission is measured as the performance of the coil unit according to the comparative embodiment. Section (B) of FIG. 39 is a diagram illustrating the measurement result when the maximum communication distance during non-contact wireless communication is measured as the performance of the coil unit according to the comparative embodiment. The power transmission efficiency is not the transmission efficiency of only the coil, and the efficiency of the entire charging system from the DC input of the AC power circuit of the charger to the DC output of the portable wireless terminal shown in FIG. 35 was measured.

In a state in which the second coil 22 was removed from Section (D) of FIG. 38 and only the first coil 12 was provided, the power transmission efficiency was 39.1[%]. In the state shown in Section (D) of FIG. 38 in which the first coil 12 and the second coil 22 coexisted, the power transmission efficiency was 38.8[%]. In this case, there is no large difference in power transmission performance between the coil unit according to the example and the coil unit according to the comparative embodiment.

In a state in which the first coil 12 was removed from Section (D) of FIG. 38 and only the second coil 22 was provided, the second magnetic body was not provided and the second coil 22 was closely adhered to the first magnetic body. Therefore, the maximum communication distance was 131 [mm] and a dead region (Null region) was not generated. In the state shown in Section (D) of FIG. 38 in which the first coil 12 and the second coil 22 coexisted, the maximum communication distance was 117 [mm] and a dead region (Null region) was not generated. In this case, since two coils coexist and the second magnetic body 21 is not provided corresponding to the second coil 22, the maximum communication distance is reduced due to the electromagnetic coupling between the coils.

Therefore, in the coil unit according to the example, since the second magnetic body 21 corresponding to the second coil is provided outside the first coil 12 on the surface of the first magnetic body 11, it may be possible to reduce the occurrence of electromagnetic coupling in non-contact wireless communicate and to increase the maximum communication distance.

As such, according to the above-described embodiment, when a plurality of coils, such as the first coil 12 and the second coil 22, coexist, it may be possible to reduce the electromagnetic coupling between the coils and to reduce performance deterioration due to the electromagnetic coupling. In addition, as such, when a plurality of magnetic bodies are laminated on the coils and the coils are arranged close to each other, it may be possible to reduce the arrangement area and to simply manufacture a small coil with low performance deterioration. Therefore, in the portable wireless terminal provided with the coil unit including the non-contact wireless communication coil according to this embodiment, it may be possible to reduce performance deterioration both during non-contact power transmission and during non-contact wireless communication while reducing the size of the portable wireless terminal. The use of the coil unit which has a small size and can be simply manufactured makes it possible to obtain a desired performance (a power transmission performance and a communication performance).

Eighth Embodiment

FIG. 40 is a plan view illustrating the structure of a coil unit according to an eighth embodiment. Section (A) of FIG. 41 is a cross-sectional view illustrating the coil unit taken along the line A-A' of FIG. 40. Section (B) of FIG. 41 is a cross-sectional view illustrating the coil unit taken along the line B-B' of FIG. 40. In the description of FIG. 40 and Sections (A) and (B) of FIG. 41, the same components as those in the seventh embodiment shown in FIGS. 31 and 32 are denoted by the same reference numerals and the description thereof will not be repeated. In Sections (A) and (B) of FIG. 41, for simplicity of illustration, wiring patterns from first and second terminals 31 and 32 to first and second coils 12 and 22 are not shown.

The eighth embodiment is an example in which the shape of the second magnetic body 21 and the second coil 22 according to the seventh embodiment is changed. A first magnetic body 11A and a first coil 12A have substantially the same structure as those in the seventh embodiment. That is, the first magnetic body 11A has a rectangular plate shape and the first coil 12A is a coil obtained by winding a conductive winding wire in an elliptical ring shape. The second magnetic body 21A is a plate with an elliptical ring shape and the second coil 22A is a coil which is wound in an elliptical ring shape by a conductive wiring pattern formed on a surface of a substrate 30A that faces in a direction opposite to the direction of an arrow H shown in FIG. 41.

In the coil unit according to this embodiment, similarly to the seventh embodiment, in the thickness direction (in the up-down direction of Sections (A) of (B) of FIG. 41) of the coil, the first magnetic body 11A is provided and the first coil 12A and the second magnetic body 21A are laminated on the surface of the first magnetic body 11A in the direction of the arrow H (a direction toward the inner wall of a rear housing of a portable wireless terminal) from the lower side of FIG. 41. In addition, in the thickness of the coil, the second coil 22A and the substrate 30A are sequentially laminated on the surface of the second magnetic body 21A in the direction of the arrow H (the direction toward the inner wall of the rear housing of the portable wireless terminal) from the lower side of FIG. 41. As viewed from an external device, that is, the inner wall of the rear housing of the portable wireless terminal, the substrate 30A, the second coil 22A, the second magnetic body 21A and the first coil 12A, and the first magnetic body 11A are sequentially laminated.

The first coil 12A and the second coil 22A are arranged so as not to overlap each other in the thickness direction of the coil.

According to this structure, similarly to the seventh embodiment, even when two coils coexist so as to be close to each other, it may be possible to reduce the electromagnetic coupling between the coils and to reduce performance deterioration due to the electromagnetic coupling. In addition, since two coils are arranged so as to coexist, it is possible to reduce the size of the portable wireless terminal.

Prehistory of Ninth Embodiment

When the positional deviation between a first coil and a second coil occurs, that is, when the positional deviation occurs such that the distance (gap) between the first coil and the second coil is reduced, the performance of a coil unit may deteriorate, which will be described below with reference to FIGS. 42 and 43.

FIG. 42 is a diagram illustrating the gap between the first coil 12 and the second coil 22. Here, in the coil unit, the same components as those in the seventh embodiment are denoted by the same reference numerals.

Section (A) of FIG. 42 is a plan view illustrating the structure of the coil unit. Section (B) of FIG. 42 is an enlarged view illustrating a region g shown in Section (A) of FIG. 42. In Section (B) of FIG. 42, the gap between the first coil 12 and the second coil 22 is proper. Section (C) of FIG. 42 is an enlarged view illustrating the region g shown in Section (A) of FIG. 42. In Section (C) of FIG. 42, positional deviation occurs such that the gap between the first coil 12 and the second coil is reduced.

Specifically, in the upper right portion of Section (B) of FIG. 42, the gap between the left end of the second magnetic body 21 where the second coil 22 is provided and the right end of the first coil 12 is 1.20 mm. In the lower left portion of Section (B) of FIG. 42, the gap between the upper end of the second magnetic body 21 where the second coil 22 is provided and the lower end of the first coil 12 is 1.08 mm. In the description of FIGS. 42 and 43, the arrangement condition that the gap between the first coil 12 and the second coil 22 shown in Section (B) of FIG. 42 is maintained is referred to as a condition a.

In the upper right portion of Section (C) of FIG. 42, the gap between the left end of the second magnetic body 21 where the second coil 22 is provided and the right end of the first coil 12 is 0.01 mm. In the lower left portion of Section (C) of FIG. 42, the gap between the upper end of the second magnetic body 21 where the second coil 22 is provided and the lower end of the first coil 12 is 0.01 mm. In the description of FIGS. 42 and 43, the arrangement condition that the gap between the first coil 12 and the second coil 22 shown in Section (C) of FIG. 42 is relative less than the gap shown in Section (B) of FIG. 42 is referred to as a condition b.

Section (A) of FIG. 43 is a table illustrating the measurement result under the conditions a and b. Section (B) of FIG. 43 is a graph illustrating the measurement result under the conditions a and b. This measurement was performed in a case in which the coil unit is mounted on a copper plate and a case in which the coil unit is not mounted on the copper plate. The table shown in Section (A) of FIG. 43 indicates the measured values of inductance (L value), a resistance value (R value), and a resonance frequency. The graph shown in Section (B) of FIG. 43 indicates a change in the resonance frequency when the copper plate is not provided. In Section (B) of FIG. 43, the horizontal axis indicates the frequency and the vertical axis indicates S-parameter S21 characteristics indicating passband characteristics.

In Sections (A) and (B) of FIG. 43, the original resonance frequency under the condition a is 13.56 MHz and the resonance frequency under the condition b is 13.66 (13.67) MHz in both the case in which the copper plate is provided and the case in which the copper plate is not provided. The difference between the resonance frequencies is about 100 kHz. As such, the difference in resonance frequency occurs due to the positional deviation between the second coil and the first coil. Therefore, the performance of the coil unit, that is, power transmission efficiency during non-contact power transmission and the maximum communication distance during non-contact wireless communication may deteriorate.

Ninth Embodiment

In the ninth embodiment, when the coil unit is assembled, the positional deviation between the second coil and the first coil does not occur. That is, in the ninth embodiment, an example of a coil unit will be described in which, when the coil unit is assembled, the gap between the first coil and the second coil is equal to or greater than a predetermined value and performance deterioration due to the position deviation between the coils may be reduced.

First, the assembly of the coil unit will be described briefly. Sections (A) to (C) of FIG. 44 are cross-sectional views illustrating the assembly flow of a coil unit. Section (A) of FIG. 44 shows an example of a first process in the assembly of the coil unit, Section (B) of FIG. 44 shows another example of the first process in the assembly of the coil unit, and Section (C) of FIG. 44 shows the assembled coil unit.

Before an example or another example of the first process, a partial coil unit obtained by attaching a second coil 22 that is formed as a copper foil pattern (metal pattern) on a substrate 30 to the surface of a second magnetic body 21 is prepared.

In the example of the first process shown in Section (A) of FIG. 44, a first coil 12 is attached to the surface of a first magnetic body 11 and the partial coil unit is attached to the surface of the first magnetic body 11 so as to be disposed outside the first coil 12.

In another example of the first process shown in Section (B) of FIG. 44, the second coil unit is attached to the surface of the first magnetic body 11 and the first coil 12 is attached to the surface of the first magnetic body 11 so as to be disposed inside the partial coil unit.

The assembly of the coil unit is completed as shown in Section (C) of FIG. 44.

When the coil unit is assembled by any one of the processes shown in Sections (A) and (B) of FIG. 44, positioning needs to be performed such that the distance (gap) between the first coil 12 and the second coil 22 arranged on the first magnetic body 11 may not deteriorate the power transmission performance and wireless communication performance of the coil unit, that is, the distance (gap) is equal to or greater than a predetermined value.

In the ninth embodiment, a guide member which guides the first coil 12 or the partial coil unit is formed on the second magnetic body 21 or the substrate 30 and the distance (gap) between the first coil and the second coil is equal to or greater than a predetermined value when the coil unit is assembled.

Next, two examples (Examples 1 and 2) in which measurement is performed using evaluation samples that are manufactured by simulations will be described.

FIG. 45 is a diagram illustrating the structure of a coil unit according to Example 1 when a second magnetic body 21B is also used as a guide member 21g. Sections (A) and (B) of FIG. 45 are diagrams illustrating an example of the dimensions of the coil unit according to Example 1. Section (C) of FIG. 45 is a plan view illustrating the coil unit according to Example 1. Section (D) of FIG. 45 is a cross-sectional view illustrating the coil unit taken along the line A-A' of Section (C) of FIG. 45.

In Example 1, a first magnetic body 11B had a square shape with a side a of 40 mm, a first coil 12B had a circular shape with an outside diameter b of 29 mm, and the second magnetic body 21B had a shape in which a circle having a dimension d of 30 mm was cut out from a substantially central portion of a square with a side c of 40 mm. In addition, the coil unit had a thickness e of 1.0 mm.

In this case, the dimensions of the inner circumference of the first coil 12B are substantially equal to those of the inner circumference of the second coil 22B. The first coil 12B and the second coil 22B overlap each other on the surface of the first magnetic body 11B. The first coil 12B and the second coil 22B do not overlap each other in the thickness direction of the coil. In particular, since the first coil 12B has a circular shape and the second coil 22B has a rectangular shape, the distance (gap) between the first coil 12B and the second coil 22B in four corner portions of the second coil 22B is large.

In the coil unit according to Example 1, the second magnetic body 21B is also used as the guide member 21g. That is, the guide member 21g which is a guide portion is formed in the inner circumferential portion of the second magnetic body 21B.

Therefore, an inner hole of the second magnetic body 21B does not have a rectangular shape, but has a circular shape. An arc-shaped portion (see Section (B) of FIG. 45) which protrudes inward from four corners corresponding to the outer corners of the second magnetic body 21B to the center corresponds to the guide member 21g. As such, the guide member 21g guides the first coil 12B to a fixed position in the hole of the second magnetic body 21B, or it guides the hole of the second magnetic body 21B to a fixed position inside the first coil 12B. Therefore, a variation in the distance (gap) between the first coil 12B and the second coil 22B does not occur.

As such, in the coil unit according to Example 1, the guide member 21g is formed in the inner circumferential portion of the second magnetic body 21B (on the side close to the first coil 12B). Therefore, it is possible to regulate a variation in the distance (gap) between the first coil 12B and the second coil 22B with a thickness that is substantially equal to that of the first coil 12B and to accurately position the first coil 12B and the second coil 22B.

FIG. 46 is a diagram illustrating the structure of a coil unit according to Example 2 when a second magnetic body 21B and a substrate 30C are also used as guide members 21g and 30g, respectively. Sections (A) and (B) of FIG. 46 are diagrams illustrating an example of the dimensions of the coil unit according to Example 2. Section (C) of FIG. 46 is a plan view illustrating the coil unit according to Example 2.

Section (D) of FIG. 46 is a cross-sectional view illustrating the coil unit taken along the line A-A' of Section (C) of FIG. 46.

In the coil unit according to Example 2, similarly to the coil unit according to Example 1, a first magnetic body 11B had a square shape with a side a of 40 mm, a first coil 12B had a circular shape with an outside diameter b of 29 mm, and the second magnetic body 21B had a shape in which a circle having a dimension d of 30 mm was cut out from a substantially central portion of a square with a side c of 40 mm. In addition, the coil unit had a thickness e of 1.0 mm.

In the coil unit according to Example 2, similarly to the coil unit according to Example 1, the guide member 21g is formed in an inner circumferential portion of the second magnetic body 21B and the guide member 30g is formed in an inner circumferential portion of the substrate 30C.

That is, an inner hole of the substrate 30C has a circular shape, similarly to the inner hole of the second magnetic body 21B. An arc-shaped portion which protrudes inward from four corners corresponding to the outer corners of the second magnetic body 21B to the center corresponds to the guide member 30g. As such, the guide members 30g and 21g guide the first coil 12B to a fixed position in the hole of the second magnetic body 21B, or they guide the hole of the second magnetic body 21B to a fixed position inside the first coil 12B. Therefore, a variation in the distance (gap) between the first coil 12B and the second coil 22B does not occur.

When the substrate 30C is also used as the guide member 30g, that is, when the guide member 30g is formed in the substrate 30C, the function of the guide member is obtained, without forming the guide member 21g in the second magnetic body 21B. However, in this case, it is preferable that the lower surface of the substrate 30C be disposed below the upper surface of the first coil 12B. In this case, it is possible to accurately position the distance (gap) between the first coil 12B and the second coil 22B.

As described above, since the inner circumferential portion of the substrate 30C is formed in the guide member 30g, it is easy to form the guide member and the guide member is simply formed in various shapes.

FIG. 47 is a diagram illustrating the structure of a coil unit according to a comparative embodiment when a guide member is not provided. Sections (A) and (B) of FIG. 47 are diagrams illustrating an example of the dimensions of the coil unit according to the comparative embodiment. Section (C) of FIG. 47 is a plan view illustrating the coil unit according to the comparative embodiment. Section (D) of FIG. 47 is a cross-sectional view illustrating the coil unit taken along the line A-A' of Section (C) of FIG. 47.

In the coil unit according to the comparative embodiment, similarly to the coil unit according to Example 1 or 2, a first magnetic body 11 had a square shape with a side a of 40 mm, a first coil 12 had a circular shape with an outside diameter b of 29 mm, and a second magnetic body 21 had a shape in which a square having a dimension d of 30 mm was cut out from a square with a side c of 40 mm. In addition, the coil unit had a thickness e of 1.0 mm.

Since the comparative embodiment is the same as the example (see Sections (A) to (D) of FIG. 36) of the seventh embodiment, the same components as those in the example are denoted by the same reference numerals. In this case, a protruding portion which is a guide member is not provided in the substrate 30 and the second magnetic body 21 and a rectangular hole is formed. Therefore, for example, the first coil 12 is attached to the surface of the first magnetic body 11, without being guided by the guide member.

FIG. 48 is a diagram illustrating the measurement result of the performance of the coil units according to Examples 1 and 2. Section (A) of FIG. 48 is a diagram illustrating the measurement result of power transmission efficiency during non-contact power transmission. Section (B) of FIG. 48 is a diagram illustrating the measurement result of the maximum communication distance during non-contact wireless communication. The power transmission efficiency is not the transmission efficiency of only the coil (first coil), and the efficiency of the entire charging system from the DC input of the AC power circuit of the charger to the DC output of the portable wireless terminal shown in FIG. 35 was measured.

As shown in Section (A) of FIG. 48, in the coil unit according to the example of the seventh embodiment, the power transmission efficiency was 38.2[%]. In each of the coil units according to Examples 1 and 2 of the ninth embodiment, the power transmission efficiency was 38.1[%]. As such, there is no difference in the power transmission efficiency between the coil units according to both examples.

As shown in Section (B) of FIG. 48, in the coil unit according to the example of the seventh embodiment, the maximum communication distance was 130 [mm] and a dead region (Null region) was not generated. In the coil units according to Examples 1 and 2 of the ninth embodiment, the maximum communication distance obtained by the second coil 22B was 131 [mm] and a dead region (Null region) was not generated. As such, there is no difference in the maximum communication distance between the coil units.

Although not shown in each table in FIG. 48, the resonance frequency of each of the coil units according to Examples 1 and 2 of the ninth embodiment is 13.56 MHz which is the same as that in the example of the seventh embodiment and there is no difference in resonance frequency between the coil units. In addition, similarly, there is no difference in inductance (L value) and resistance value (R value) between the coils.

As described above, in the coil unit according to the ninth embodiment, when the coil unit is assembled, the arrangement position of the first coil or the second coil is regulated such that the distance (gap) between the first coil and the second coil is fixed by the guide member. Therefore, the positional deviation between the first coil and the second coil does not occur and the gap between the first coil and the second coil is equal to or greater than a predetermined value. As a result, in the coil unit according to this embodiment, when wireless communication is performed by the second coil, the deterioration of the communication performance, particularly, a large variation in the resonance frequency may be reduced.

Sections (A) to (C) of FIG. 49 are diagrams illustrating examples of the shapes of various guide members. Sections (D) to (F) of FIG. 50 are diagrams illustrating examples of the shapes of various guide members, following Sections (A) to (C) of FIG. 49. Similarly to the coil units according to Examples 1 and 2 of the ninth embodiment, the guide member may be formed in any one of the substrate and the second magnetic body. FIGS. 49 and 50 show the various shapes of the guide member, for example, when the guide member is formed in the second magnetic body.

Section (A) of FIG. 49 shows the structure of the guide member in the coil unit shown in FIG. 45. That is, in Section (A) of FIG. 49, guide members 21g which protrude inward from four corners corresponding to the outer corners of the second magnetic body 21B to the center are formed in the second magnetic body 21B. In the guide member 21g, a circumferential portion of the guide member 21g which faces the first coil 12B is formed in an arc shape so as to correspond to the shape of the first coil 12B with a circular shape. Here, the guide members 21g are formed at all of four corners corresponding to the outer corners of the second magnetic body 21B. However, the guide member can function as a guide when the coil unit is assembled as long as it is formed at, at least, one of the four corners.

In Section (B) of FIG. 49, guide members 21h which protrude inward from four corners corresponding to the outer corners of the second magnetic body 21B to the center are formed in the second magnetic body 21B and a circumferential portion of the guide member 21h which faces the first coil 12B has a linear shape. Here, the guide members 21h are formed at all of four corners corresponding to the outer corners of the second magnetic body 21B. However, the guide member can function as a guide when the coil unit is assembled as long as it is formed at at least one of the four corners.

In Section (C) of FIG. 49, rectangular (for example, square or rectangular) guide members 21i are formed in the second magnetic body 21B at four corners corresponding to the outer corners of the second magnetic body 21B so as to protrude to the center. In addition, one corner of each guide member 21i approaches the first coil 12B. Here, the guide members 21i are formed at all of four inner corners of the second magnetic body 21B. However, the guide member can function as a guide when the coil unit is assembled as long as it is formed at at least one of the four inner corners.

In Section (D) of FIG. 50, convex guide members 21j are formed substantially at the center of each edge (edge side) of a rectangular hole formed in the second magnetic body 21B so as to protrude inward. The leading end of each guide member 21j approaches the first coil 12B. Here, the guide members 21j are formed at all of four sides forming the inner edge of the second magnetic body 21B. However, the guide member can function as a guide when the coil unit is assembled as long as it is formed at at least one of the four sides.

Section (E) of FIG. 50 shows a case in which the first coil 12C has a rectangular shape with rounded corners. Guide members 21k which protrude inward from four corners corresponding to the outer corners of the second magnetic body 21B to the center are formed in the second magnetic body 21B. An inner circumferential portion of the guide member 21k has a substantial arc shape so as to correspond to the rounded corner of the first coil 12C. Here, the guide members 21k are formed at all of four corners corresponding to the outer corners of the second magnetic body 21B. However, the guide member can function as a guide when the coil unit is assembled as long as it is formed at at least one of the four corners.

Section (F) of FIG. 50 shows a case in which the first coil 12C has a rectangular shape with rounded corners, similarly to Section (E) of FIG. 50. An inner circumferential portion of the lower right corner of the second magnetic body 21B has a substantial arc shape so as to correspond to the shape of the rounded corner of the first coil 12C and convex guide members 21l are formed on both sides of the inner circumferential portion so as to protrude to the center of the second magnetic body 21B. The guide members 21l may be formed at two or more corners.

It will be understood by those skilled in the art that various modifications or applications can be made on the basis of the specifications and the known technique, without departing from the scope and spirit of the invention, and are also included in the claims. In addition, the components according to the above-described embodiments may be arbitrarily combined with each other, without departing from the scope of the invention.

For example, in the above-described seventh to ninth embodiments, the guide member is formed as a portion of the second magnetic body or the substrate. However, the guide member may be formed separately from the second magnetic body or the substrate. In addition, the guide member may be made of the same material as that forming the second magnetic body or the substrate or it may be made of a material different from that forming the second magnetic body or the substrate. In this case, a new member is added to the coil unit, but it is possible to simply provide a guide member with an arbitrary shape, without changing the shape of the second magnetic body or the substrate.

The coil may have any shape, such as a rectangular shape, a circular shape, or an elliptical shape. The shape of the coil is not particularly limited.

In the above-described seventh to ninth embodiments, for ease of understanding, the coil unit is arranged in the up-down direction. However, the coil unit may be arranged in any direction such as the left-right direction.

INDUSTRIAL APPLICABILITY

The invention can reduce a size while reducing the performance deterioration of each coil when a plurality of coils, such as a non-contact wireless communication coil and a non-contact power transmission coil, coexist and is useful as a non-contact wireless communication coil which can perform non-contact wireless communication in, for example, a portable phone terminal and a smart phone, and a portable wireless terminal including the non-contact wireless communication coil.

In addition, the invention can reduce a size and can be simply manufactured while reducing the performance deterioration of each coil when a plurality of coils, such as a non-contact wireless communication coil and a non-contact power transmission coil, coexist and is useful as a non-contact wireless communication coil which can perform non-contact wireless communication in, for example, a portable phone terminal and a smart phone, and a portable wireless terminal including the non-contact wireless communication coil.

Priority is claimed on Japanese Patent Application No. 2011-241255, filed on Nov. 2, 2011, Japanese Patent Application No. 2011-249841, filed on Nov. 15, 2011, Japanese Patent Application No. 2011-260677, filed on Nov. 29, 2011, Japanese Patent Application No. 2012-152664, filed on Jul. 6, 2012, and Japanese Patent Application No. 2012-154861, filed on Jul. 10, 2012, the content of which is incorporated herein by reference.

REFERENCE SIGNS LIST 11, 11A, 11B: FIRST MAGNETIC BODY
12, 12A to 12N: FIRST COIL
21, 21A, 21B, 21C: SECOND MAGNETIC BODY
21g, 21h, 21i, 21j, 21k, 21l: GUIDE MEMBER
22, 22A to 22N: SECOND COIL
25: SPACER
30, 30A, 30B, 30C: SUBSTRATE
31: FIRST TERMINAL
32: SECOND TERMINAL
50: PORTABLE WIRELESS TERMINAL
51: NON-CONTACT CHARGING UNIT

52: NON-CONTACT WIRELESS COMMUNICATION UNIT
53: CONTROL CIRCUIT
55: RECTIFYING CIRCUIT
57: MODULATION/DEMODULATION CIRCUIT
58: BATTERY
60: CHARGER
61: AC POWER CIRCUIT
62: CONTROL CIRCUIT
63: NON-CONTACT POWER TRANSMISSION COIL
70: READER/WRITER DEVICE
71: MODULATION/DEMODULATION CIRCUIT
72: CONTROL CIRCUIT
73: NON-CONTACT WIRELESS COMMUNICATION COIL

The invention claimed is:

1. A chargeable communication module comprising:
a wireless power charging coil;
a wireless communication coil being electrically isolated from the wireless power charging coil; and
a magnetic sheet;
wherein the wireless power charging coil is disposed on a surface of the magnetic sheet,
the wireless communication coil includes a winding portion arranged peripheral to the wireless power charging coil, and
a center of the wireless power charging coil is offset from a center of the wireless communication coil.

2. The chargeable communication module according to claim 1, wherein the wireless power charging coil has a first resonant frequency and the wireless communication coil has a second resonant frequency different from the first resonant frequency.

3. The chargeable communication module according to claim 2, wherein the first resonant frequency of the wireless power charging coil is lower than the second resonant frequency of the wireless communication coil.

4. The chargeable communication module according to claim 1, further comprising:
a substrate on which the wireless communication coil is arranged;
wherein the wireless communication coil is interposed between the substrate and the surface of the magnetic sheet.

5. The chargeable communication module according to claim 1, wherein the wireless communication coil has a polygonal shape defined by multiple sides and multiple corner portions, and
a first shortest distance between the wireless power charging coil and the wireless communication coil at one of the corner portions is greater than a second shortest distance between the wireless power charging coil and the wireless communication coil at one of the sides.

6. The chargeable communication module according to claim 5, wherein the wireless power charging coil has a circular shape.

7. The chargeable communication module according to claim 1, wherein the wireless power charging coil has a circular shape.

8. The chargeable communication module according to claim 1, wherein the wireless communication coil has multiple sides and multiple corner portions.

9. The chargeable communication module according to claim 1, wherein a number of windings included in the wireless power charging coil is greater than a number of windings included in the wireless communication coil.

10. The chargeable communication module according to claim 1, wherein the wireless communication coil is disposed on the magnetic sheet.

11. The chargeable communication module according to claim 1, wherein the wireless communication coil is disposed on another magnetic sheet different from the magnetic sheet.

12. The chargeable communication module according to claim 1, wherein the wireless power charging coil includes a wound conductive wire.

13. The chargeable communication module according to claim 1, wherein the wireless communication coil includes a conductive wiring pattern formed on a substrate.

14. The chargeable communication module according to claim 1, wherein at least a part of the wireless communication coil is disposed outside of the magnetic sheet.

15. The chargeable communication module according to claim 1, wherein the wireless communication coil is configured to perform communication by electromagnetic induction.

* * * * *